(12) United States Patent
Schuehmacher et al.

(10) Patent No.: US 12,162,562 B2
(45) Date of Patent: Dec. 10, 2024

(54) EXHAUST SYSTEM FOR AN ENGINE

(71) Applicant: BOMBARDIER RECREATIONAL PRODUCTS INC., Valcourt (CA)

(72) Inventors: Bruno Schuehmacher, Richmond (CA); Luc Champigny, Racine (CA); Michel Lefebvre, Valcourt (CA); Sebastien Thibault, Sherbrooke (CA); Roger Rioux, Sherbrooke (CA); Jonathan Claveau, Cowansville (CA); Roland Ennsmann, Gunskirchen (AT); Frederic Desjardins, Orford (CA); Francois Leboeuf, Racine (CA); Christian Berger, Meggenhofen (AT)

(73) Assignee: BOMBARDIER RECREATIONAL PREODUCTS INC., Valcourt (CA)

( * ) Notice: Subject to any disclaimer, the term of this patent is extended or adjusted under 35 U.S.C. 154(b) by 0 days.

(21) Appl. No.: 17/107,402

(22) Filed: Nov. 30, 2020

(65) Prior Publication Data

US 2021/0078674 A1     Mar. 18, 2021

Related U.S. Application Data

(63) Continuation-in-part of application No. PCT/IB2019/054501, filed on May 30, 2019.
(Continued)

(51) Int. Cl.
*B62M 27/02* (2006.01)
*F01N 1/02* (2006.01)
(Continued)

(52) U.S. Cl.
CPC .............. *B62M 27/02* (2013.01); *F01N 1/02* (2013.01); *F02B 37/02* (2013.01); *F02B 37/183* (2013.01);
(Continued)

(58) Field of Classification Search
CPC ............ B62M 27/02; B62M 2027/025; B62M 2027/027; B62M 2027/028; F01N 1/02;
(Continued)

(56) References Cited

U.S. PATENT DOCUMENTS 1,447,380 A    3/1923  Goetz
1,501,022 A    7/1924  Gibford
(Continued)

FOREIGN PATENT DOCUMENTS

CA    2496716 C    5/2007
CA    2462350 C    5/2010
(Continued)

OTHER PUBLICATIONS

International Search Report of PCT/IB2019/054501; Lee Young; Dec. 6, 2019.
(Continued)

*Primary Examiner* — Loren C Edwards
(74) *Attorney, Agent, or Firm* — BCF LLP

(57) ABSTRACT

A snowmobile including: a frame; an engine supported by the frame; an exhaust pipe connected to the engine; and a turbocharger connected to the exhaust pipe. The turbocharger includes a bypass conduit fluidly communicating with the turbocharger housing and including an exhaust inlet fluidly connected to the exhaust pipe; a valve in the bypass conduit for controlling the flow of exhaust gas, and an exhaust collector. The valve is movable between first and second positions, a first flow path passing through the exhaust inlet, through the bypass conduit, and into the exhaust collector, a second flow path passing through the exhaust inlet, through the bypass conduit, through the exhaust turbine, and into the exhaust collector, in the first position, a majority of the exhaust gas flowing along the first
(Continued)

flow path and in the second position, a majority of the exhaust gas flowing along the second flow path.

8 Claims, 40 Drawing Sheets

Related U.S. Application Data

(60) Provisional application No. 62/958,787, filed on Jan. 9, 2020, provisional application No. 62/783,576, filed on Dec. 21, 2018, provisional application No. 62/678,922, filed on May 31, 2018.

(51) Int. Cl.
*F02B 37/02* (2006.01)
*F02B 37/18* (2006.01)
*F02D 9/02* (2006.01)
*F02M 35/10* (2006.01)

(52) U.S. Cl.
CPC ......... *F02D 9/02* (2013.01); *F02M 35/10157* (2013.01); *B62M 2027/025* (2013.01); *B62M 2027/027* (2013.01); *B62M 2027/028* (2013.01)

(58) Field of Classification Search
CPC ............. F01N 2240/36; F01N 2410/00; F01N 2590/00; F01N 13/10; F02B 37/02; F02B 37/183; F02B 27/04; F02B 2075/025; F02D 9/02; F02D 41/1448; F02D 41/40; F02D 41/0007; F02D 2200/0406; F02M 35/10157; Y02T 10/12; Y02T 10/40
See application file for complete search history.

(56) References Cited

U.S. PATENT DOCUMENTS

| | | | |
|---|---|---|---|
| 4,169,355 A | 10/1979 | Walsham et al. | |
| 4,387,570 A | 6/1983 | Iwamoto et al. | |
| 4,827,880 A | 5/1989 | Ban et al. | |
| 5,044,396 A | 9/1991 | Daudet et al. | |
| 5,215,068 A | 6/1993 | Kato | |
| 5,355,673 A | 10/1994 | Sterling et al. | |
| 5,992,552 A | 11/1999 | Eto | |
| 6,651,765 B1 | 11/2003 | Weinzierl | |
| 6,973,985 B2 | 12/2005 | Yatagai et al. | |
| 7,104,352 B2 | 9/2006 | Weinzierl | |
| 7,134,520 B2 | 11/2006 | Yatagai et al. | |
| 7,198,127 B2 | 4/2007 | Yatagai et al. | |
| 7,222,689 B2 | 5/2007 | Yatagai et al. | |
| 7,264,075 B2 | 9/2007 | Schuemacher et al. | |
| 7,472,771 B2 | 1/2009 | Yatagai et al. | |
| 8,056,673 B2 | 11/2011 | Zelinski | |
| 8,141,357 B2 | 3/2012 | Yamagata et al. | |
| 8,528,327 B2 | 9/2013 | Bucknell et al. | |
| 8,657,065 B1 | 2/2014 | Hill | |
| 9,103,272 B2 | 8/2015 | Buckland et al. | |
| 9,464,559 B2 | 10/2016 | Middleton et al. | |
| 9,605,581 B1 | 3/2017 | Middleton et al. | |
| 9,816,454 B1 | 11/2017 | Anderson et al. | |
| 9,982,794 B2 | 5/2018 | Thomas | |
| 10,288,012 B2 | 5/2019 | Berkemeier et al. | |
| 10,598,059 B2 | 3/2020 | Geer et al. | |
| 2002/0027029 A1 | 3/2002 | Yatagai et al. | |
| 2002/0084125 A1* | 7/2002 | Scheumacher | B62M 27/02 180/190 |
| 2003/0205423 A1 | 11/2003 | Weinzierl | |
| 2005/0205319 A1 | 9/2005 | Yatagai et al. | |
| 2009/0222190 A1 | 9/2009 | Andreae et al. | |
| 2009/0250281 A1 | 10/2009 | Weinzierl | |
| 2009/0314005 A1 | 12/2009 | Messmer | |
| 2011/0036331 A1 | 2/2011 | Pocha | |
| 2011/0041493 A1* | 2/2011 | Doering | F02D 41/0007 60/603 |
| 2011/0314807 A1* | 12/2011 | Karnik | F02B 37/183 60/602 |
| 2013/0061584 A1 | 3/2013 | Gerges et al. | |
| 2013/0343929 A1* | 12/2013 | Tombers | F04D 29/42 417/406 |
| 2014/0074381 A1 | 3/2014 | Sczomak et al. | |
| 2014/0373803 A1 | 12/2014 | Pendray | |
| 2016/0016639 A1 | 1/2016 | Pard | |
| 2016/0090905 A1 | 3/2016 | Kai et al. | |
| 2016/0237974 A1 | 8/2016 | Pendray | |
| 2017/0175664 A1 | 6/2017 | Mosburger | |
| 2017/0234211 A1* | 8/2017 | Uehane | F01D 9/026 60/602 |
| 2017/0241326 A1 | 8/2017 | Vezina et al. | |
| 2018/0171864 A1 | 6/2018 | Hakeem et al. | |
| 2018/0202396 A1* | 7/2018 | Zhang | F02M 26/06 |
| 2018/0283266 A1* | 10/2018 | Niwa | F02B 37/013 |
| 2020/0011219 A1 | 1/2020 | Oh et al. | |
| 2020/0182358 A1 | 6/2020 | Enke et al. | |

FOREIGN PATENT DOCUMENTS

| | | |
|---|---|---|
| DE | 102018121044 A1 | 3/2019 |
| EP | 0431985 A1 | 6/1991 |
| EP | 1178191 A2 | 2/2002 |
| EP | 2772620 A1 | 9/2014 |
| JP | H1089127 A | 4/1998 |
| JP | 2002303120 A | 10/2002 |
| JP | 200598220 A | 4/2005 |
| JP | 2006161607 A | 6/2006 |
| JP | 3901904 B2 | 4/2007 |
| JP | 4821750 B2 | 11/2011 |
| KR | 102079754 B1 | 2/2020 |
| RU | 2168643 C2 | 6/2001 |
| WO | 2014005130 A2 | 1/2014 |
| WO | 2017001144 A1 | 1/2017 |

OTHER PUBLICATIONS

English translation of JP200598220A retrieved from https://patents.google.com/patent/JP2005098220A/en?pq=JP2005098220 on Nov. 30, 2020.
International Search Report of PCT/EP2019/064193; Marco Seifert; Oct. 16, 2019.
English translation of JP2002303120A retrieved from https://patents.google.com/patent/JP2002303120A/en?pq=jp2002303120 on Nov. 30, 2020.
English translation of EP0431985A1 retrieved from https://patents.google.com/patent/EP0431985A1/en?pq=EP0431985 on Nov. 30, 2020.
International Search Report and Written Opinion issued from the ISA/EP on Jun. 8, 2022 in connection with the PCT application No. PCT/EP2021/071821.
Final Office Action issued from the USPTO on Aug. 25, 2022 in connection with the U.S. Appl. No. 17/059,643 and Including a PTO-892 Form.
Office Action issued from the ROSPATENT on Dec. 24, 2022 in connection with the related application No. 2020143176 including Search Report.

* cited by examiner

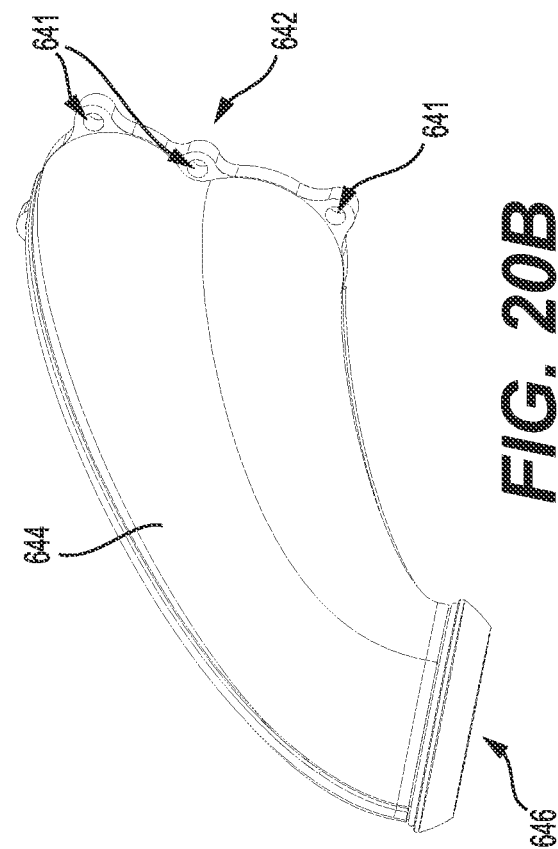
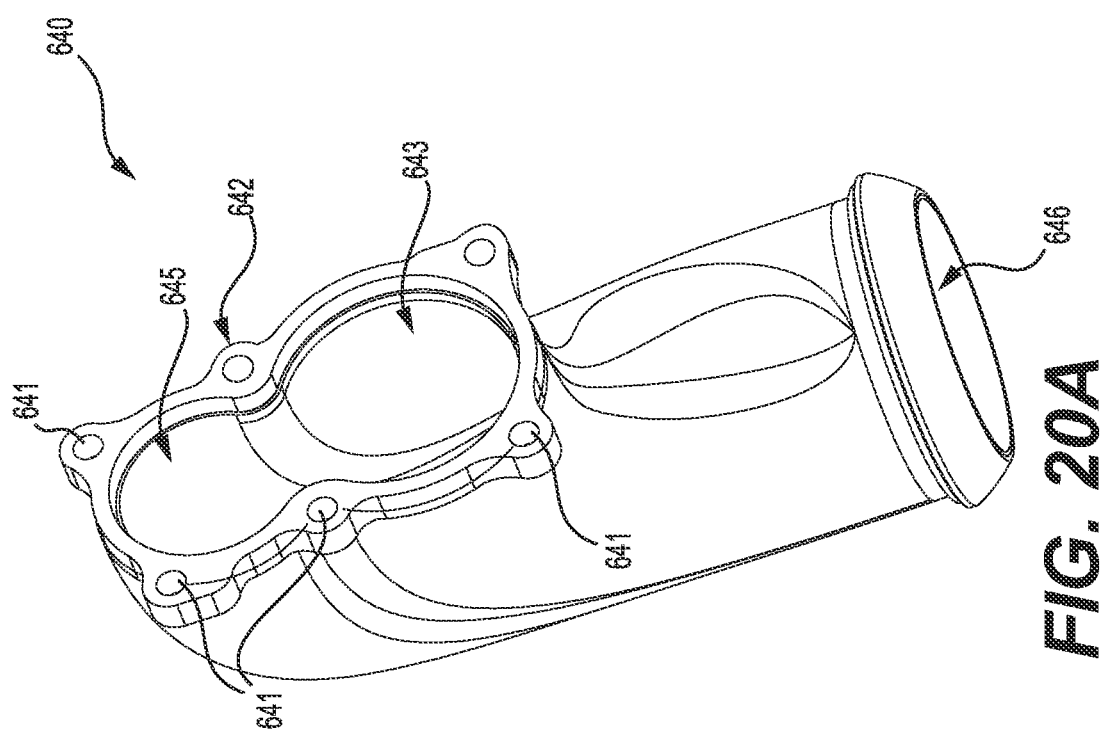

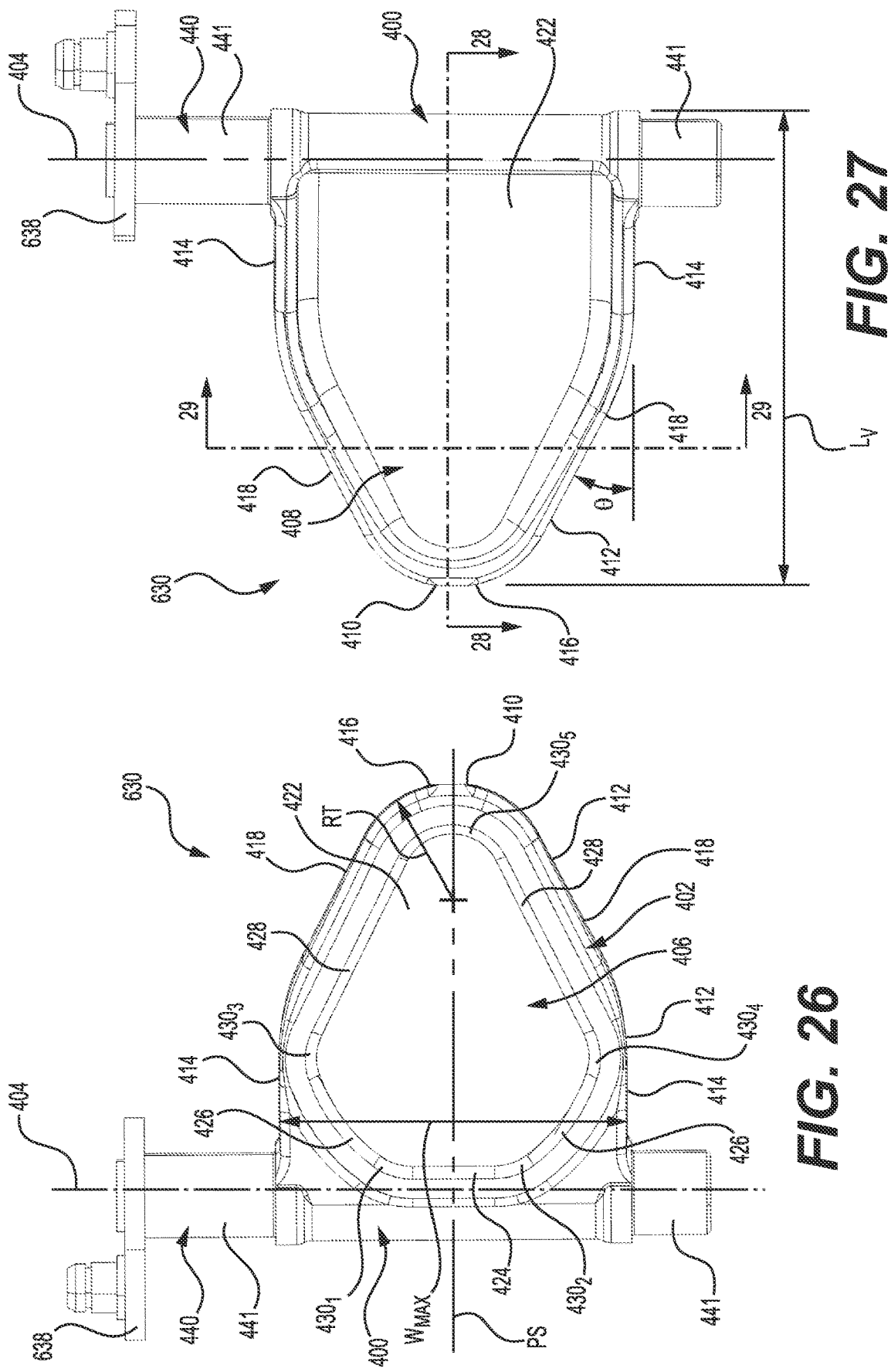

EXHAUST SYSTEM FOR AN ENGINE

CROSS-REFERENCE

The present application is a continuation-in-part of International Patent Application No. PCT/IB2019/054501, filed on May 30, 2019, which claims priority from U.S. Provisional Patent Application No. 62/678,922, filed on May 31, 2018, and from U.S. Provisional Patent Application No. 62/783,576, filed on Dec. 21, 2018. The present application also claims priority from U.S. Provisional Patent Application No. 62/958,787, filed on Jan. 9, 2020. The entirety of each of the above-mentioned documents is incorporated by reference herein.

FIELD OF THE TECHNOLOGY

The present technology relates to engine exhaust systems.

BACKGROUND

For internal combustion engines, such as those used in snowmobiles, the efficiency of the combustion process can be increased by compressing the air entering the engine. This can be accomplished using a turbocharger connected to the air intake and exhaust systems of the snowmobiles. The compression of the air by the turbocharger may be of particular importance when the internal combustion engine is operated in environments where atmospheric pressure is low or when the air gets thinner.

The efficiency and the performance of some engines, especially two-stroke engines, may however be hindered in certain circumstances by the presence of a turbocharger because of an increased amount of back pressure caused by the turbocharger. Two-stroke engines tend to be especially sensitive to non-optimal levels of back pressure.

There is thus a need for exhaust systems for internal combustion engines that can benefit from the addition of a turbocharger while overcoming some of the previously known disadvantages of incorporating a turbocharger, including for example back pressure-related issues.

SUMMARY

It is an object of the present technology to ameliorate at least some of the inconveniences present in the prior art.

According to one aspect of the present technology, there is provided a snowmobile including an exhaust system which has a turbocharger and a valve controlling the flow of exhaust gas into the turbocharger. The valve, disposed in a conduit integrally connected or fastened to the turbocharger housing, directs the exhaust gas into the exhaust turbine of the turbocharger and/or allows exhaust gas through the bypass conduit (bypassing the turbocharger). The back pressure flowing into the turbocharger is generally higher than the pressure for entry of the exhaust gas entering the bypass such that the exhaust will generally flow into the bypass, bypassing the turbocharger, when the valve is opened. The exhaust pipe fluidly connected to the engine, the bypass conduit, and an exhaust collector fluidly connected to a muffler are all generally aligned, such that exhaust gas bypassing the exhaust turbine flows generally freely to minimize back pressure.

The present technology also provides methods for controlling the flow of exhaust gas through the exhaust system, in order to provide additional air (and power) to the engine through use of the turbocharger in certain scenarios. The methods also provide for balance between rapidly providing the additional power and creating lag in the power increase through the creation of back pressure. The position of the valve, controlling flow into or bypassing the turbocharger, is adjustable to send more or less exhaust gas into the turbocharger, depending on various parameters, in order to both increase air into the engine and to limit the detrimental effects of increased back pressure on engine performance. The valve divides the exhaust flow into two passages having different restriction levels (high back-pressure in turbo passage; low back-pressure in turbo by-pass). Optimal control of the valve position provides optimization of the back-pressure to get maximum engine air charging for increased power. This condition is normally only created with more time in a 2-strokes engines by the exhaust gas temperature warming up the tuned pipe. A improved engine response on then obtained. At the same time, having a portion of the exhaust gas flowing through the turbocharger, even when the turbocharger is not in use, allows a rapid shift of the exhaust gas into the turbine inlet upon closure of the valve, in turn causing a rapid spool-up of the turbocharger, reducing turbo lag. The result of this valve control can improve response time and power of two-stroke engines, diminish the impact of turbo back pressure and keep turbo lag at a minimum.

According to one aspect of the present technology, there is provided a snowmobile including a frame; at least one ski connected to the frame; an engine supported by the frame, the engine having an engine air inlet and an exhaust outlet; an exhaust pipe fluidly connected to the exhaust outlet of the engine; a turbocharger fluidly connected to the exhaust pipe, the turbocharger including: an exhaust turbine, and a housing the exhaust turbine; a bypass conduit disposed upstream of the housing and fluidly communicating with the housing, the bypass conduit including an exhaust inlet fluidly connected to the exhaust pipe; a valve disposed in the bypass conduit for selectively controlling the flow of exhaust gas through the turbocharger, the valve being selectively movable between at least a first position and a second position; and an exhaust collector fluidly connected to the turbine housing and the bypass conduit for receiving a flow of exhaust gas therefrom, a first exhaust flow path being defined from the exhaust inlet to the exhaust collector, exhaust gas flowing along the first exhaust flow path passing through the exhaust inlet, then through the bypass conduit, and then into the exhaust collector, a second exhaust flow path being defined from the exhaust inlet to the exhaust collector, exhaust gas flowing along the second exhaust flow path passing through the exhaust inlet, then through the bypass conduit, then through the exhaust turbine, and then into the exhaust collector, in the first position of the valve, at least a majority of the exhaust gas flowing along the first exhaust flow path, in the second position of the valve, at least a majority of the exhaust gas flowing along the second exhaust flow path.

In some implementations, the valve is selectively moved to the second position when the engine is operated below a threshold atmospheric pressure.

In some implementations, the valve is further selectively movable to at least one intermediate position between the first and second positions; and in the at least one intermediate position, the exhaust gas flows along both of the first exhaust flow path and the second exhaust flow path.

In some implementations, the turbocharger further includes an air compressor fluidly connected to the engine air inlet; and the snowmobile further includes an air intake system fluidly connecting atmosphere to the engine, the air intake system including: the air compressor, and the engine air inlet.

In some implementations, the exhaust collector includes a single collector outlet; and the snowmobile further includes a muffler fluidly connected to the collector outlet, the muffler receiving the exhaust gas from both the first exhaust flow path and second exhaust flow path via the collector outlet.

In some implementations, the exhaust collector includes a collector outlet; and the snowmobile further includes a muffler fluidly connected to the collector outlet, the muffler having a single muffler inlet for receiving exhaust gas from both the first exhaust flow path and second exhaust flow path via the collector outlet.

In some implementations, the exhaust collector includes: at least one inlet for receiving exhaust gas flow, the at least one inlet including: a first portion for receiving exhaust gas flowing along the first exhaust flow path; and a second portion for receiving exhaust gas flowing along the second exhaust flow path, the first portion and the second portion being integrally connected.

In some implementations, the engine includes: a throttle valve, and a throttle valve position sensor operatively connected to the throttle valve; and the valve is selectively moved based at least on a throttle valve position determined by the throttle valve position sensor.

In some implementations, the engine includes: a throttle valve, and a throttle valve position sensor operatively connected to the throttle valve; and the valve is selectively moved based at least on a rate of change of a throttle valve position, the rate of change being determined by the throttle valve position sensor.

In some implementations, the bypass conduit includes a passage through which exhaust gas flows when flowing along the first exhaust flow path; the exhaust turbine has a turbine inlet through which exhaust gas flows when flowing along the second exhaust flow path; and a cross-sectional area of the passage is larger than a cross-sectional area of the turbine inlet of the turbocharger.

In some implementations, a change of direction of exhaust gas flowing from an outlet of the exhaust pipe along the second exhaust flow path is greater than for exhaust gas flowing from the outlet of the exhaust pipe along the first exhaust flow path bypassing the exhaust turbine.

According to another aspect of the present technology, there is provided a method of supplying a fuel-air mixture in an engine of a vehicle. The method includes determining a pressure differential between an intake air pressure of air flowing toward the engine and an exhaust gas pressure of exhaust gas flowing out of the engine; determining, based on at least the pressure differential, an amount of fuel to be injected into the engine; and injecting the amount of fuel into the engine.

In some implementations, determining the pressure differential comprises: determining the intake air pressure; and determining the exhaust gas pressure.

In some implementations, the method further includes determining an engine speed; and wherein the amount of fuel to be injected is further determined based on the engine speed.

In some implementations, the method further includes determining a throttle position; and wherein the amount of fuel to be injected is further determined based on the throttle position.

In some implementations, the method further includes determining a changed pressure differential; determining, based on at least the changed pressure differential, a revised amount of fuel to be injected into the engine; and injecting the revised amount of fuel into the engine.

In some implementations, the method further includes determining that the pressure differential has increased; determining, based on at least the pressure differential having increased, a reduced amount of fuel to be injected into the engine; and injecting the reduced amount of fuel into the engine.

In some implementations, the method further includes determining that the pressure differential has decreased; determining, based on at least the pressure differential having decreased, a reduced amount of fuel to be injected into the engine; and injecting the reduced amount of fuel into the engine.

According to another aspect of the present technology, there is provided a snowmobile including a frame; at least one ski connected to the frame; an engine supported by the frame, the engine having an engine exhaust outlet; a turbocharger fluidly connected to the engine exhaust outlet; an oil reservoir fluidly connected to the turbocharger; and an oil pump fluidly connected between the oil reservoir and the turbocharger, the oil pump supplying oil from the oil reservoir to the turbocharger, the turbocharger being fluidly connected to the engine for supplying oil from the turbocharger to the engine.

In some implementations, the oil pump additionally supplies oil from the oil reservoir to the engine.

In some implementations, the oil pump is a first oil pump; and further including a second oil pump fluidly connected between the turbocharger and the engine, the second oil pump supplying oil from the turbocharger to the engine.

In some implementations, the first oil pump additionally supplies oil from the oil reservoir to the engine.

In some implementations, the engine includes at least one exhaust valve; the first oil pump supplies oil from the oil reservoir to the at least one exhaust valve and to the turbocharger; and the second oil pump supplies oil from the turbocharger to the at least one exhaust valve.

In some implementations, the engine includes a crankshaft; and the first oil pump additionally supplies oil from the oil reservoir to the crankshaft.

In some implementations, the first oil pump comprises four outlet ports; two of the four outlet ports supply oil to the crankshaft; one of the four outlet ports supply oil to the at least one exhaust valve; and one of the four outlet ports supply oil to the turbocharger.

In another aspect of the present technology, there is provided a snowmobile including a frame; at least one ski connected to the frame; an engine supported by the frame, the engine having an engine air inlet and an exhaust outlet; an exhaust pipe fluidly connected to the exhaust outlet of the engine; a turbocharger fluidly connected to the exhaust pipe, the turbocharger including an exhaust turbine, and a housing the exhaust turbine; a bypass conduit disposed upstream of the housing and fluidly communicating with the housing, the bypass conduit being fluidly connected to an outlet of the exhaust pipe; a valve disposed in the bypass conduit for selectively controlling the flow of exhaust gas through the turbocharger by selectively closing a bypass passage within the bypass conduit, the valve having at least a bypass position for opening the bypass passage and directing exhaust gas to bypass the exhaust turbine; and an exhaust collector fluidly connected to the bypass conduit for receiving a flow of exhaust gas therefrom, at least a portion of an inlet of the exhaust collector being contained within a projection of the outlet of the exhaust pipe, the projection being taken along an axis normal to the outlet of the exhaust pipe.

According to yet another aspect of the present technology, there is provided a turbocharger assembly for fluidly connecting to an exhaust pipe. The assembly includes a turbocharger including: an exhaust turbine, and a housing the exhaust turbine; and a bypass conduit disposed upstream of the housing and fluidly communicating with the housing, the bypass conduit including: a conduit inlet for receiving exhaust gas from the exhaust pipe, the conduit inlet being defined by the bypass conduit, the conduit inlet defining a flow axis through a center of the conduit inlet, the exhaust gas flowing into the conduit inlet flowing generally parallel to the flow axis; a bypass passage defined by the bypass conduit, the bypass passage forming a fluid connection between the conduit inlet and a bypass outlet defined by the bypass conduit; a valve disposed in the bypass conduit for selectively controlling the flow of exhaust gas through the bypass passage, the valve being selectively movable between at least an open position and a closed position; and a turbocharger passage defined by the bypass conduit, the turbocharger passage forming a fluid connection between the conduit inlet and the exhaust turbine, the conduit inlet and an inlet of the bypass passage being at least partially aligned such that at least a portion of the exhaust gas entering the conduit inlet parallel to the flow axis flows unobstructed into the bypass passage when the valve is in the open position.

In some implementations, when the valve is in the closed position, at least a portion of the valve is contacted by the exhaust gas entering through the conduit inlet and flowing parallel to the flow axis.

In some implementations, when the valve is in a position intermediate the open position and the closed position, at least a portion of the valve is contacted by the exhaust gas entering through the conduit inlet and flowing parallel to the flow axis.

According to yet another aspect of the present technology, there is provided a conduit for fluidly connecting to a turbocharger housing. The conduit includes an inlet conduit portion for receiving exhaust gas from an exhaust pipe; an inlet defined by the inlet conduit portion, exhaust gas from the exhaust pipe entering the inlet conduit portion through the inlet, the inlet defining a central axis normal to the inlet and through a center of the inlet; a first outlet conduit portion; a second outlet conduit portion; and a flow divider disposed between the first outlet conduit portion and the second outlet conduit portion, the flow divider being disposed between the central axis and one of the first outlet conduit portion and the second outlet conduit portion.

In some implementations, the inlet conduit portion, the first outlet conduit portion, and the second outlet conduit portion are integrally connected; and the inlet conduit portion, the first outlet conduit portion, and the second outlet conduit portion form a generally Y-shaped conduit.

In some implementations, the inlet is a circle; and the central axis passes through the center of the circle.

In some implementations, the first outlet conduit portion is fluidly connected to a turbocharger disposed within the turbocharger housing; exhaust gas exiting the conduit through the second outlet conduit portion bypasses the turbocharger; and the flow divider is disposed between the central axis and the second outlet conduit portion.

In some implementations, the conduits further includes a valve disposed in the second outlet conduit portion; and wherein the valve is selectively movable between at least: a first position allowing exhaust gas to enter the second outlet conduit portion, and a second position blocking exhaust gas from entering the second outlet conduit portion.

According to yet another aspect of the present technology, there is provided a turbocharger assembly for fluidly connecting to an exhaust pipe. The assembly includes a turbocharger including: an exhaust turbine, a turbocharger inlet defined by the exhaust turbine, and a housing the exhaust turbine; and a bypass conduit disposed upstream of the housing and fluidly communicating with the housing, the bypass conduit including: a conduit inlet for receiving exhaust gas from the exhaust pipe; a bypass passage forming a fluid connection between the conduit inlet and a bypass outlet defined by the bypass conduit, the bypass passage including an opening; and a turbocharger passage forming a fluid connection between the conduit inlet and the turbocharger inlet, an area of the opening being between 0.75 and 1.25 times an area of the turbocharger inlet.

In some implementations, the area of the opening is greater than the area of the turbocharger inlet.

In some implementations, the area of the turbocharger inlet is greater than the area of the opening.

According to yet another aspect of the present technology, there is provided a method for controlling a flow of exhaust gas from an engine. The method includes determining a pressure; and moving, based at least on the pressure, a valve fluidly connected within an exhaust flow path: a first position such that at least a majority of the exhaust gas flows along a first exhaust flow path bypassing an exhaust turbine of a turbocharger; a second position such that at least a majority of the exhaust gas flows along a second exhaust flow path passing through the exhaust turbine; and at least one intermediate position between the first position and the second position, such that exhaust gas flows partially along the first exhaust flow path and partially along the second exhaust flow path.

In some implementations, determining the pressure includes determining a pressure differential; and determining the pressure differential includes: determining a predetermined boost pressure of air flowing into the engine, and determining an actual boost pressure of air flowing into the engine.

In some implementations, determining the actual boost pressure includes determining, by a first sensor, an intake air pressure of air flowing to the engine.

In some implementations, determining the predetermined boost pressure includes at least one of: determining a throttle lever position; and determining a rate of throttle valve opening.

In some implementations, determining the predetermined boost pressure includes at least one of: determining a throttle lever position; determining an engine speed; and determining a rate of throttle valve opening.

In some implementations, the method further includes determining that the difference between the predetermined boost pressure and the actual boost pressure is less than a difference threshold; based on the difference being less than the difference threshold, determining a desired valve position of the valve from a fine adjustment data set relating to fine adjustments to pressure, the fine adjustment data set providing the desired valve position for decreasing the difference between the predetermined boost pressure and the actual boost pressure, the fine adjustment data set being based at least one of throttle position and the engine speed; and moving, following determining the desired valve position, the valve toward the desired valve position.

In some implementations, determining the pressure includes determining a pressure differential; and further including determining that the pressure differential is greater than a difference threshold; determining, based on the pressure differential being greater than the difference threshold, a desired valve position of the valve from a coarse adjustment data set relating to coarse adjustments to pressure, the coarse adjustment data set providing the desired valve position for decreasing the difference between the requested boost pressure and the intake pressure, the coarse adjustment data set being based at least one of throttle position and the engine speed; and moving, following determining the desired valve position, the valve toward the desired valve position.

In some implementations, determining the pressure includes: determining, by a first sensor, an intake air pressure of air flowing to the engine, and determining, by a second sensor, an exhaust gas pressure of exhaust gas flowing out of the engine; and the method further includes: determining a predetermined pressure differential between the exhaust gas pressure and the intake air pressure; and determining that a difference between the pressure differential and the predetermined pressure differential is non-zero; and moving the valve based on at least the pressure includes moving the valve based at least on the difference being non-zero and moving the valve to one of: the second position; and the at least one intermediate position.

In some implementations, the predetermined pressure differential is determined based on throttle position and engine speed.

According to yet another aspect of the present technology, there is provided a method for controlling a flow of exhaust gas from an engine. The method includes determining, by a throttle position sensor, a throttle position; determining, by an engine sensor, an engine speed of the engine; moving, based at least on one of the throttle position and the engine speed, a valve fluidly connected between a turbocharger and the engine to one of: a first position such that at least a majority of the exhaust gas flows along a first exhaust flow path bypassing an exhaust turbine of the turbocharger; a second position such that at least a majority of the exhaust gas flows along a second exhaust flow path passing through the exhaust turbine; and at least one intermediate position between the first position and the second position, such that exhaust gas flows partially along the first exhaust flow path and partially along the second exhaust flow path.

In some implementations, moving the valve is based on at least one of the throttle position, the engine speed, and a temperature of an exhaust pipe operatively connected to the engine.

In some implementations, the method further includes determining a pressure differential by: determining a predetermined boost pressure of air flowing into the engine, the predetermined boost pressure is determined based at least on one of the throttle position and the engine speed, and determining an actual boost pressure of air flowing into the engine; and wherein moving the valve is further based on the pressure differential.

In some implementations, determining the actual boost pressure includes determining, by a first sensor, an intake air pressure of air flowing to the engine.

In some implementations, the method further includes determining a temperature of an exhaust pipe disposed upstream from the valve; and wherein moving the valve is further based on the temperature of the exhaust pipe.

In some implementations, the method further includes, prior to moving the valve: determining if the engine is operating at low altitude or high altitude; retrieving, upon determining the engine is operating at low altitude, a desired valve position from a low altitude data set; retrieving, upon determining the engine is operating at high altitude, a desired valve position from a high altitude data set; and wherein: moving the valve includes moving the valve to the desired position, the desired position being one of the first position, the second position, and the at least one intermediate position.

In some implementations, the method further includes determining if the engine is operating at low altitude or high altitude includes determining, by a first pressure sensor, an atmospheric pressure.

In some implementations, the method further includes determining, based at least on the throttle position and the engine speed, a threshold pressure differential of the engine; determining an actual pressure differential of the engine; determining that the actual pressure differential is greater than the threshold pressure differential; and moving, based at least on the actual pressure differential being greater than the threshold pressure differential, the valve toward the first position if the valve is one of the second position and the at least one intermediate position.

In some implementations, determining the actual pressure differential of the engine includes determining, by an exhaust pressure sensor, an exhaust pressure downstream of the engine; determining, by an air intake sensor, an air intake pressure upstream of the engine; and determining the difference of the exhaust pressure and the air intake pressure.

According to yet another aspect of the present technology, there is provided a method for controlling a flow of exhaust gas from an engine. The method includes determining that an exhaust gas pressure of air flowing out of the engine is above a threshold exhaust gas pressure, a valve fluidly connected between a turbocharger and the engine being in a first position such that at least a majority of the exhaust gas flows along a first exhaust flow path passing through an exhaust turbine of the turbocharger; and moving the valve, based at least on the exhaust gas pressure being above the threshold exhaust gas pressure, to one of: a second position such that at least a majority of the exhaust gas flows along a second exhaust flow path bypassing through the exhaust turbine; and at least one intermediate position between the first position and the second position, such that exhaust gas flows partially along the first exhaust flow path and partially along the second exhaust flow path.

For purposes of this application, terms related to spatial orientation such as forwardly, rearward, upwardly, downwardly, left, and right, are as they would normally be understood by a driver of the snowmobile sitting thereon in a normal riding position. Terms related to spatial orientation when describing or referring to components or sub-assemblies of the snowmobile, separately from the snowmobile, such as a heat exchanger for example, should be understood as they would be understood when these components or sub-assemblies are mounted to the snowmobile, unless specified otherwise in this application.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein. The explanations provided above regarding the above terms take precedence over explanations of these terms that may be found in any one of the documents incorporated herein by reference.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 20A is a left side elevation view of the exhaust collector of FIG. 12, shown in isolation;

FIG. 20B is a top, right side perspective view of the exhaust collector of FIG. 20A;

FIG. 26 is an elevation view of an upstream side of the valve of FIG. 14;

FIG. 27 is an elevation view of a downstream side of the valve of FIG. 26;

It should be noted that the Figures may not be drawn to scale, except where otherwise noted.

DETAILED DESCRIPTION

The present technology is described herein with respect to a snowmobile 10 having an internal combustion engine and two skis. However, it is contemplated that some aspects of the present technology may apply to other types of vehicles such as, but not limited to, snowmobiles with a single ski, road vehicles having two, three, or four wheels, off-road vehicles, all-terrain vehicles, side-by-side vehicles, and personal watercraft.

Figure 1:
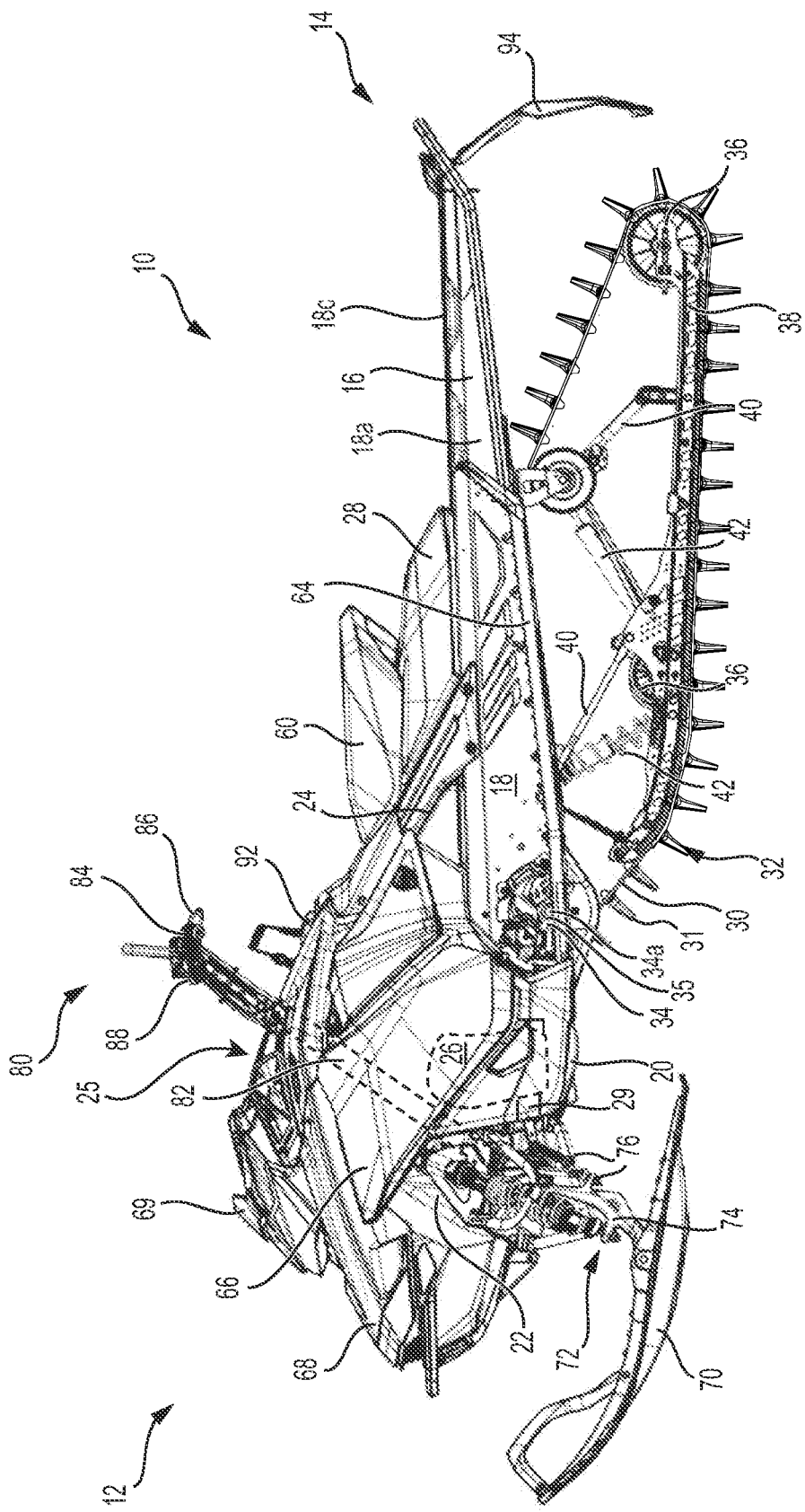
FIG. 1 is a left side elevation view of a snowmobile.
Figure 2:
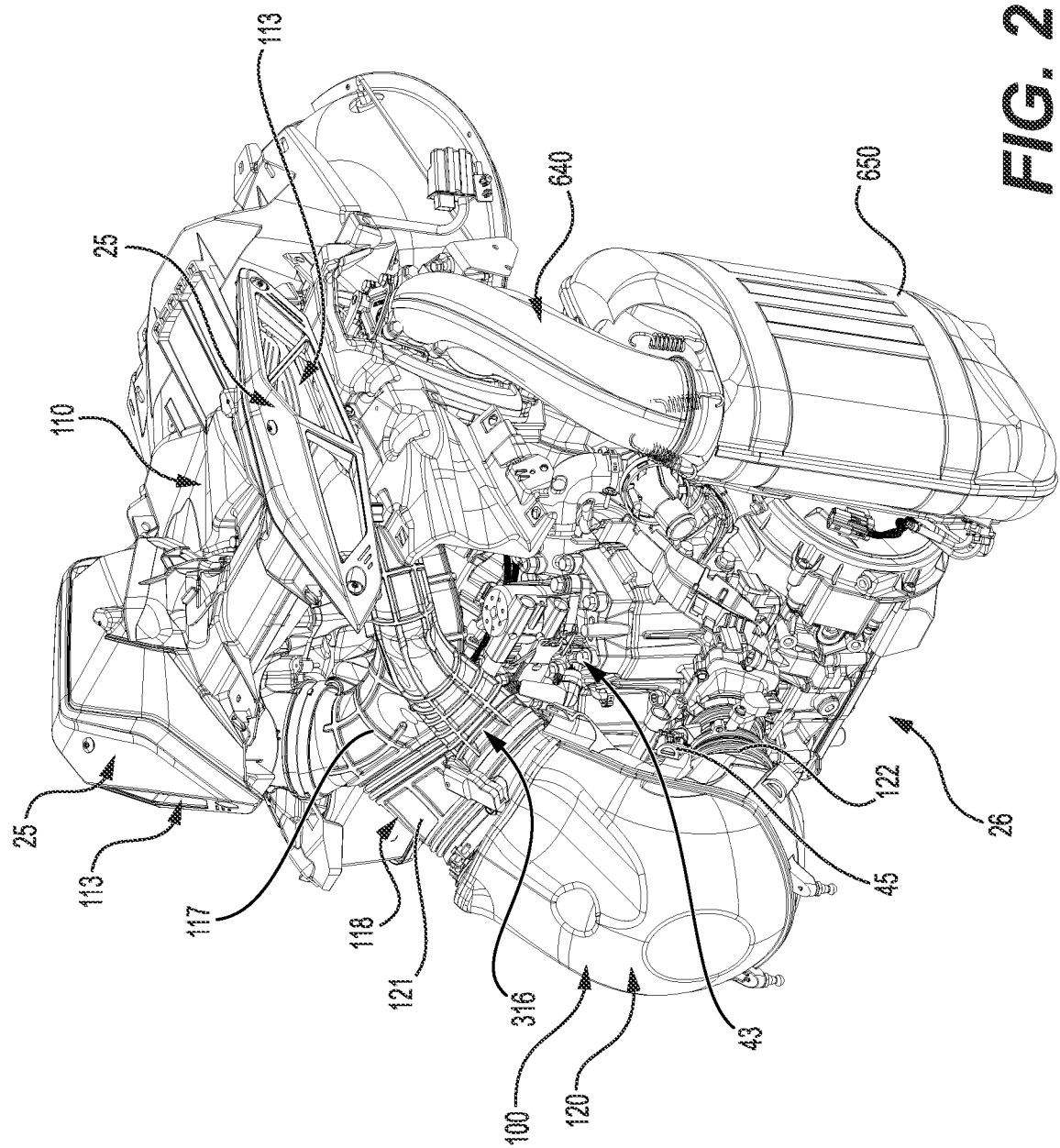
FIG. 2 is a top, rear, right side perspective view of an engine, air intake system and exhaust system of the snowmobile of FIG. 1.

With reference to FIGS. 1 and 2, a snowmobile 10 according to the present technology will be described. The snowmobile 10 includes a forward end 12 and a rearward end 14. The snowmobile 10 includes a vehicle body in the form of a frame or chassis 16 which includes a tunnel 18, an engine cradle portion 20, a front suspension module 22 and an upper structure 24.

An internal combustion engine 26 is carried in an engine compartment defined in part by the engine cradle portion 20 of the frame 16. A fuel tank 28, supported above the tunnel 18, supplies fuel to the engine 26 for its operation. The engine 26 receives air from an air intake system 100. The engine 26 and the air intake system 100 are described in more detail below.

An endless drive track 30 is positioned at the rear end 14 of the snowmobile 10. The drive track 30 is disposed generally under the tunnel 18, and is operatively connected to the engine 26 through a belt transmission system and a reduction drive. The endless drive track 30 is driven to run about a rear suspension assembly 32 operatively connected to the tunnel 18 for propulsion of the snowmobile 10. The endless drive track 30 has a plurality of lugs 31 extending from an outer surface thereof to provide traction to the track 30.

Figure 3:
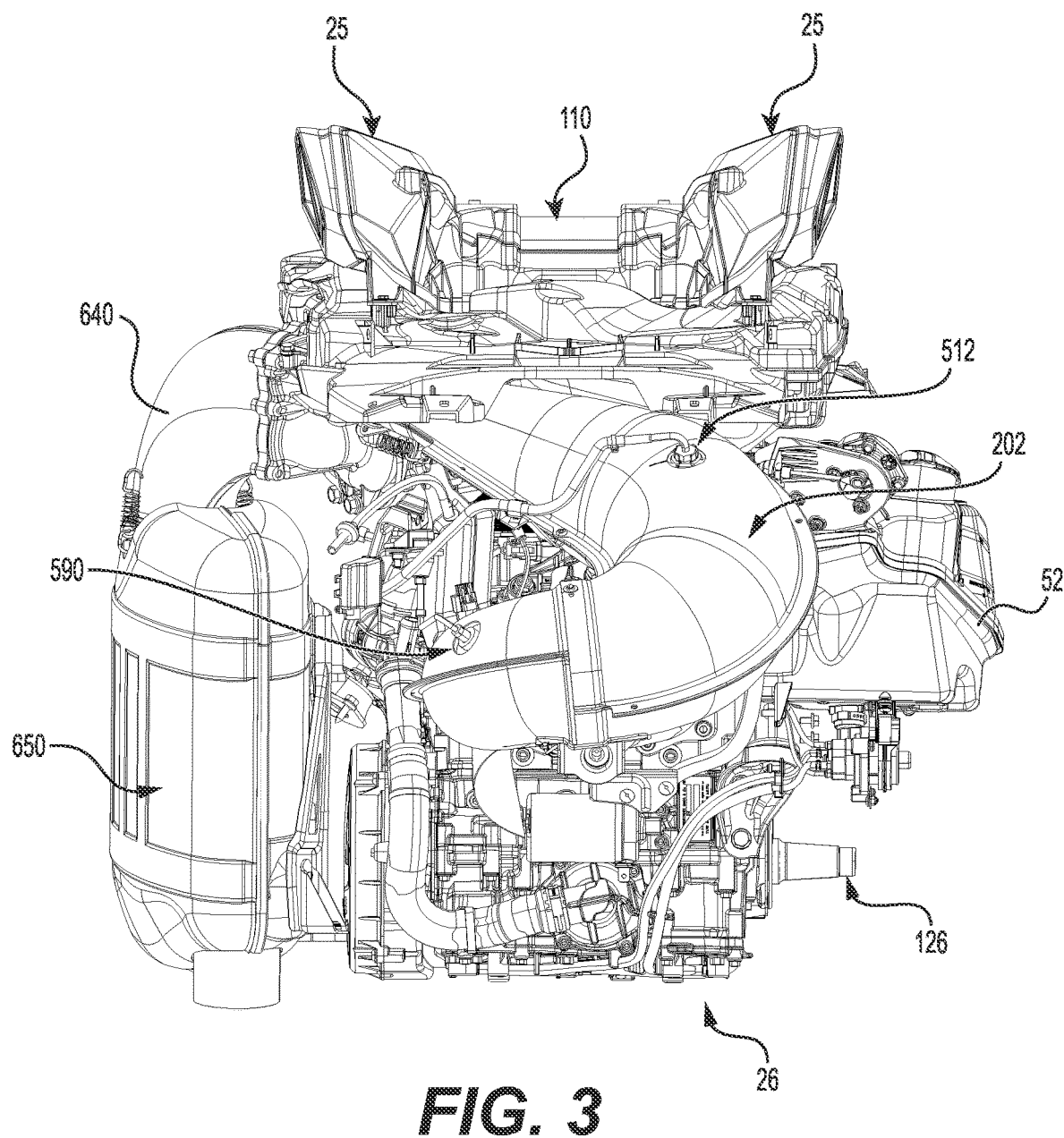
FIG. 3 is a front elevation view of the engine, air intake system and exhaust system of FIG. 2.

The rear suspension assembly 32 includes drive sprockets 34, idler wheels 36 and a pair of slide rails 38 in sliding contact with the endless drive track 30. The drive sprockets 34 are mounted on an axle 35 and define a sprocket axis 34a. The axle 35 is operatively connected to a crankshaft 126 (see FIG. 3) of the engine 26. The slide rails 38 are attached to the tunnel 18 by front and rear suspension arms 40 and shock absorbers 42. It is contemplated that the snowmobile 10 could be provided with a different implementation of a rear suspension assembly 32 than the one shown herein.

A straddle seat 60 is positioned atop the fuel tank 28. A fuel tank filler opening covered by a cap 92 is disposed on the upper surface of the fuel tank 28 in front of the seat 60. It is contemplated that the fuel tank filler opening could be disposed elsewhere on the fuel tank 28. The seat 60 is adapted to accommodate a driver of the snowmobile 10. The seat 60 could also be configured to accommodate a passenger. A footrest 64 is positioned on each side of the snowmobile 10 below the seat 60 to accommodate the driver's feet.

At the front end 12 of the snowmobile 10, fairings 66 enclose the engine 26 and the belt transmission system, thereby providing an external shell that not only protects the engine 26 and the transmission system, but can also make the snowmobile 10 more aesthetically pleasing. The fairings 66 include a hood 68 and one or more side panels which can be opened to allow access to the engine 26. A windshield 69 connected to the fairings 66 acts as a wind screen to lessen the force of the air on the rider while the snowmobile 10 is moving.

Two skis 70 positioned at the forward end 12 of the snowmobile 10 are attached to the front suspension module 22 of the frame 16 through a front suspension assembly 72. The front suspension module 22 is connected to the front end of the engine cradle portion 20. The front suspension assembly 72 includes ski legs 74, supporting arms 76 and ball joints (not shown) for operatively connecting to the respective ski leg 74, supporting arms 76 and a steering column 82 (schematically illustrated).

A steering assembly 80, including the steering column 82 and a handlebar 84, is provided generally forward of the seat 60. The steering column 82 is rotatably connected to the frame 16. The lower end of the steering column 82 is connected to the ski legs 74 via steering rods (not shown). The handlebar 84 is attached to the upper end of the steering column 82. The handlebar 84 is positioned in front of the seat 60. The handlebar 84 is used to rotate the steering column 82, and thereby the skis 70, in order to steer the snowmobile 10. A throttle operator 86 in the form of a thumb-actuated throttle lever is mounted to the right side of the handlebar 84. Other types of throttle operators, such as a finger-actuated throttle lever and a twist grip, are also contemplated. A brake actuator 88, in the form of a hand brake lever, is provided on the left side of the handlebar 84 for braking the snowmobile 10 in a known manner. It is contemplated that the windshield 69 could be connected directly to the handlebar 84.

At the rear end of the snowmobile 10, a snow flap 94 extends downward from the rear end of the tunnel 18. The snow flap 94 protects against dirt and snow that can be projected upward from the drive track 30 when the snowmobile 10 is being propelled by the moving drive track 30. It is contemplated that the snow flap 94 could be omitted.

The snowmobile 10 includes other components such as a display cluster, and the like. As it is believed that these components would be readily recognized by one of ordinary skill in the art, further explanation and description of these components will not be provided herein.

With additional reference to FIGS. 2 to 6, the engine 26 and the air intake system 100 will be described in more detail. Air from the atmosphere surrounding the snowmobile 10 flows through side apertures 113 defined in an upper portion 25 of the upper structure 24 of the chassis 16. The air then flows into a secondary airbox 110. The secondary airbox 110 is disposed above the front suspension module 22. A generally Y-shaped conduit 118 (FIG. 2) fluidly connects the secondary airbox 110, via a conduit portion 117, to a compressor inlet 312 of an air compressor 310 (FIG. 5) disposed on the right side of the engine 26. The conduit 118 further fluidly connects to an inlet 119 of a primary airbox 120 via a conduit portion 121. The inlet 119 is defined by a main inlet member 210 of the primary airbox 120. The main inlet member 210 is connected to a body of the primary airbox 120 in part by various tabs 213 (FIG. 37) disposed along a periphery of the main inlet member 210 The primary airbox 120 includes a bypass valve 123 (see FIGS. 35, 36 and 37 to 40) controlling air flow through the inlet 119 into the primary airbox 120. As will be described in greater detail below, the bypass valve 123 is mounted to the main inlet member 210 of the primary airbox 120. It is contemplated that the secondary airbox 110 could be omitted and that air from the atmosphere could directly enter into the inlet 312 and/or the inlet 119 of the primary airbox 120 without going through the secondary airbox 110.

Figure 35:
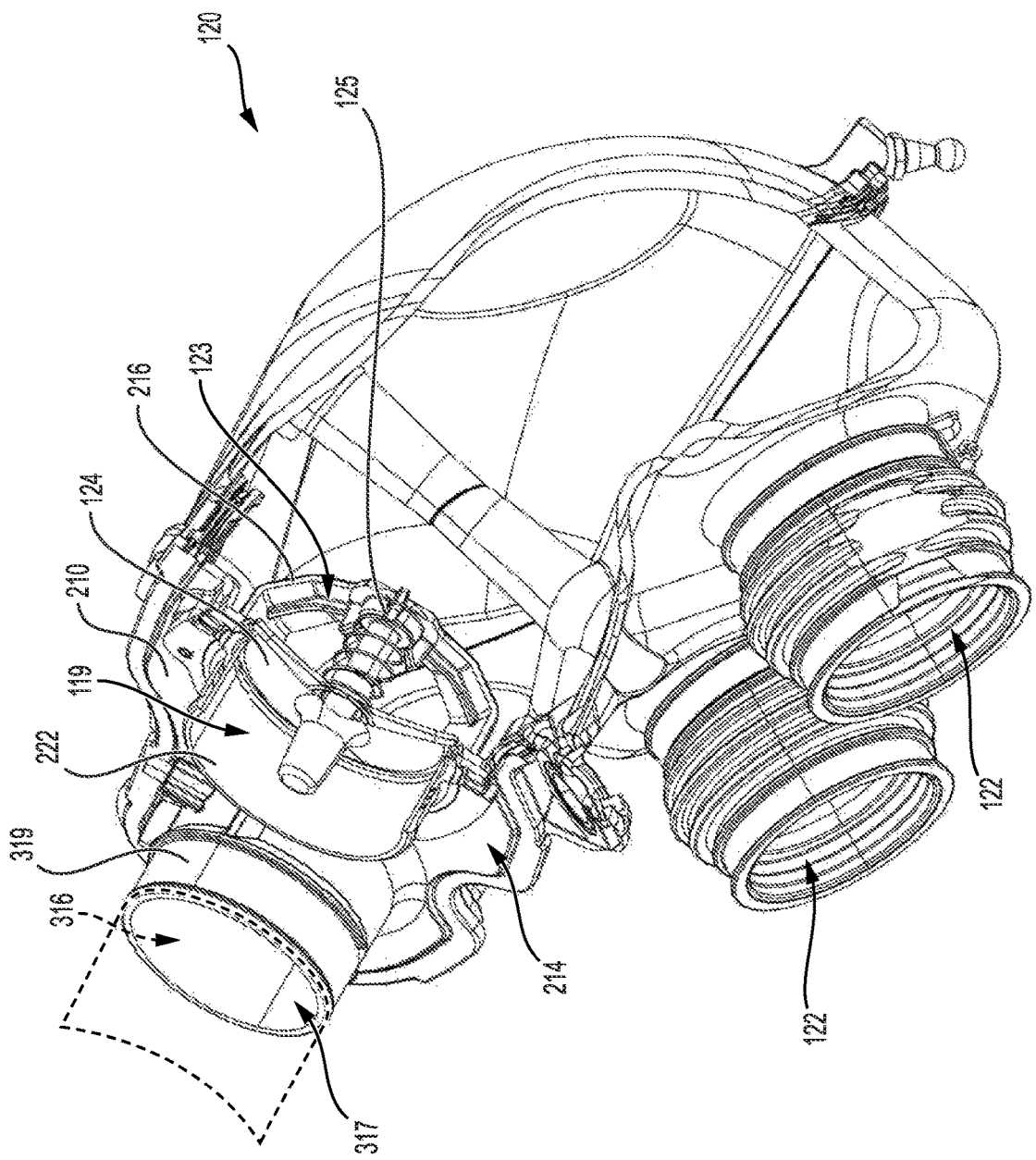
FIG. 35 is a partial cut-away view of an airbox of the air intake system of FIG. 2, with a portion of a left side of the airbox having been removed.
Figure 36:
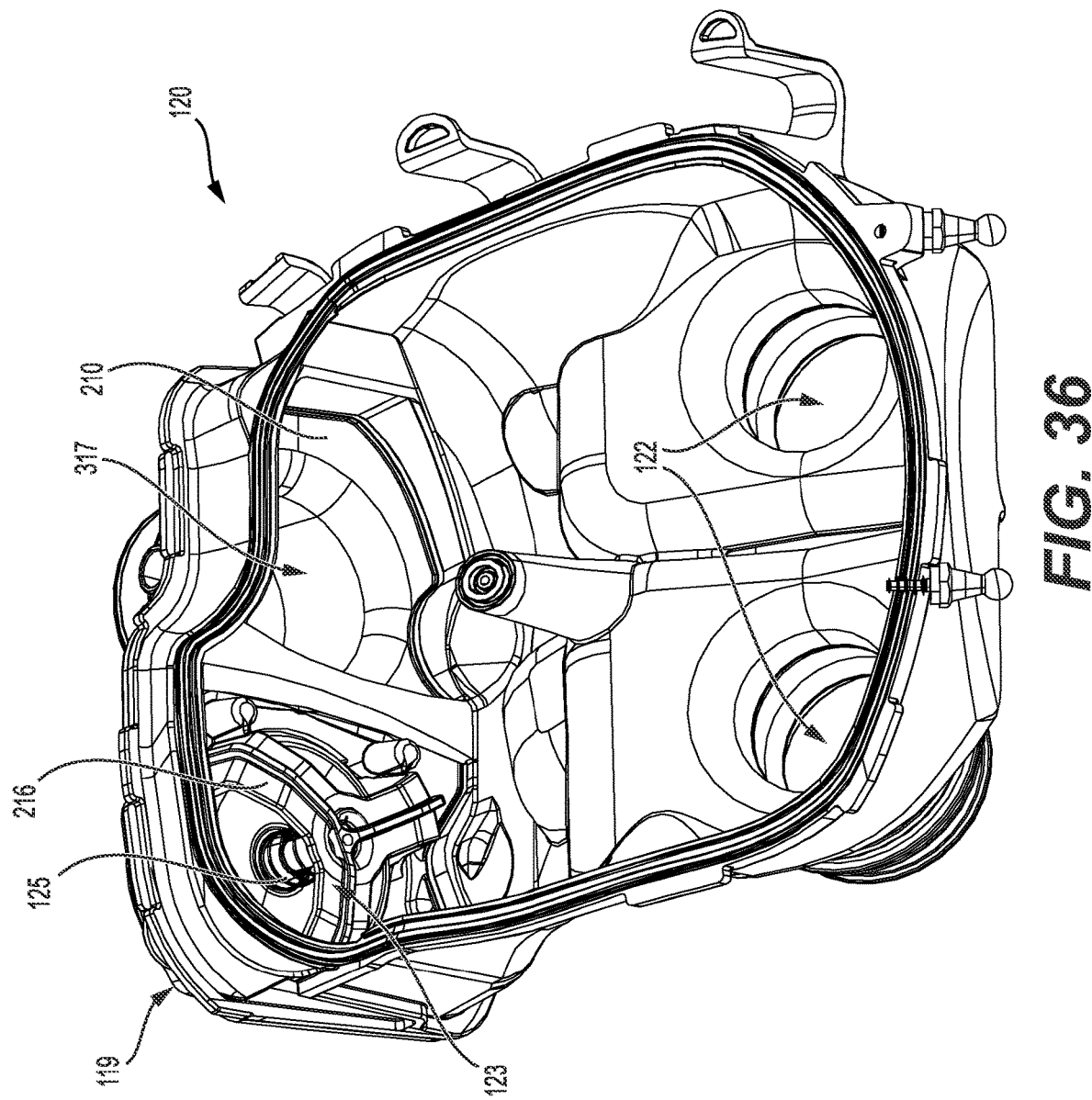
FIG. 36 is a partial cut-away view of the airbox of FIG. 35, with a portion of a rear side of the airbox having been removed.
Figure 37:
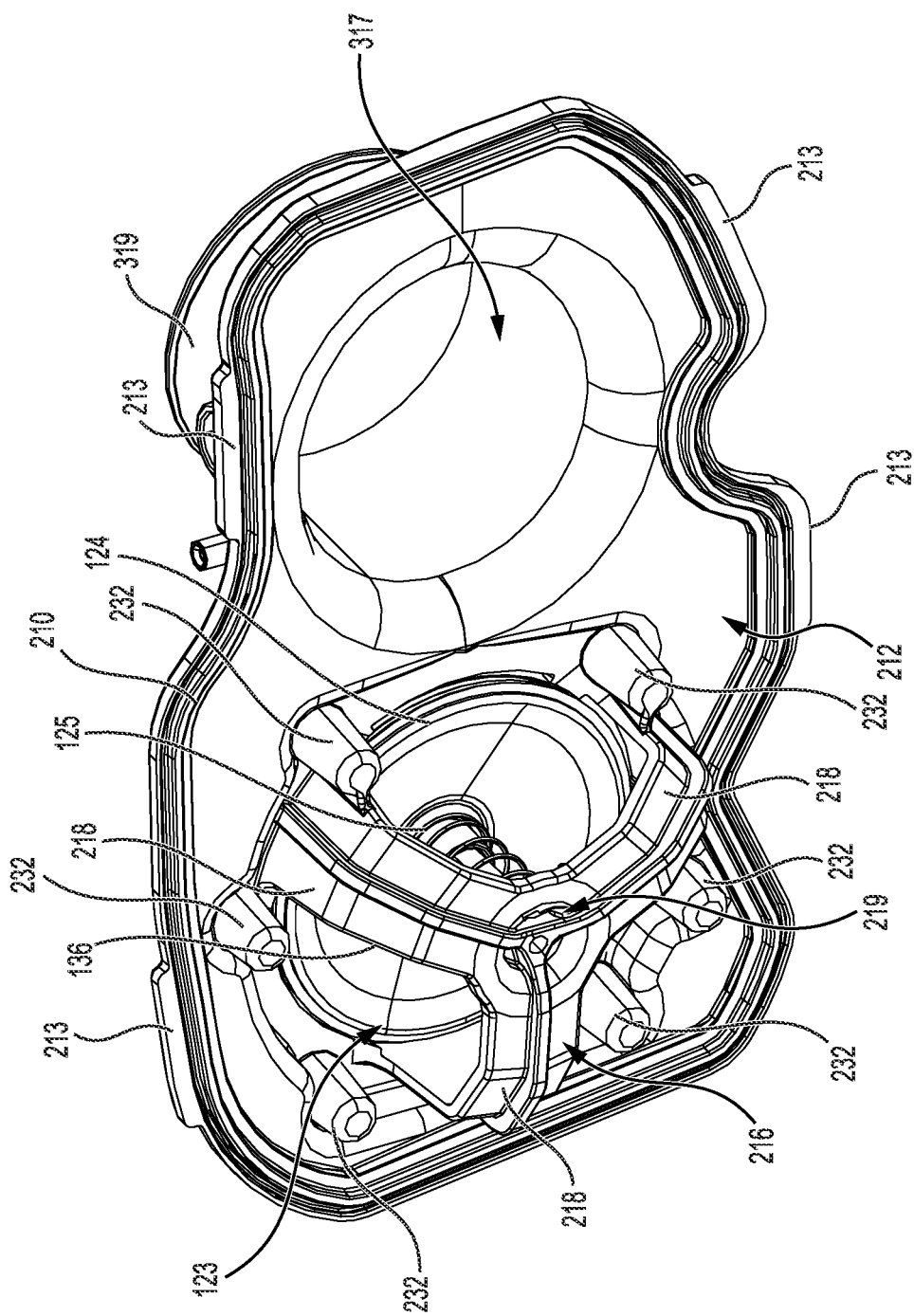
FIG. 37 is a perspective view of a main inlet member of the airbox of FIG. 35, showing a bypass valve of the airbox in a closed state.
Figure 41:
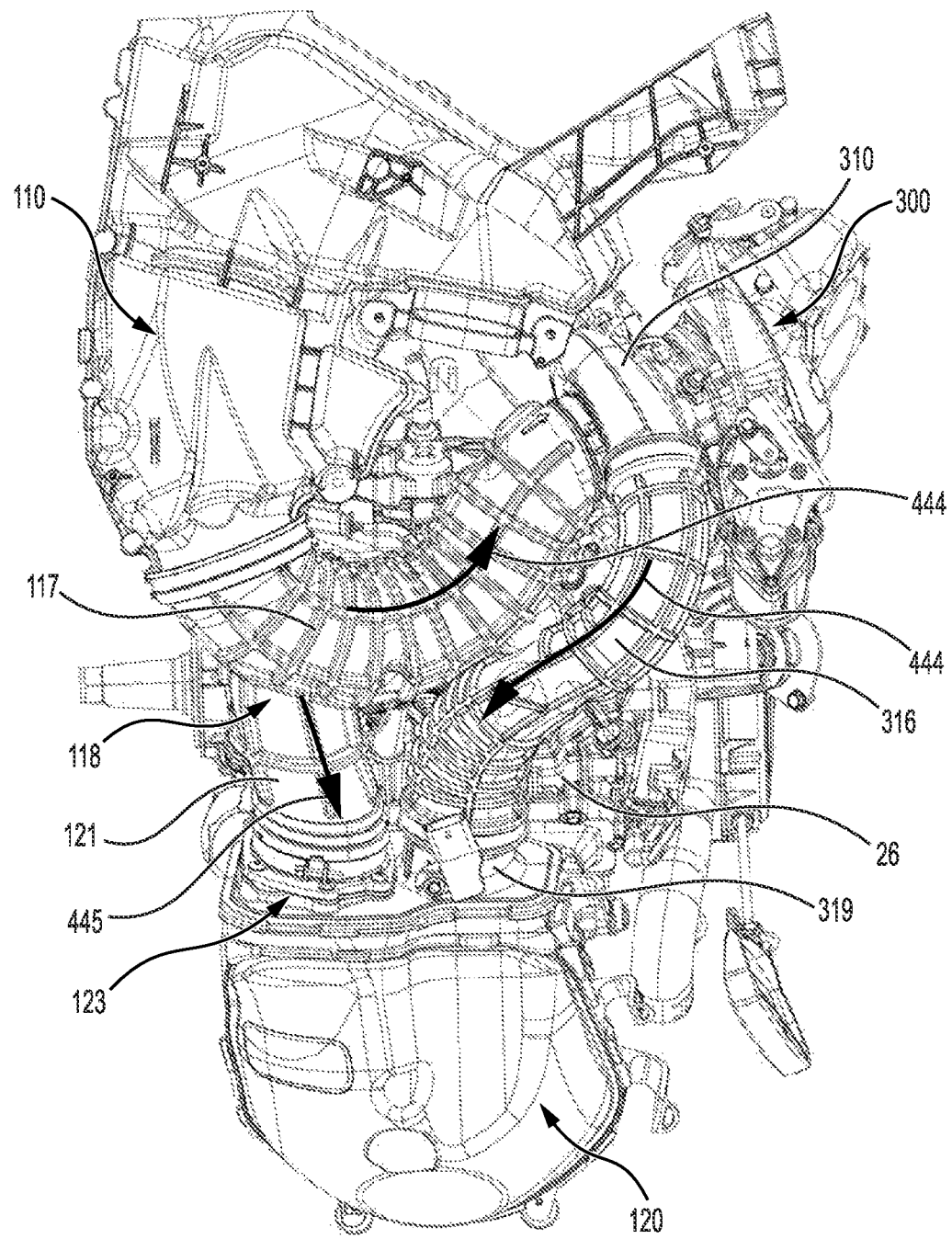
FIG. 41 is a rear elevation view of the engine and air intake system of FIG. 2, showing two different intake air flow paths.

Air from the environment entering the snowmobile 10, passing through the air compressor 310, and flowing into the engine 26 generally follows an intake air flow path 444, illustrated schematically in FIG. 41. Air from the atmosphere, passing through the secondary airbox 110 and into the air compressor 310 via the conduit 118 and inlet 312, is compressed by the air compressor 310. The compressed air then flows out of the air compressor 310 through an outlet 314, into a conduit 316 and into an inlet 317 (FIG. 35) of the primary airbox 120. As shown in FIG. 35, the inlet 317 is defined by an inlet projection 319 of the main inlet member 210 of the primary airbox 120. As can be seen in FIGS. 35 and 37, the openings forming the inlets 119, 317 of the primary airbox 120 are oriented such that their respective central axes extend parallel to one another. The primary airbox 120 is fluidly connected to the engine 26 via two air outlets 122 of the primary airbox 120 (see also FIG. 10).

The bypass valve 123 of the primary airbox 120 is spring-loaded to a closed position, such that air is preferentially received from the air compressor 310 via the conduit 316. When the air pressure within the primary airbox 120 falls below a threshold value, for example when the engine 26 is rotating at a speed that requires more air than is available in the primary airbox 120, the bypass valve 123 opens to allow air from the atmosphere, via the secondary airbox 110, to enter the primary airbox 120 directly. In some situations, this can aid in obtaining optimal operation of the engine 26, especially when the turbocharger 300 is spooling and not supplying the necessary air flow to the primary airbox 120 for the air being requested by the engine 26.

Figure 38:
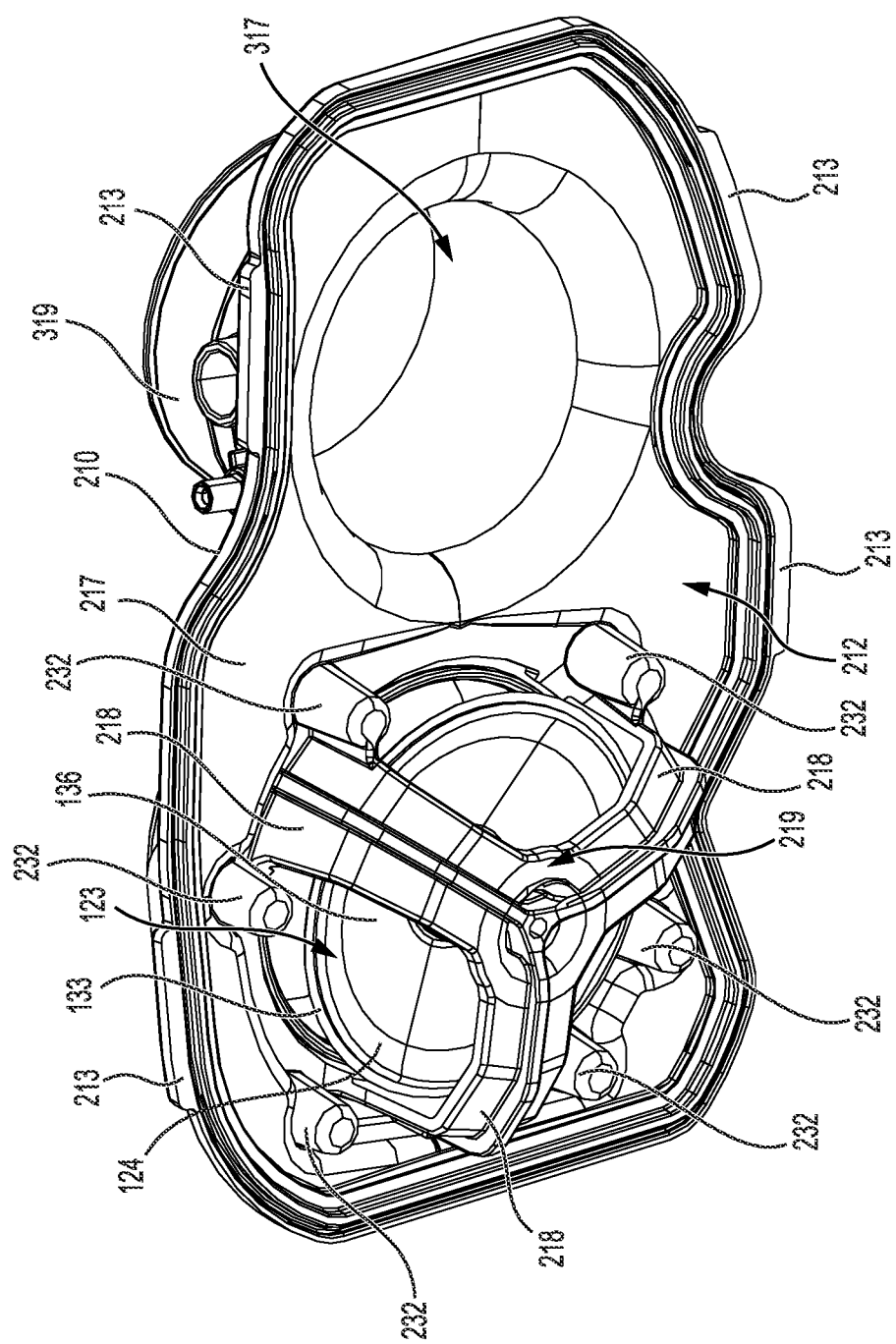
FIG. 38 is a perspective view of the main inlet member of the airbox of FIG. 37, showing the bypass valve in an open state.
Figure 39:
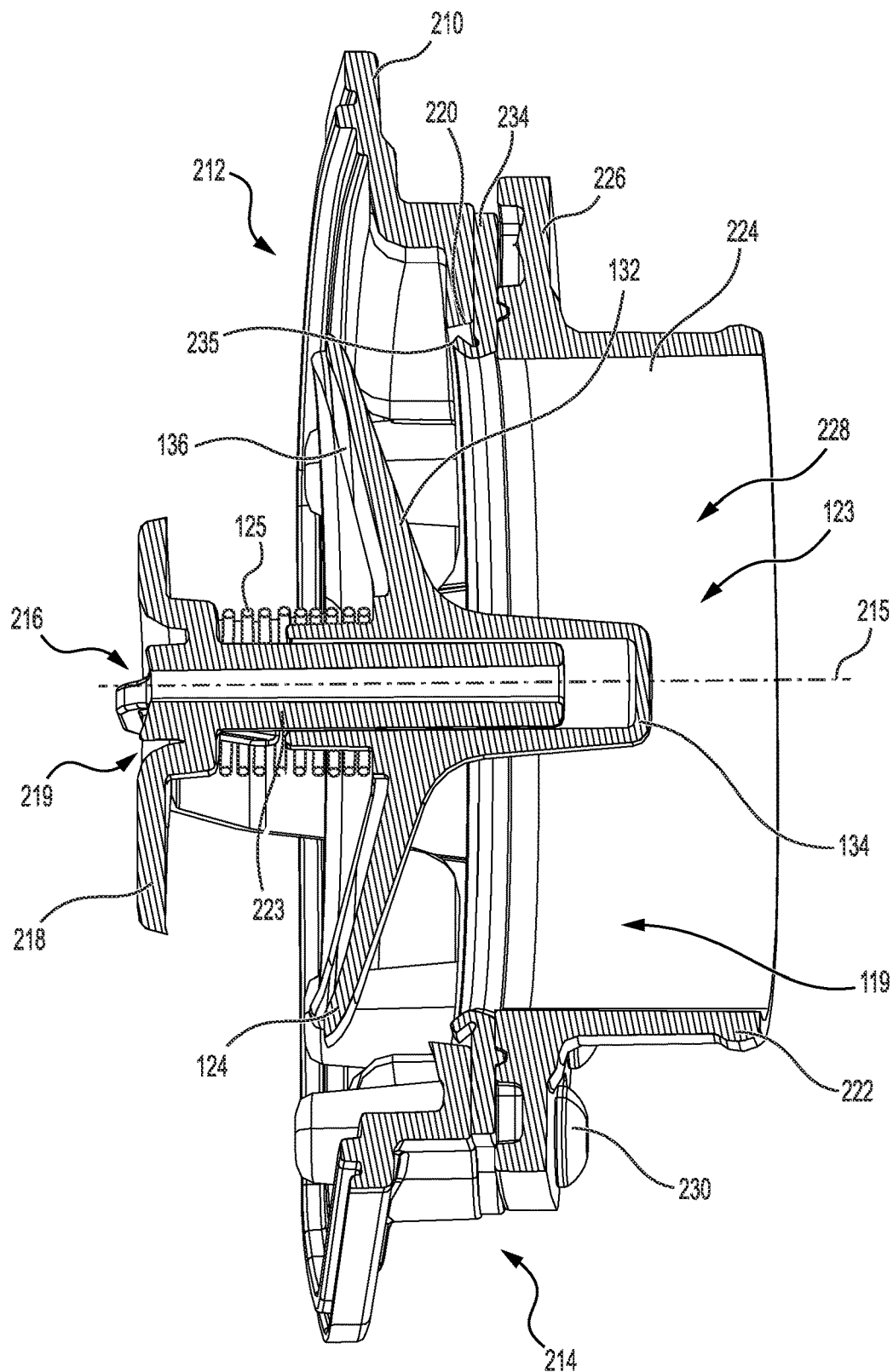
FIG. 39 is a cross-sectional view of the main inlet member and the bypass valve of FIG. 38.

With reference to FIGS. 35 to 40, the bypass valve 123 has a valve body 124 that is movable between closed and open positions to respectively close and open the inlet 119 of the primary airbox 120. As shown in FIG. 39, the valve body 124 has a conical portion 132 and a hollow stem portion 134 extending from the conical portion 132. The conical portion 132 has a round periphery 133 to match the round shape of the inlet 119. In this embodiment, the valve body 124 is made of a composite material, and in particular a polymeric composite material. Notably, the material of the valve body 124 is a fiber-reinforced polymer. Specifically, in this embodiment, the valve body 124 is made of a polypropylene and fibers embedded therein. A valve safety member 136 is connected to the valve body 124 to prevent pieces of the valve body 124 from flowing into the engine 26 in case the valve body 124 were to break or chip during operation. The valve safety member 136 is disposed on an inner side of the valve body 124 (i.e., the side of the valve body 124 facing inwardly into the primary airbox 120), and specifically is mated to the conical portion 132 of the valve body 124. Notably, the safety member 136 is overmolded onto the conical portion 132 of the valve body 124. In this embodiment, the valve safety member 136 is made of a thermoplastic elastomer material. For instance, the valve safety member 136 may be made of Santoprene®.

Figure 40:
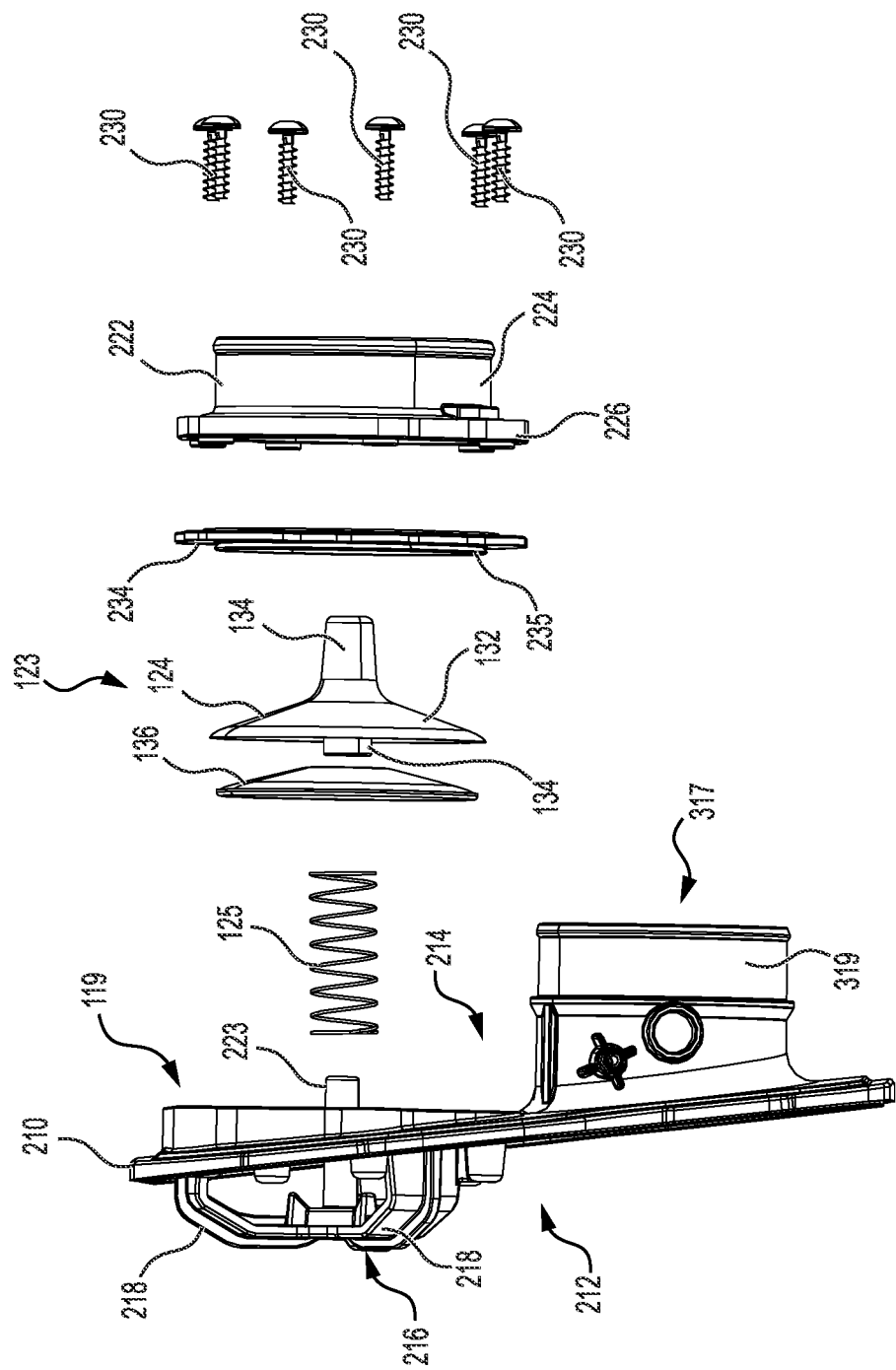
FIG. 40 is an exploded view of the main inlet member and the bypass valve of FIG. 37.

The valve body 124 is operatively connected to the main inlet member 210 of the primary airbox 120. In particular, the valve body 124 is supported by a valve support 216 of the main inlet member 210. The valve support 216 is disposed on an inner side 212 of the main inlet member 210 (opposite an outer side 214 of the main inlet member 210) and includes three arms 218 connected to one another at a central junction 219 and to an inner surface 217 of the main inlet member 210. As shown in FIGS. 37 and 38, the arms 218 extend radially from the central junction 219 at equal angles from one another. A central axis 215 extending through a center of a circular opening 220 of the main inlet member 210 (which corresponds to the inlet 119 of the primary airbox 120) also extends through the central junction 219. As shown in FIGS. 39 and 40, a post 223 extends outwardly from the central junction 219 of the valve support 216, along the central axis 215 toward the opening 220. As shown in FIG. 39, the post 223 is received in part within the hollow stem portion 134 of the valve body 124. The post 223 is sized such that the stem portion 134 and the post 223 are in a sliding relationship to allow the stem portion 134, and therefore the valve body 124 to move relative to the post 223.

As shown in FIGS. 39 and 40, an outer inlet member 222 is disposed on the outer side 214 of the main inlet member 210. The outer inlet member 222 has a central portion 224 and a flange portion 226 extending radially outwardly from the central portion 224 at one end thereof. The central portion 224 defines a central opening 228 that is concentrically aligned with the opening 220 of the main inlet member 210. The flange portion 226 defines a plurality of fastener openings (not shown) for receiving respective fasteners 230 (FIG. 40). Notably, the fasteners 230 extends through the flange portion 226 and threadedly engage respective fastener mounts 232 (FIGS. 37, 38) of the main inlet member 210 to secure the outer inlet member 222 to the main inlet member 210. Moreover, a generally annular sealing member 234 is disposed in part between the flange portion 226 of the outer inlet member 222 and the main inlet member 210. The sealing member 234 has a central inner lip 235 extending inwardly into the opening 220 defined by the main inlet member 210. The inner lip 235 of the sealing member 234 is configured to contact the valve body 124 when the valve body 124 is in the closed position to form a seal therewith. As such, the contact between the sealing member 234 and the conical portion 132 of the valve body 124 prevents air from flowing through the inlet 119. In this embodiment, the sealing member 234 is made of rubber.

As shown in FIGS. 39 and 40, the bypass valve 123 includes a spring 125 that is mounted to the post 223 of the valve support 216. The spring 125 is disposed between the valve body 124 and the central junction 219 of the valve support 216. As such, the spring 125 normally biases the valve body 124 to the closed position. The spring constant of the spring 125 is chosen such that the bypass valve 123 will open and close at a predetermined pressure within the primary airbox 120. Thus once opened, the bypass valve 123 will automatically close (i.e., the valve body 124 will move to the closed position) when the airflow from the turbocharger 300 increases the pressure within the primary airbox 120 to the predetermined pressure, and vice versa. The diameter of the valve body 124 is sized to allow for a high flow capacity between the secondary and primary airboxes 110, 120. This aids in ensuring optimal pressure within primary airbox 120 and thus aids optimal engine performance in generally all situations even if turbocharger 300 is not spooled.

As can be seen in FIG. 41, a distance travelled by intake air to the engine 26 is shorter when the intake air flows through the bypass valve 123 along a flow path 445 than when it flows through the turbocharger 300 along the flow path 444. More specifically, the conduit portion 121 and the bypass valve 123 reduce the air flow travel distance between the secondary airbox 110 and the primary airbox 120, when compared to the air flow travel distance through the conduit portion 117, the turbocharger 300 and the conduit 316. As such, depending on the air pressure within primary airbox 120, the airflow between the secondary and primary airboxes 110, 120 has either a short airflow path or a long airflow path available. Moreover, as shown in FIG. 41, each of the conduit portions 117, 121 and the conduit 316 along which the flow paths 445, 444 respectively pass through at least partially overlap the engine 26 in front and rear elevation views thereof. That is, the conduit portions 117, 121 of the conduit 118 and the conduit 316 are, at least in part, laterally and vertically aligned with the engine 26. Inclusion of the bypass valve 123 in the primary airbox 120 further allows the engine 26 to be operated in either a turbocharged mode or a naturally aspirated mode. Operation of the engine 26, and corresponding operation of the turbocharger 300, in order to operate in the two modes will be described in further detail below.

The engine 26 is an inline, two-cylinder, two-stroke, internal combustion engine. The two cylinders of the engine 26 are oriented with their cylindrical axes disposed vertically. It is contemplated that the engine 26 could be configured differently. For example, the engine 26 could have more or less than two cylinders, and the cylinders could be arranged in a V-configuration instead of in-line. It is contemplated that in some implementations the engine 26 could be a four-stroke internal combustion engine, a carbureted engine, or any other suitable engine capable of propelling the snowmobile 10. The engine 26 includes an engine coolant system 23 to aid in cooling the engine 26. The engine coolant system 23 includes an engine coolant temperature sensor (not shown) for monitoring the temperature of the engine coolant circulating in the engine coolant system 23.

Figure 4:
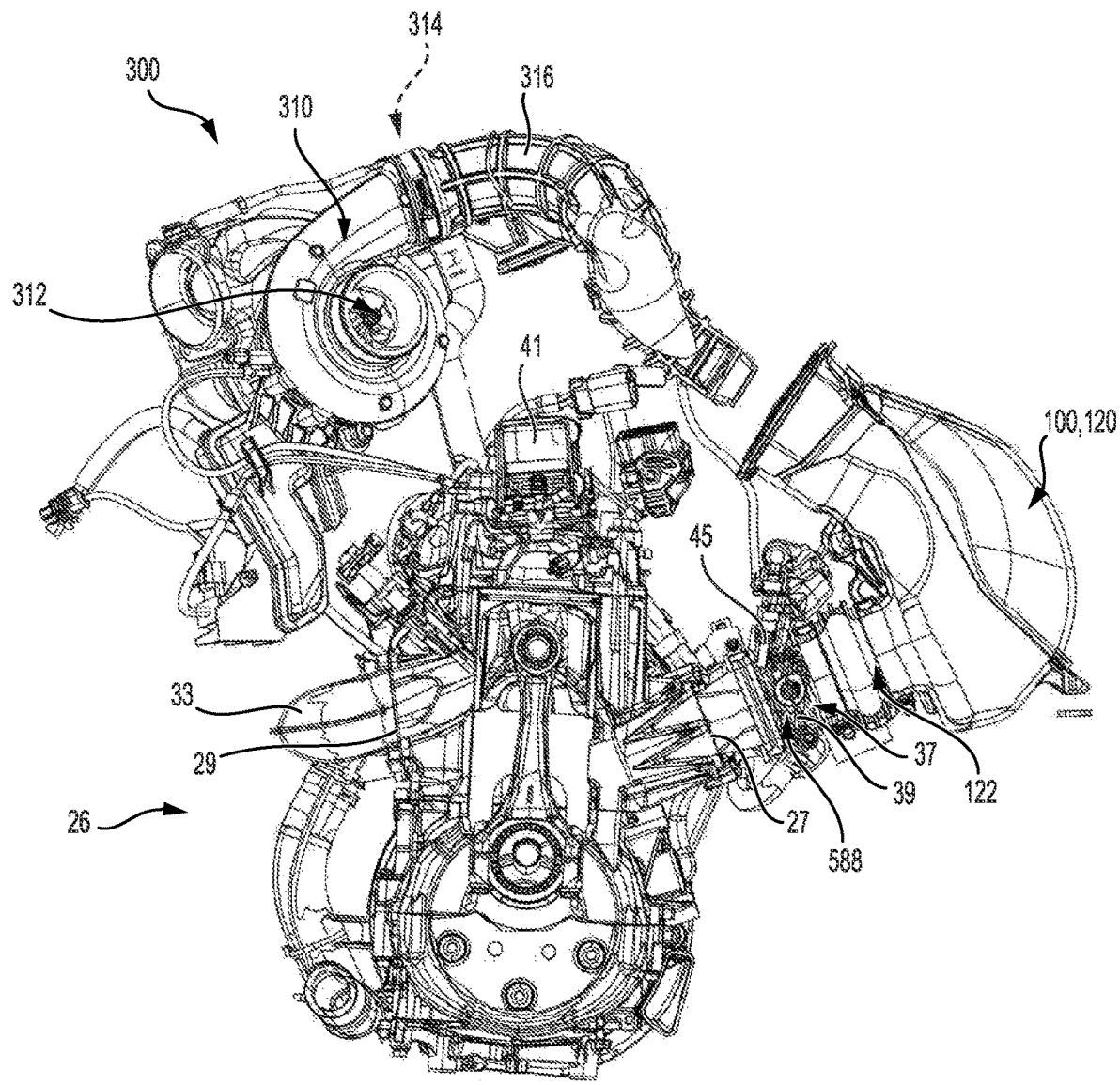
FIG. 4 is a cross-sectional view of the engine and some portions of the air intake system and the exhaust system of FIG. 2.

As shown in FIGS. 1, 2, and 4, the engine 26 receives air from the air intake system 100, specifically the outlets 122 of the primary airbox 120, via engine air inlets 27 defined in the rear portion of each cylinder of the engine 26. Each air inlet 27 is connected to a throttle body 37 of the air intake system 100. The throttle body 37 includes a throttle valve 39 which rotates to regulate the amount of air flowing through the throttle body 37 into the corresponding cylinder of the engine 26. A throttle valve actuator (not shown) is operatively connected to the throttle valve 39 to change the position of the throttle valve 39 and thereby adjust the opening of the throttle valve 39 with operation of the throttle lever 86 on the handlebar 84. In the present implementation, the throttle valve actuator is a mechanical linkage, although this is simply one non-limiting implementation. The position and the movement of the throttle valve 39 is monitored by a throttle valve position sensor 588 (schematically illustrated in FIG. 8) operatively connected to the throttle valve 39, described in more detail below. It is also contemplated that the throttle valve actuator could be in the form of an electric motor. The electric motor could change the position of the throttle valve 39 based on input signals received from an electronic control module (not shown) which in turn receives inputs signals from a position sensor associated with the throttle lever 86 on the handlebars 84. Further details regarding such drive-by wire throttle systems can be found in International Patent Application No. PCT/US2013/048803 filed on Jun. 29, 2013, the entirety of which is incorporated herein by reference.

The engine 26 receives fuel from the fuel tank 28 via Direct Injection (DI) injectors 41 and Multi Point Fuel Injection (MPFI) injectors 45 (both shown in at least FIG. 4), having an opening in the cylinders. The fuel-air mixture in each of the left and right cylinders of the engine 26 is ignited by an ignition system including spark plugs 43 (best seen in FIG. 2). Engine output power, torque and engine speed are determined in part by throttle opening and in part by the ignition timing, and also by various characteristics of the fuel-air mixture such as its composition, temperature, pressure and the like. Methods of controlling the fuel-air mixture, according to some implementations of the present technology, will be described in more detail below in reference to FIG. 24.

Figure 5:
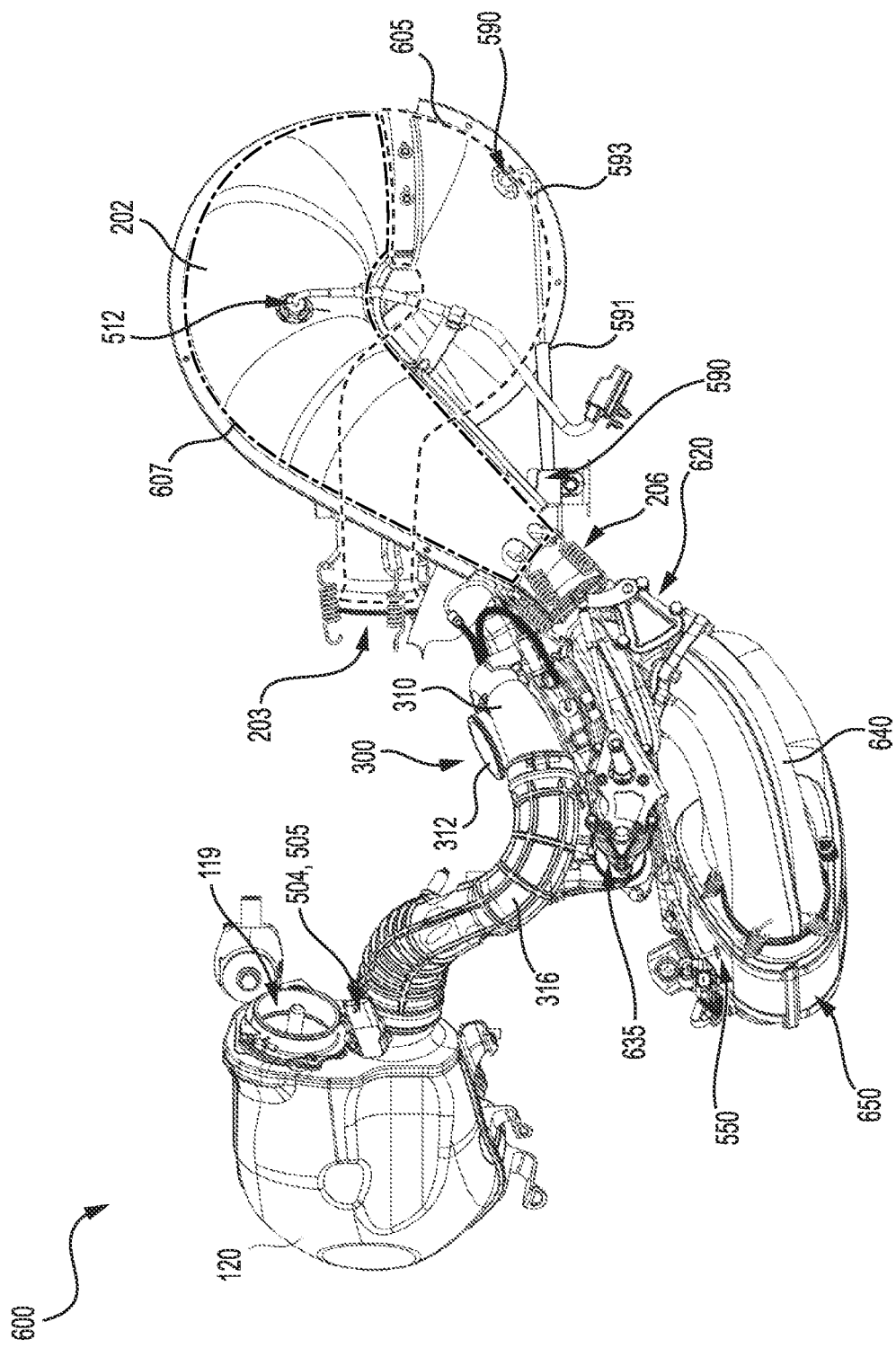
FIG. 5 is a top plan view of portions of the air intake system and the exhaust system of FIG. 2.

Exhaust gases resulting from the combustion events of the combustion process are expelled from the engine 26 via an exhaust system 600 (FIG. 5). As shown in FIG. 4, an exhaust outlet 29 is defined in the front portion of each cylinder of the engine 26. Each exhaust outlet 29 has an exhaust valve 129. The exhaust outlets 29 are fluidly connected to an exhaust manifold 33. The exhaust system 600 includes an exhaust pipe 202 which is connected to the exhaust manifold 33 and extends forwardly therefrom to direct the exhaust gases out of the engine 26.

In the present implementation, the exhaust pipe 202 is a tuned pipe which has a geometry suitable for improving efficiency of the engine 26.

Figure 6:
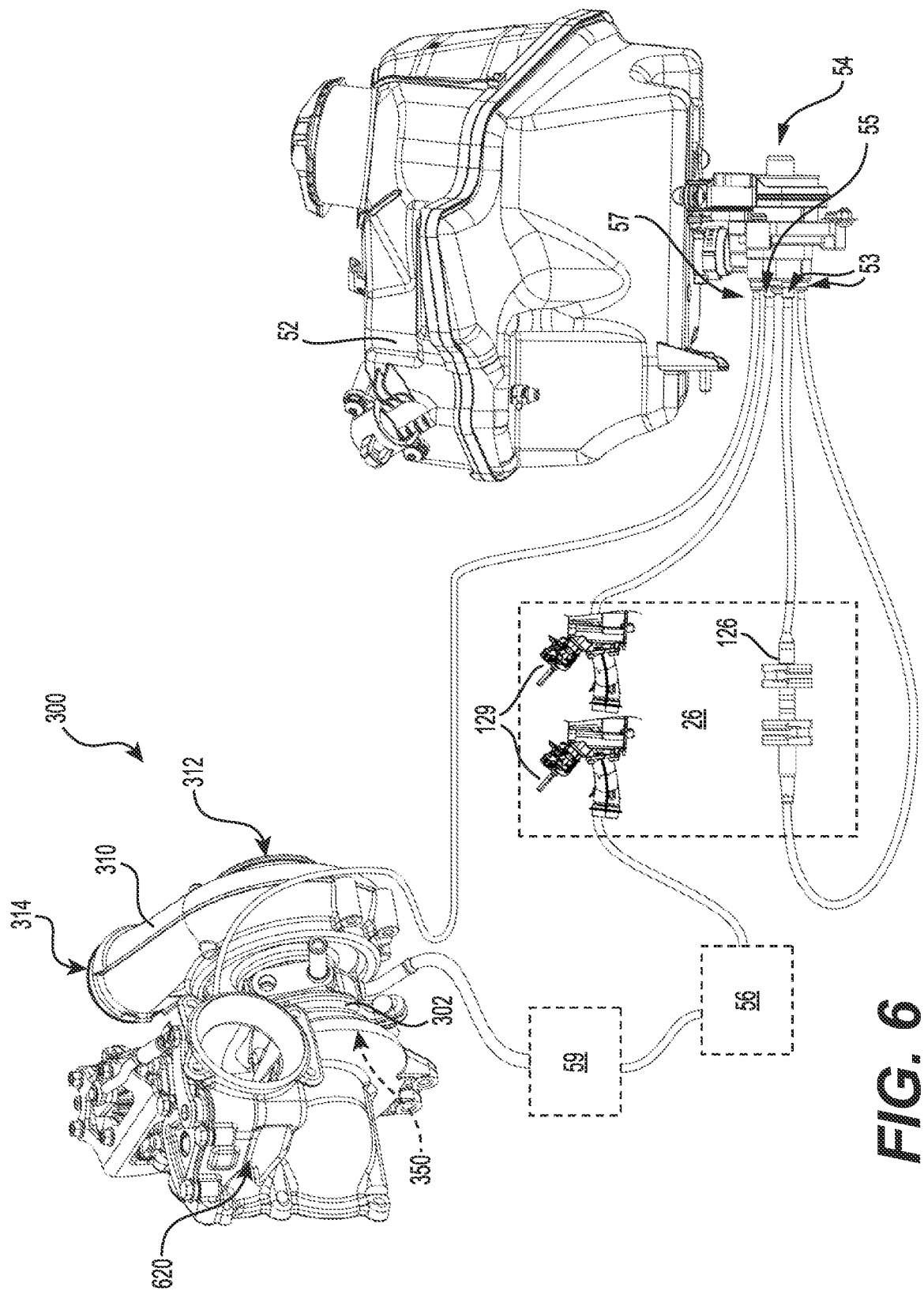
FIG. 6 is a schematic representation of a lubrication system of the snowmobile of FIG. 1.
Figure 12:
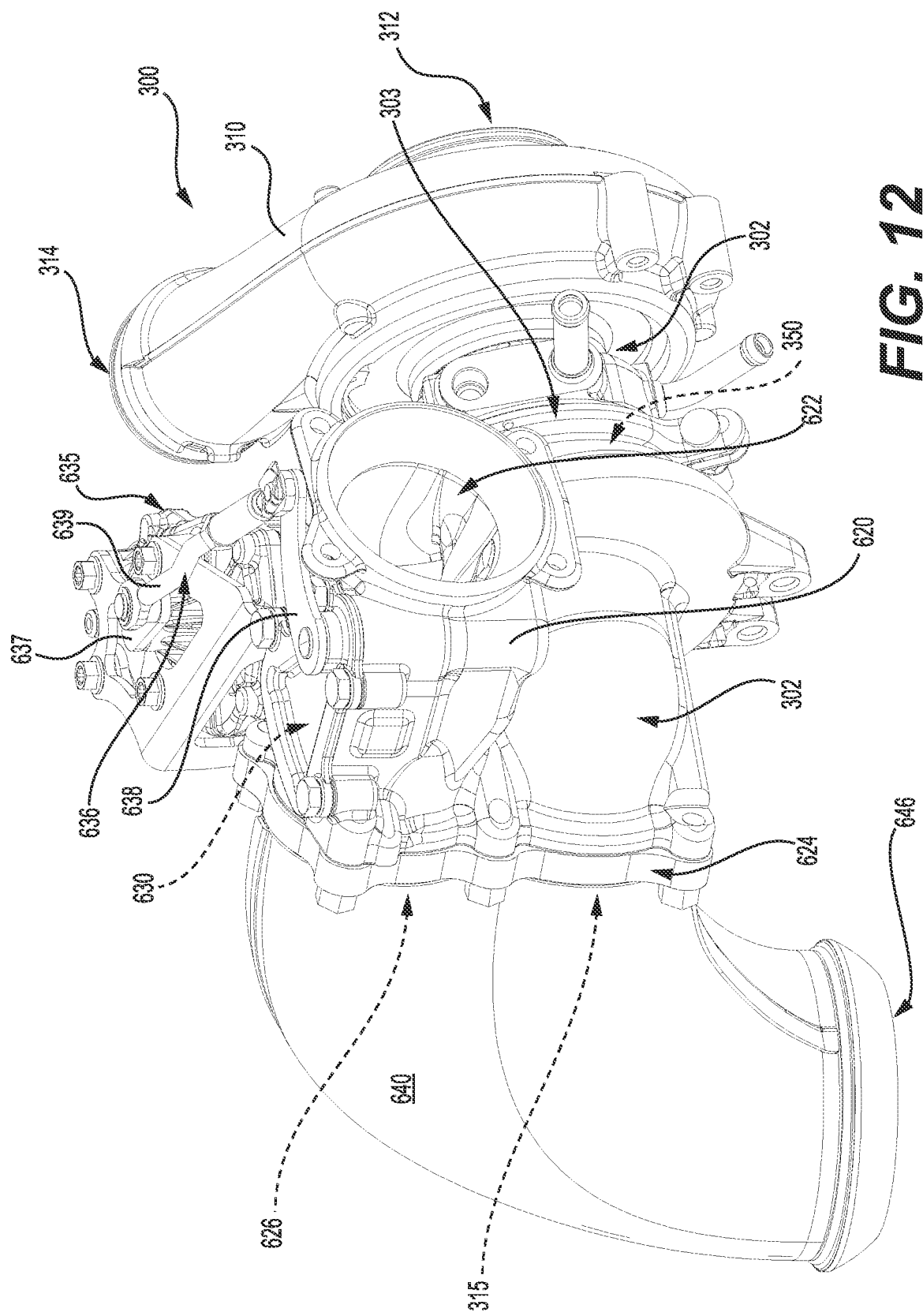
FIG. 12 is a front elevation view of a turbocharger, a bypass conduit, and an exhaust collector of the exhaust system of FIG. 2.
Figure 13:
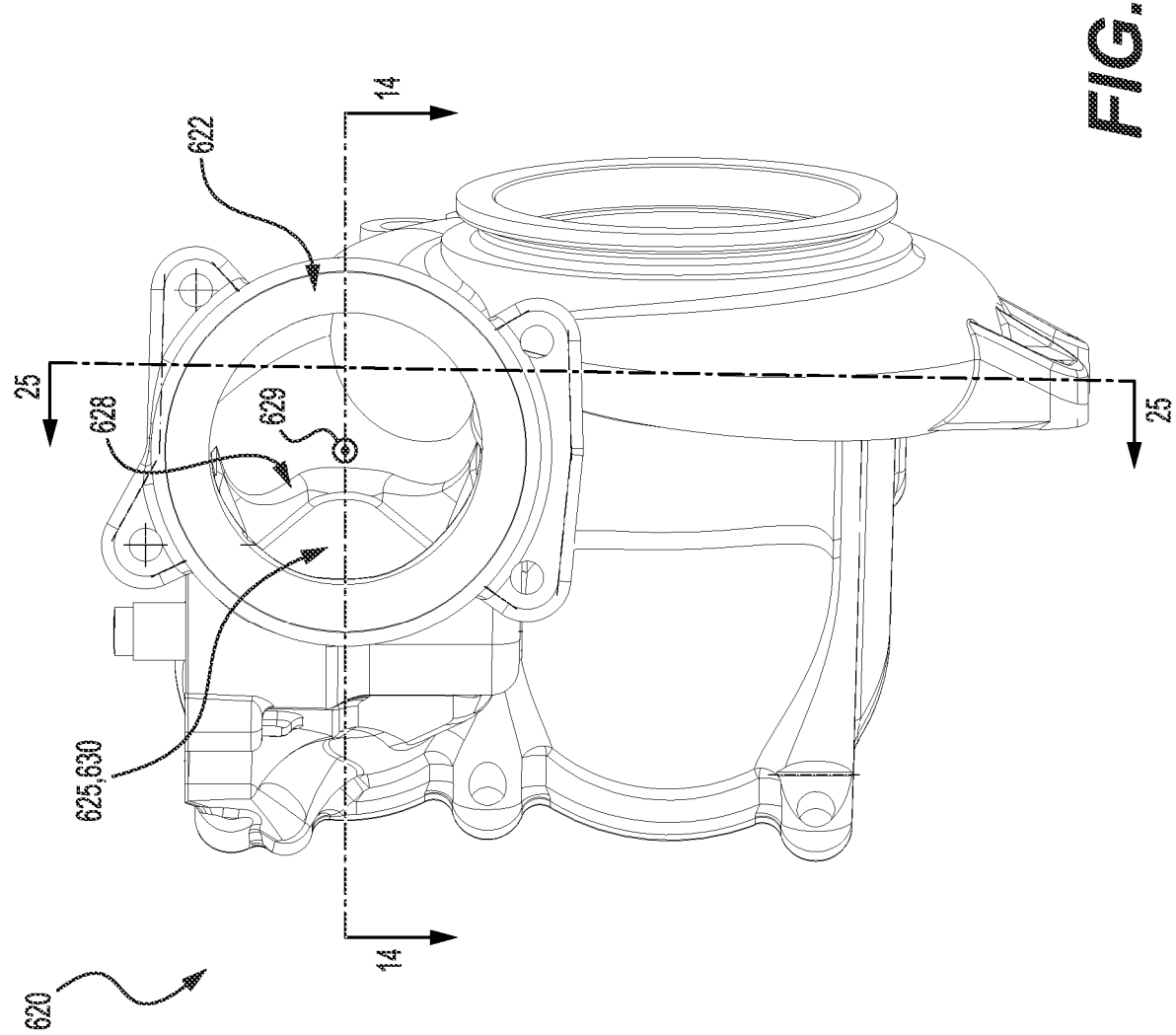
FIG. 13 is a perspective view of the bypass conduit of FIG. 12, shown in isolation.
Figure 19:
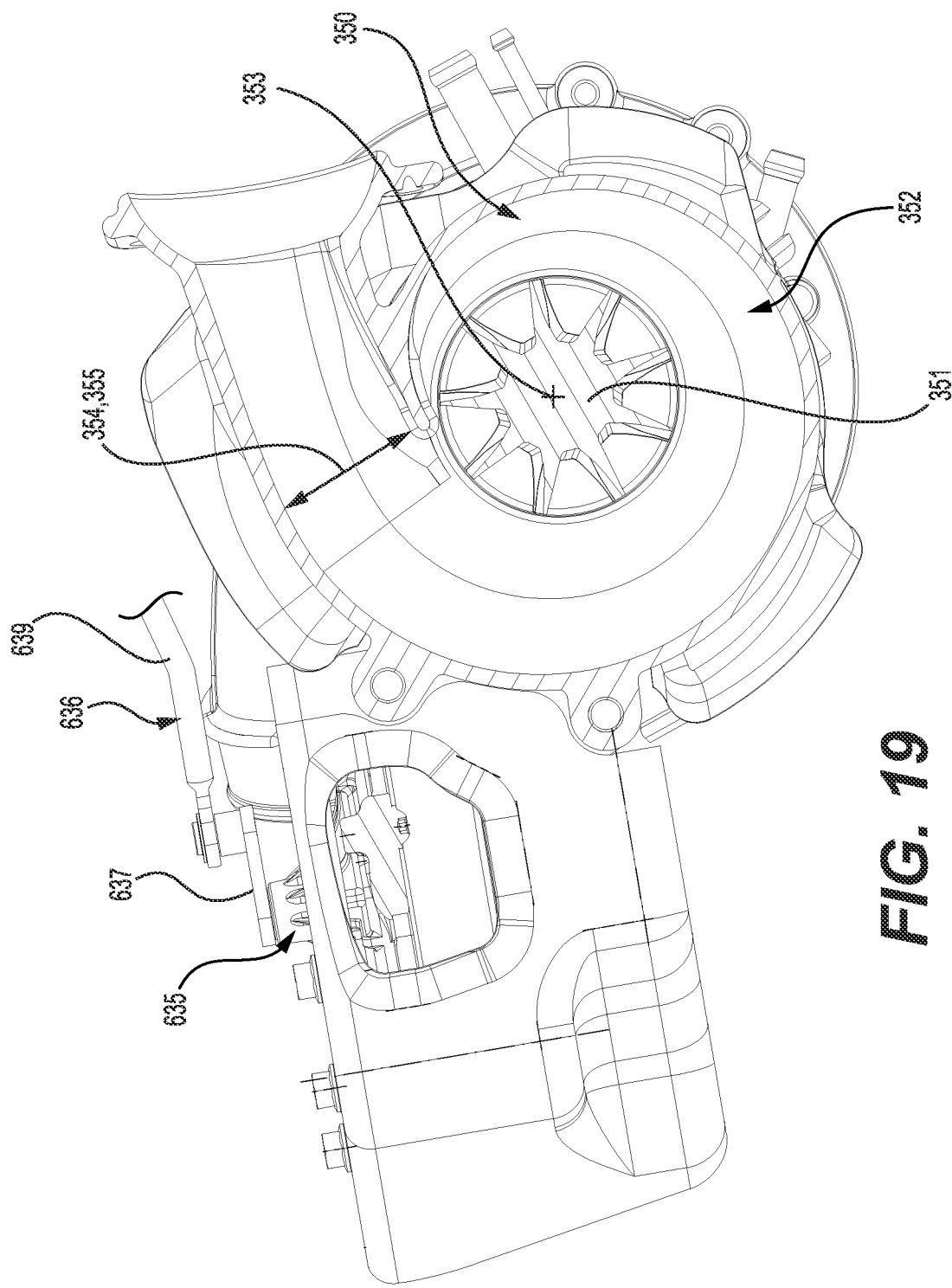
FIG. 19 is a cross-sectional view of the turbocharger of FIG. 18, taken along line 19-19 of FIG. 18.
Figure 25:
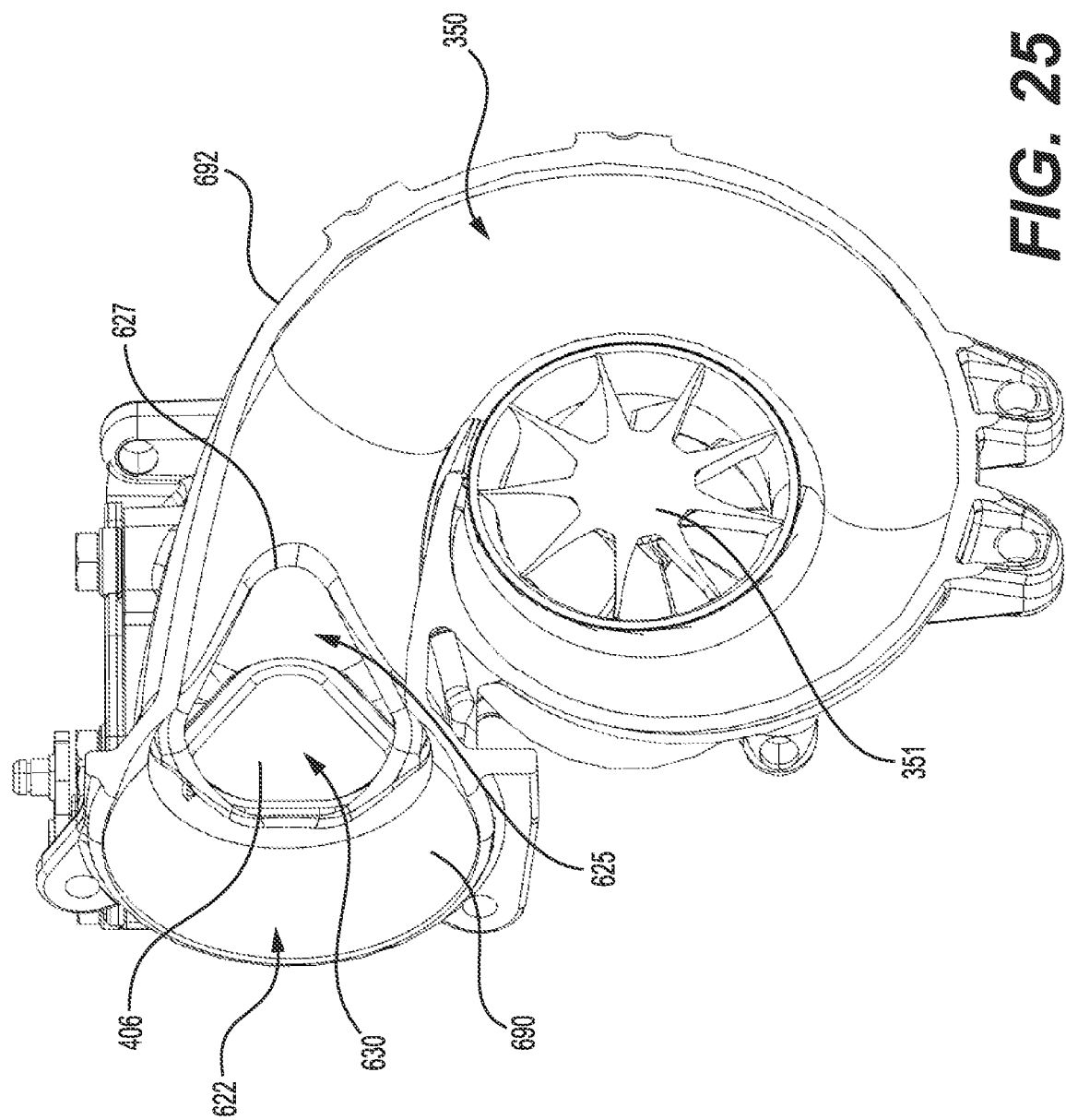
FIG. 25 is a cross-sectional view of the bypass conduit of FIG. 12, taken along line 25-25 of FIG. 13, with the valve in the open position.

A turbocharger 300 is operatively connected to the engine 26. The turbocharger 300 compresses air and feeds it to the engine 26. As shown in FIGS. 6 and 12, the turbocharger 300 has a housing 302 defining an air compressor 310 and an exhaust turbine 350. With additional reference to FIG. 19, the exhaust turbine 350 includes a turbine inlet 355 with an area 354, which is defined in turbochargers generally as the cross-sectional area of a volute 352 (measured at the tongue) of the exhaust turbine 350. The air compressor 310 includes a compressor wheel and is part of the air intake system 100. Intake air flowing past the rotating compressor wheel is compressed thereby, as described above. The rotation of the compressor wheel is powered by a turbine wheel 351 (FIGS. 19, 25) of the exhaust turbine 350, which is part of the exhaust system 600. The turbine wheel 351 is rotated about a turbine axis 353 (FIG. 19) by exhaust gases expelled from the engine 26 and directed to flow over the blades of the turbine wheel 351. It is contemplated that, in some implementations, the air compressor 310 could be a supercharger, in which the compressor wheel would be directly powered by the engine 26. The exhaust system 600 will be described in greater detail below.

Figure 7:
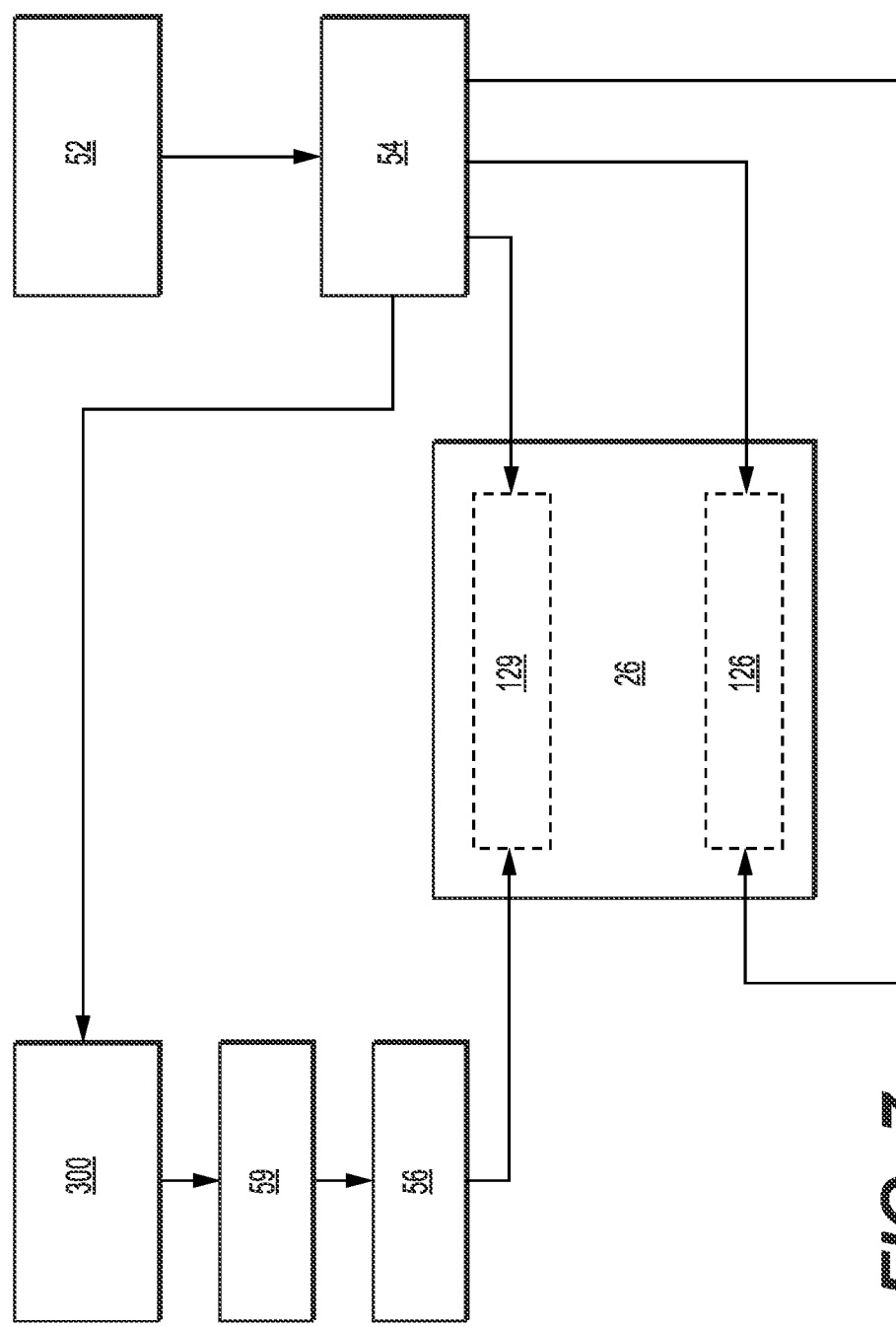
FIG. 7 is a schematic diagram of lubricating oil flow of the lubrication system of FIG. 6.

Referring to FIGS. 6 and 7, the snowmobile 10 further includes a lubrication system to provide lubricating oil to the engine 26 and to the turbocharger 300. The engine 26 is fluidly connected to an oil reservoir 52 which supplies oil to the crankshaft 126 and the exhaust valves 129 of the engine 26. The oil reservoir 52 is also fluidly connected to the turbocharger 300 to provide lubricating oil thereto. The turbocharger 300 is also fluidly connected to the engine 26, as will be described further below.

A primary oil pump 54 is fastened to and fluidly connected to the oil reservoir 52. It is contemplated that the pump 54 and the oil reservoir 52 could be differently connected together or could be disposed separately in the snowmobile 10. The primary oil pump 54 pumps oil from the reservoir 52 to the engine 26 and the turbocharger 300. The primary oil pump 54 includes four outlet ports for pumping out oil from the oil reservoir 52. Two outlet ports 53 supply oil to the crankshaft 126. Another outlet port 55 supplies oil to one of the exhaust valves 129. The fourth outlet port 57 supplies oil to the turbocharger 300. Depending on the implementation, it is contemplated that the primary oil pump 54 could include more or fewer outlet ports depending on specific details of the implementation.

A secondary oil pump 56 and an oil/vapor separator tank 59 are fluidly connected between the turbocharger 300 and the engine 26. The secondary oil pump 56 receives oil that has passed through the turbocharger 300, and pumps that oil to the other exhaust valve 129. FIG. 7 illustrates the flow directions of oil from the pumps 54, 56 and through the turbocharger 300 to the engine 26 via schematic diagram. It is further noted that in the present implementation, the turbocharger 300 is a ball-bearing based turbocharger 300 which is dimensioned for low oil flow lubrication in order to provide efficient responsiveness. It is contemplated that different types of turbochargers could be used in differed implementations.

With this configuration, only one oil reservoir 52 is utilized for lubricating both the turbocharger 300 and the engine 26. It is contemplated that the snowmobile 10 could also be arranged such that the secondary oil pump 56 could be omitted. It is also contemplated that oil could be circulated to the crankshaft 126, rather than the exhaust valves 129, after having passed through the turbocharger 300.

With additional reference to FIGS. 8 to 19, the exhaust system 600 will now be described in further detail. The exhaust gas expelled from the engine 26 flows through the exhaust outlets 29, through the exhaust manifold 33, and into the exhaust pipe 202, as is mentioned above. The exhaust pipe 202, which as mentioned above is a tuned pipe 202, is curved and has a varying diameter along its length.

Other types of exhaust pipes 202 are contemplated. As shown in FIG. 5, the exhaust pipe 202 includes a pipe inlet 203 fluidly connected to the exhaust manifold 33 and a pipe outlet 206 located at the end of the exhaust pipe 202. The exhaust pipe 202 further has a divergent portion 605 adjacent the pipe inlet 203 and a convergent portion 607 adjacent the pipe outlet 206. The pipe outlet 206 is positioned downstream from the pipe inlet 203. It is well known in the art of two stroke engines that the goal of the converging-diverging type tuned pipe is to have the diverging section create a returning rarefaction wave and the converging section create a returning pressure wave which pushes any excess fresh air-fuel mixture which flowed out of the cylinder into the exhaust pipe, back into the cylinder. Pushing the fresh mixture back into the cylinder is desired since this allows the returning pressure wave to "super charge" the cylinder giving it more fresh mixture than if the cylinder was filled at ambient pressure. The nomenclature "tuned pipe" is used because the dimensions of the pipe are specifically chosen so this super charging occurs within the pipe at a particular value of one or more parameters, or range of values thereof such as at a particular temperature and/or pressure, which coincide with a desired operating RPM or desired operating RPM range of the engine. Once the physical dimensions of the tuned pipe are selected, the super charging actions of that pipe will be optimal at the specific parameter values for which it was tuned and because conventional tuned pipes are fixed in dimension, these parameters are not adjustable during use of the vehicle in which the engine is installed. When the tuned pipe is not operating at these specific tuned parameter values, the super charging effect will be less than optimal and consequently the operation of the engine will be less than optimal at the desired operating RPM. For this reason, when the restrictions of a turbocharger or a variable valve such as the valve 630 are added along the flow path of the exhaust which causes the temperature and/or pressure to be changed within the tuned pipe at any given time of operation, compensations must be made in order to prevent these changes from negatively affecting engine performance or otherwise limit negative effects on engine performance. It should thus be understood that two stroke engines, due to this super charging action, are sensitive to variations within the tuned pipe.

The exhaust system 600 also includes a bypass conduit 620 to direct the flow of the exhaust gas to either bypass the turbocharger 300 or to pass through the exhaust turbine 350 of the turbocharger 300 to operate the air compressor 310. The pipe outlet 206 located at the end of the exhaust pipe 202 fluidly communicates with the bypass conduit 620. Specifically, the bypass conduit 620 defines an exhaust inlet 622 which is fluidly connected to the pipe outlet 206. The exhaust inlet 622 and the pipe outlet 206 are arranged such that exhaust gas passing from the pipe outlet 206 into the exhaust inlet 622 passes through the inlet 622 generally normal to the inlet 622. A central axis 629 (FIGS. 13, 14) of the exhaust inlet 622 illustrates the general direction of exhaust gas flow into the bypass conduit 620. In the present implementation, the central axis 629 coincides with the center of the circular inlet 622, but that may not always be the case.

The bypass conduit 620 is further fluidly connected to the housing 302 of the turbocharger 300. More specifically, the bypass conduit 620 is mechanically connected to the turbocharger housing 302 in the present implementation by a clamp 303. It is contemplated that the bypass conduit 620 could be an independent apparatus from the turbocharger 300. It is also contemplated that the bypass conduit 620 could be fastened or otherwise mechanically connected to the turbocharger housing 302. It is further contemplated that the bypass conduit 620 and the turbocharger housing 302 could be integrally formed.

Figure 14:
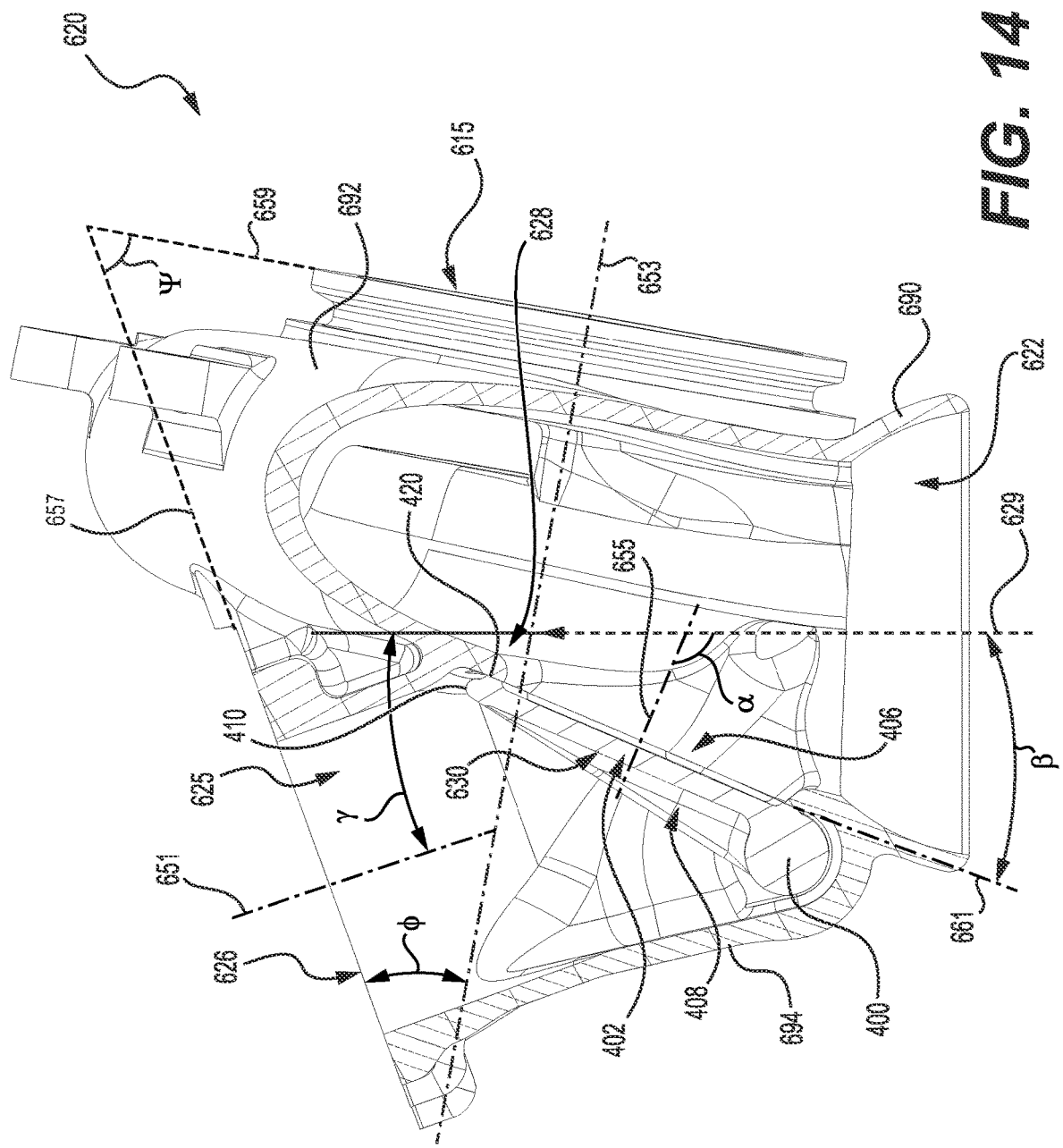
FIG. 14 is a cross-sectional view of the bypass conduit of FIG. 12, taken along line 14-14 of FIG. 13, with a valve in a closed position.

The bypass conduit 620 is generally Y-shaped, with an inlet conduit portion 690 extending from the exhaust inlet 622 and branching into two outlet conduit portions 692, 694 (FIG. 14). As such and as is mentioned above, the bypass conduit 620 serves to selectively direct the exhaust gas which enters through the exhaust inlet 622 either into the exhaust turbine 350 or bypassing the exhaust turbine 350. As shown in FIG. 14, the turbine outlet portion 692 of the bypass conduit 620 (one branch of the Y-shape) defines a passage ending in an outlet 615 that fluidly communicates with the turbine inlet 355. A bypass outlet portion 694 (the other branch of the Y-shape) allows exhaust gas to bypass the turbocharger 300 to exit the bypass conduit 620 through a bypass outlet 626. The bypass outlet portion 694 defines a passage 625 which allows for fluid communication between the exhaust inlet 622 and the outlet 626. The outlet 626 and the passage 625 can be seen in FIG. 17. Best seen in FIG. 16, the bypass conduit 620 further includes a flow divider 628 disposed between the conduit portions 692, 694. The flow divider 628 aids in smoothly dividing the exhaust gas flow through the bypass conduit 620, in order to aid in avoiding flow separation or the creation of vortices in the exhaust gas flow. To that end, the flow divider 628 is generally shaped and arranged to avoid abrupt edges.

Flow of the exhaust gas through the passage 625 is selectively controlled by a valve 630 disposed in the bypass conduit 620, in conjunction with a system controller 500 controlling the valve 630. More specifically, the valve 630 is a valve for selectively diverting exhaust gas away from the turbocharger 300. In the present implementation, the valve 630 is disposed in the passage 625, and more specifically at a valve seat 623 thereof. It is contemplated that the valve 630 could be disposed elsewhere in the bypass conduit 620, for example nearer the exhaust inlet 622 and just upstream from the passage 625, depending on the specific implementation of the valve 630. It is also contemplated that in some implementations, the valve 630 could selectively open or close the turbine outlet portion 692 rather than the bypass passage 625.

With reference to FIGS. 26 to 29, the valve 630 has a base portion 400 and a body portion 402 extending from the base portion 400. The base portion 400 is configured for pivotably mounting the valve 630 within the bypass conduit 620 and thus defines a valve pivot axis 404 about which the valve 630 is pivotable during use. More specifically, the base portion 400 is generally cylindrical and has an axle 440 including two axle portions 441 extending in opposite directions from a central section of the base portion 400. While the axle 440 is made integrally with the valve 630 in this embodiment, it is contemplated that, in other embodiments, the axle 440 could be a separate component (e.g., two separate axle portions connectable to the base portion 400).

The body portion 402 is the portion of the valve 630 which is used to block the passage 625. The body portion 402 has an upstream side 406 and a downstream side 408 opposite the upstream side 406. The upstream side 406 is exposed, during use, to fluid flow in the bypass conduit 620. In other words, the upstream side 406 generally faces the inlet 622 while the downstream side 408 faces the bypass outlet 626. The body portion 402 of the valve 630 is shaped to facilitate control of exhaust gas flow through the passage 625. Notably, the body portion 402 has a generally pointed shape defining a rounded tip 410 at a location of the body portion 402 furthest from the base portion 400 in a length direction of the valve 630 (generally perpendicular to the valve pivot axis 404). As such, the body portion 402 of the valve 630 (i.e., the portion of the valve 630 used to block the passage 625) can be said to be generally elongated.

A periphery 412 of the body portion 402 generally defines the shape thereof. The periphery 412 includes two opposite lengthwise edges 414 that extend from the base portion 400 in a direction generally parallel to the length direction of the valve 630. The periphery 412 also includes a rounded edge 416 defined by the rounded tip 410, and two converging angular edges 418 extending between the two lengthwise edges 414 and respective ends of the rounded edge 416 (i.e., the angular edges 418 connect the lengthwise edges 414 to the rounded edge 416). The angular edges 418 converge toward each other as the two angular edges 418 extend from the two lengthwise edges 414 to the ends of the rounded edge 416. Each of the angular edges 418 is thus disposed at an angle θ relative to the length direction of the valve 630. The angle θ may be between 10° and 45° inclusively. For instance, in this implementation, the angle θ is approximately 30°.

As shown in FIG. 26, the body portion 402 of the valve 630 is generally symmetrical about a plane of symmetry PS bisecting the rounded tip 410. The plane of symmetry PS is perpendicular to the valve pivot axis 404. One of each of the lengthwise edges 414 and angular edges 418 is disposed on either side of the plane of symmetry PS. Moreover, in this implementation, the base portion 402 of the valve 630 is also symmetrical about the plane of symmetry PS. However, it is contemplated that the valve 630 could not be symmetrical about the plane PS.

A width of the body portion 402, measured in a direction parallel to the valve pivot axis 404, varies along the length direction of the valve 630. For instance, the width of the body portion 402 is largest adjacent the base portion 400. More specifically, a maximal width $W_{max}$ of the body portion 402 is measured between the two opposite lengthwise edges 414. The width of the body portion 402 decreases at the angular edges 418 along the length direction of the valve 630 toward the rounded tip 410. Notably, the width of the body portion 402 is smallest at the rounded tip 410.

As shown in FIG. 27, a length $L_V$ of the valve 630 is measured from the base portion 400 to the rounded tip 410 in the length direction of the valve 630. In this implementation, the length $L_V$ of the valve 630 is greater than or equal to the maximal width $W_{max}$ of the body portion 402. Notably, the length $L_V$ is greater than the maximal width $W_{max}$ such that a ratio $L_V/W_{max}$ of the length $L_V$ of the valve 630 over the maximal width $W_{max}$ of the body portion 402 is greater than 1. For instance, the ratio $L_V/W_{max}$ may be between 1 and 2 inclusively. Notably, the ratio $L_V/W_{max}$ is between 1.2 and 1.6. In one particular embodiment, the ratio $L_V/W_{max}$ is approximately 1.3.

Furthermore, a ratio $W_{max}/R_T$ of the maximal width $W_{max}$ of the body portion 402 over a tip radius $R_T$ of the rounded tip 410 is greater than 2. For instance, the ratio $W_{max}/R_T$ may be between 2 and 6 exclusively. In this implementation, the ratio $W_{max}/R_T$ is approximately 3.

As shown in FIG. 26, the body portion 402 of the valve 630 has a ridge 420 disposed on the upstream side 406. Notably, the ridge 420 protrudes from a generally planar surface 422 of the upstream side 406. In this implementation, a height of the ridge 420 measured from the surface 422 is constant. The ridge 420 forms a closed shape which, in this implementation, is generally pentagonal. As will be described in more detail below, the periphery 412 contours part of the ridge 420.

In this implementation, the ridge 420 has five edges including a base edge 424, two outwardly-extending edges 426 and two inwardly-extending edges 428. The base edge 424 extends generally parallel to the valve pivot axis 404 and is disposed near the base portion 400 of the valve 630. Each outwardly-extending edge 426 extends from a corresponding end of the base edge 424 outwardly toward a corresponding one of the lengthwise edges 414 of the periphery 412 of the body portion 402. The inwardly-extending edges 428 are generally parallel to corresponding ones of the angular edges 418 of the periphery 412 of the body portion 402. Each inwardly-extending edge 428 extends from an end of a corresponding one of the outwardly-extending edges 426.

The edges 424, 426, 428 of the ridge 420 meet at corresponding rounded vertices $430_1$-$430_5$. Notably, the inwardly-extending edges 428 converge at a distal rounded vertex $430_5$ which, amongst the vertices $430_1$-$430_5$, is furthest from the base portion 400. The distal rounded vertex $430_5$ is generally concentric with the rounded edge 416 of the periphery 412 of the body portion 402. Notably, the rounded edge 416 of the periphery 412 contours the rounded vertex $430_5$ of the ridge 420. Furthermore, the angular edges 418 and the lengthwise edges 414 contour the inwardly and outwardly-extending edges 428, 426 respectively.

Figure 29:
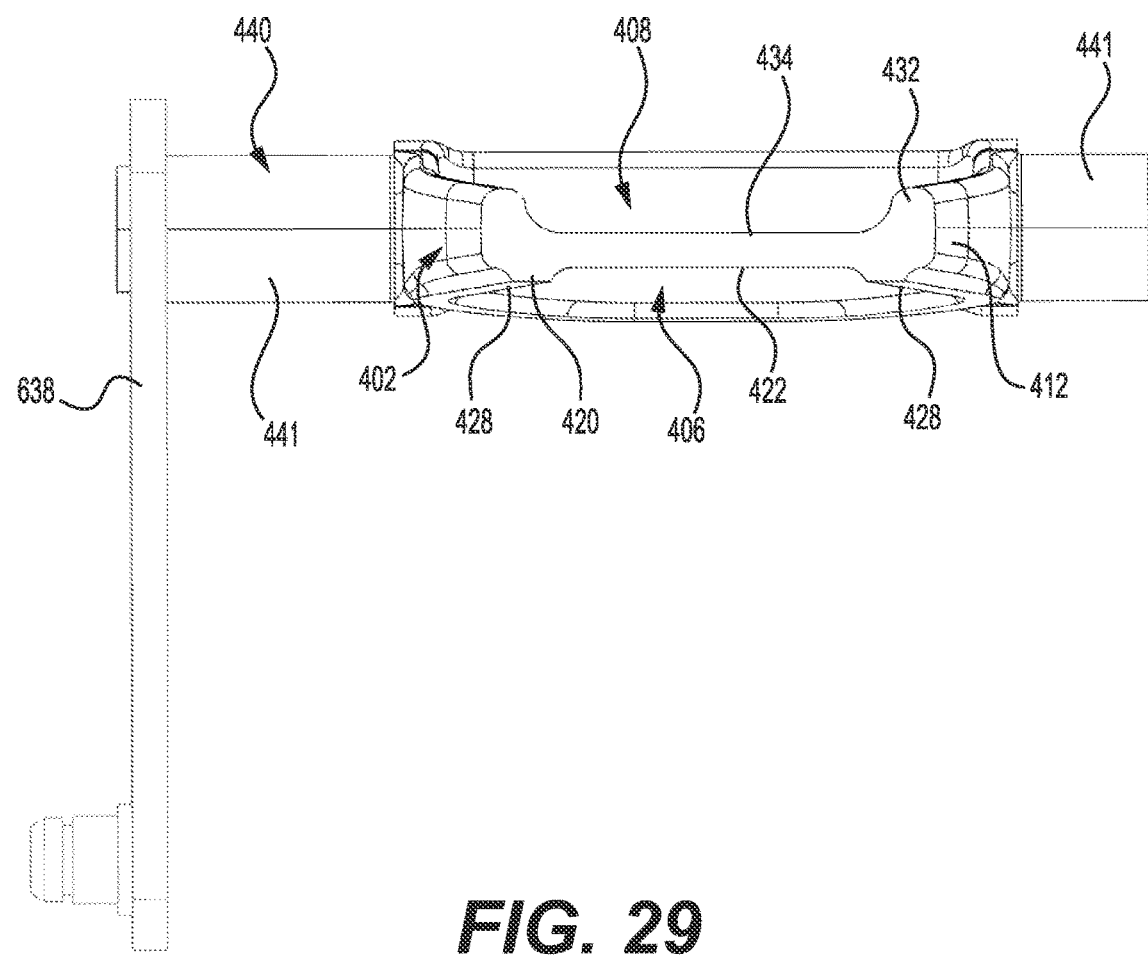
FIG. 29 is a cross-sectional view of the valve of FIG. 26, taken along line 29-29 of FIG. 27.

As shown in FIG. 29, a cross-sectional profile of the ridge 420, which can be observed for example along a plane normal to the length direction of the valve 630, is generally trapezoidal.

Figure 28:
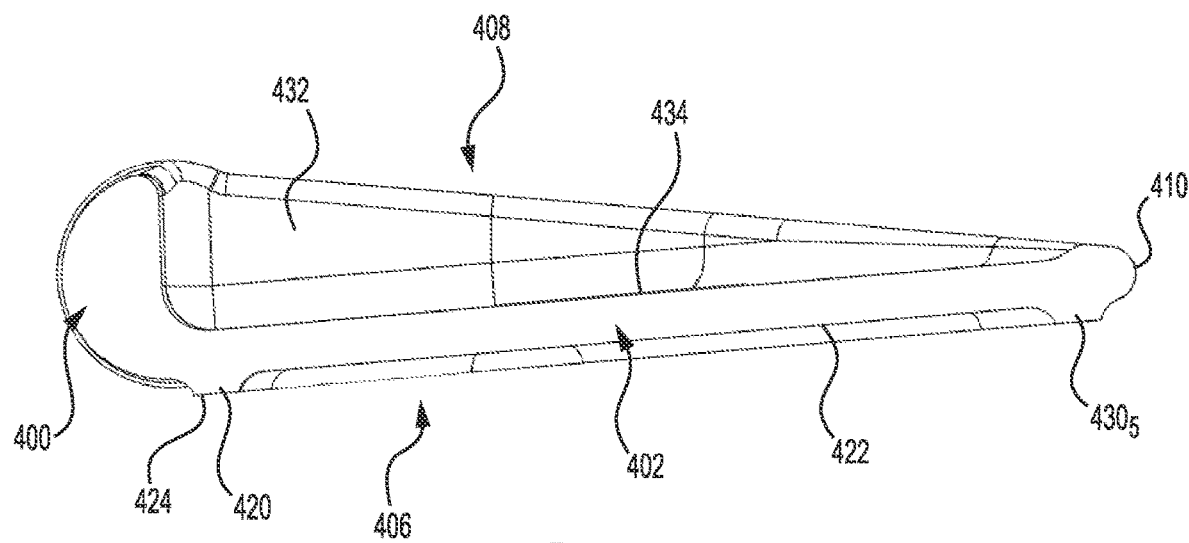
FIG. 28 is a cross-sectional view of the valve of FIG. 26, taken along line 28-28 of FIG. 27.

With reference to FIGS. 27 to 29, the body portion 402 of the valve 630 also has a peripheral lip 432 protruding on the downstream side 408 of the body portion 402. The peripheral lip 432 extends from the periphery 412 of the body portion 402. The peripheral lip 432 therefore has generally the same shape as that defined by the periphery 412. The peripheral lip 432 has a variable height measured from a surface 434 of the downstream side 408 of the body portion 402. The height of the peripheral lip 432 adjacent the base portion 400 is greater than the height of the ridge 420.

The valve 630 as described above is generally shaped to avoid abrupt edges to aid in preventing flow separation or the creation of vortices in the exhaust gas flow within the bypass conduit 620.

In this implementation, the valve 630 is a single-piece component in that the base portion 400 and the body portion 402 are made integrally. However, it is contemplated that, in alternative implementations, the base portion 400 and the body portion 402 may be made as separate components and connected to one another to form the valve 630.

With reference to FIG. 12, an actuator 635 is operatively connected to the valve 630 to cause the valve 630 to pivot about the valve pivot axis 404 (shown in FIG. 26). In this implementation, the actuator 635 is a servomotor. It is contemplated that any other suitable type of actuator may be used in other implementations. The actuator 635 is connected to the valve 630 via a linkage assembly 636. More specifically, in this implementation, the linkage assembly 636 includes three arms 637, 638, 639. The arm 637 is connected to the actuator 635 and is rotatable thereby. The arm 638 is connected to the axle 440 of the base portion 400 of the valve 630. The arm 639 is connected between the arms 637, 638. Rotation of the arm 637 therefore actuates the two other arms 638, 639 and causes the valve 630 to pivot between an open position, a closed position, and intermediate positions as will be described below. It is contemplated that, in some implementations, the valve 630 could rotate, translate, or be moved otherwise to control exhaust gas flow through the passage 625.

Figure 15:
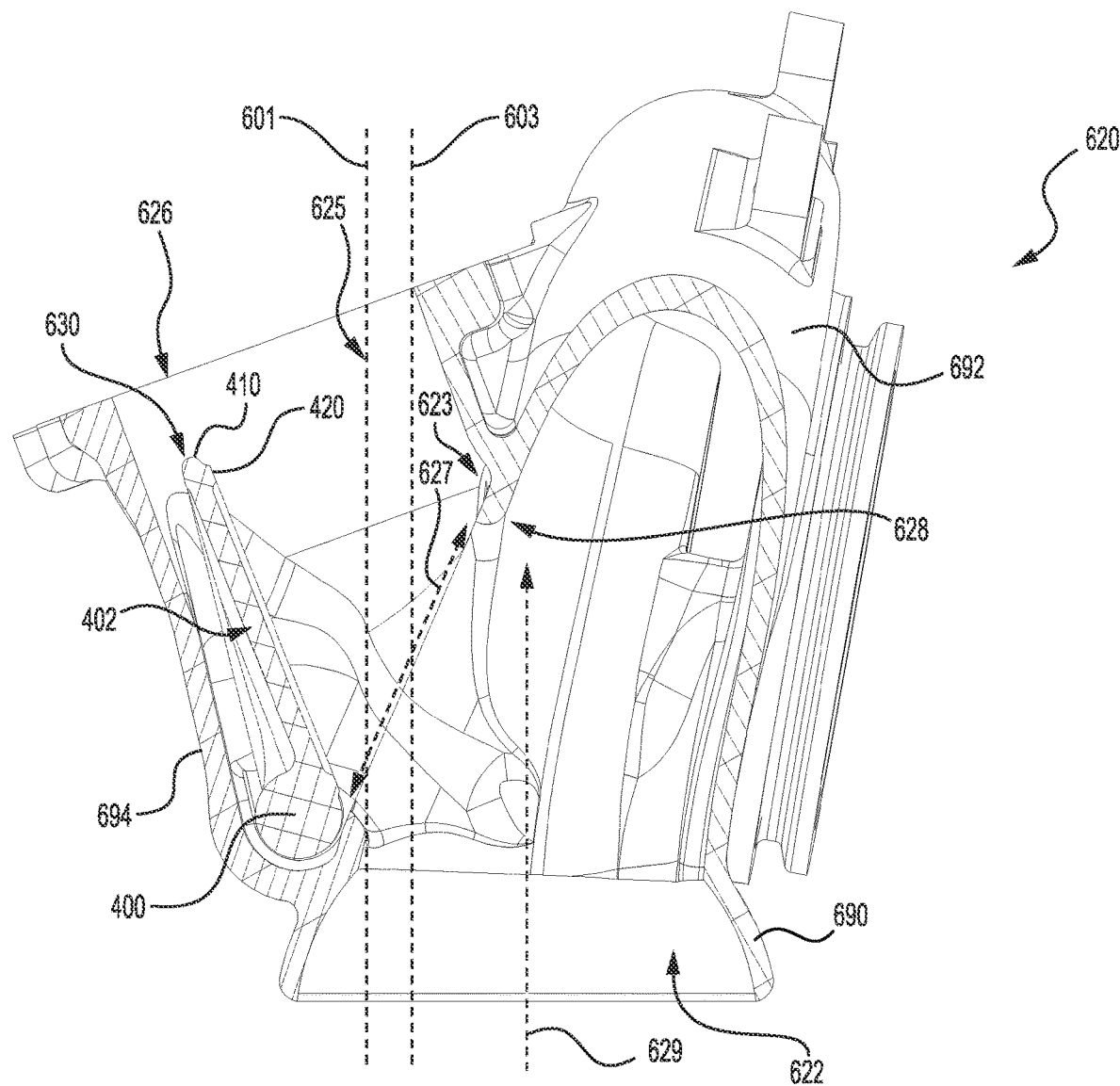
FIG. 15 is the cross-sectional view of FIG. 14, with the valve in an open position.

The valve 630 is controlled to regulate the flow of exhaust gas through the turbocharger 300 by selectively blocking or opening a valve opening 627 (FIG. 15) defined by the valve seat 623 of the passage 625. The valve opening 627 defined by the valve seat 623 is thus shaped such that it corresponds to the shape of the body portion 402 of the valve 630 (i.e., generally elongated and having a rounded tip). The valve 630 is pivotably mounted at the valve seat 623 via the base portion 400 of the valve 630 and is selectively movable between: an open position in which exhaust gas flow through the valve opening 627 (and thus the passage 625) is substantially unimpeded by the valve 630; a closed position in which the valve 630 fully closes the valve opening 627 such that exhaust gas flow through the valve opening 627 is cut-off by the valve 630; and any number of intermediate positions between the open and closed positions. In this implementation, as shown in FIG. 15, in its open position, the valve 630 is at approximately 45° (measured from the valve seat 623—i.e., 0° corresponding to the closed position of the valve 630). Moreover, in the open position, the valve 630 contacts a wall of the bypass conduit 620 on a side opposite the flow divider 628, but this may not be the case in all implementations.

Figure 16:
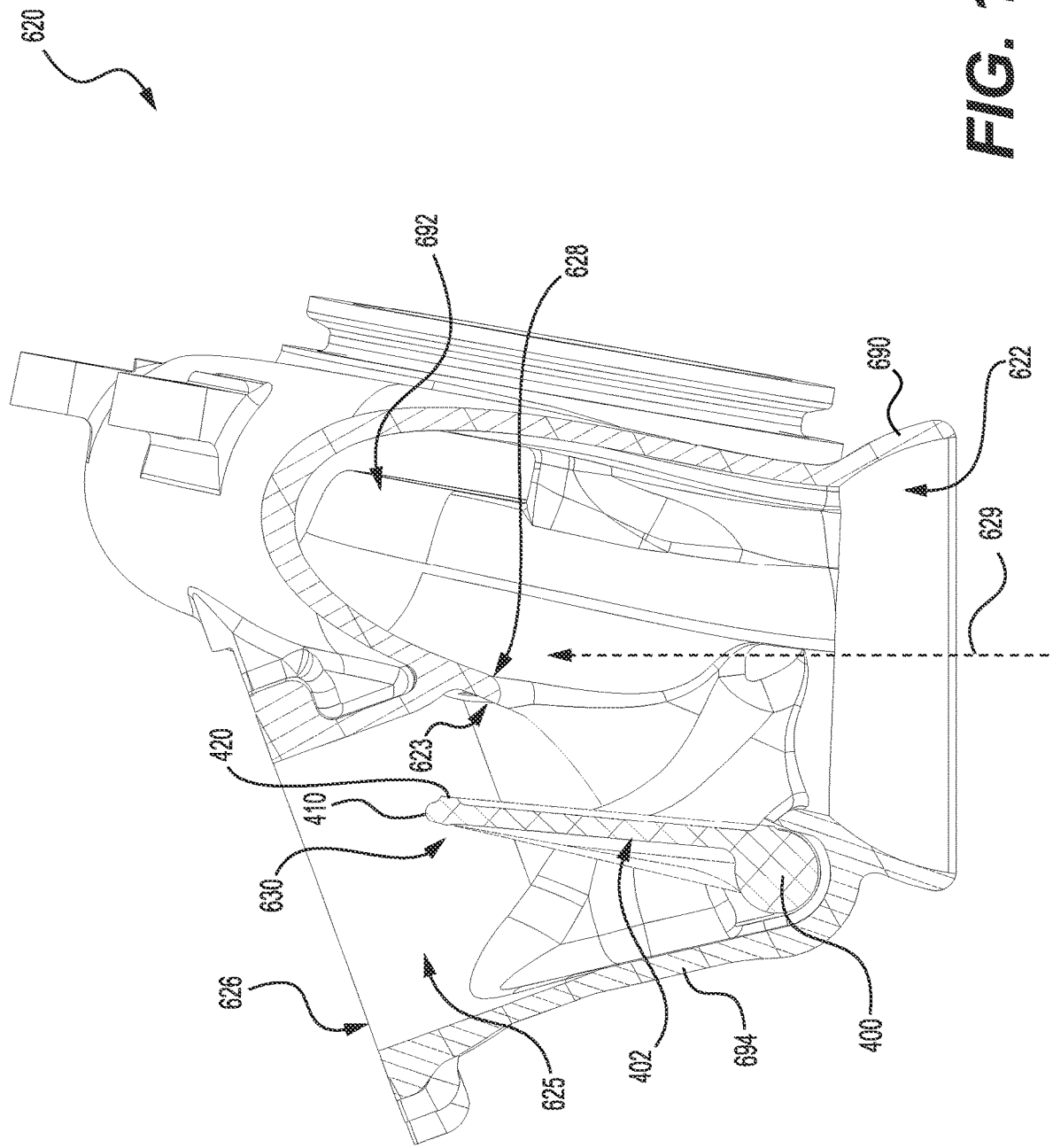
FIG. 16 is the cross-sectional view of FIG. 14, with the valve in an intermediate position.
Figure 17:
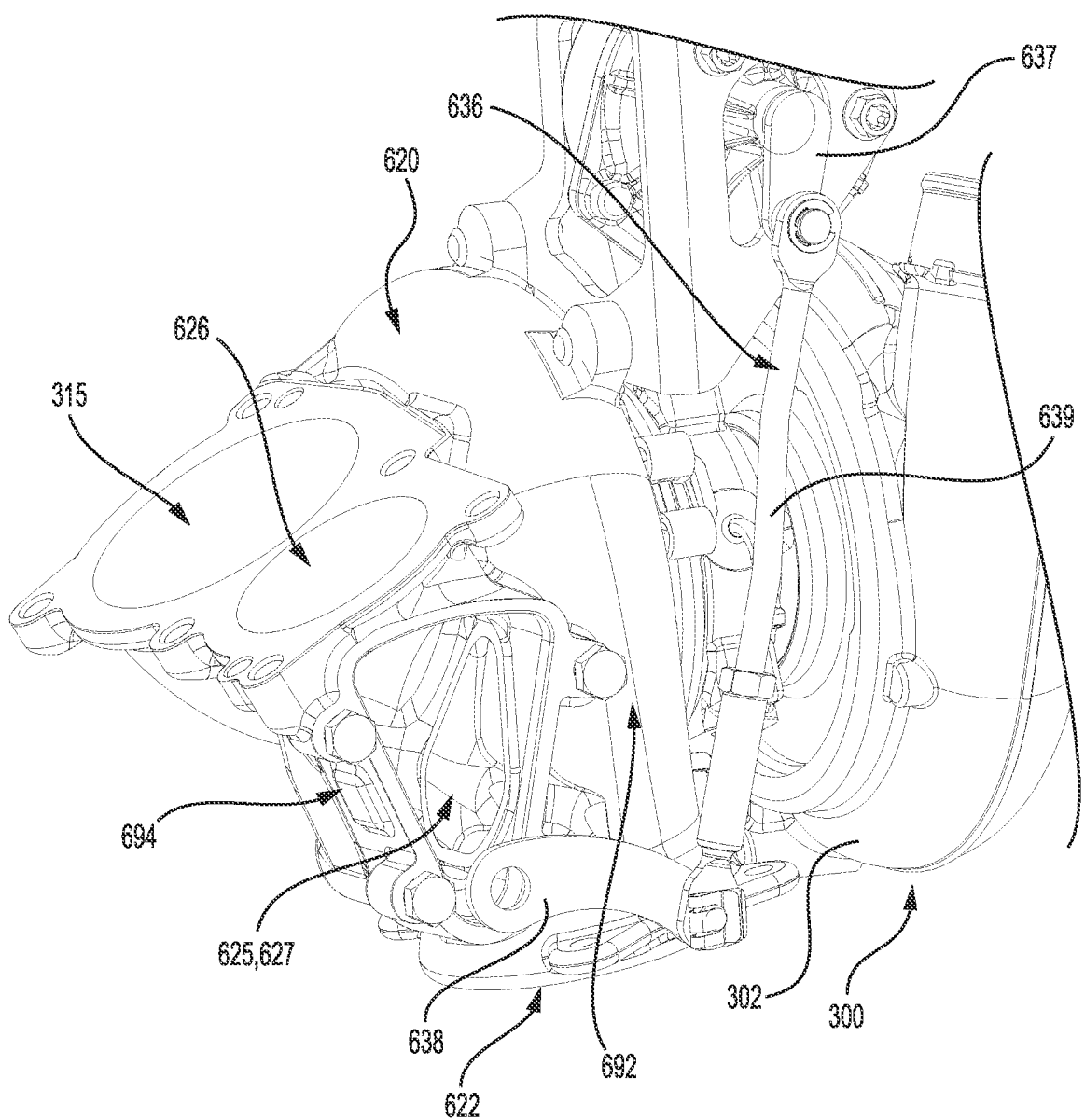
FIG. 17 is a perspective view of portions of the turbocharger and the bypass conduit of FIG. 12, with a portion of the top of the bypass conduit and the valve having been removed.
Figure 18:
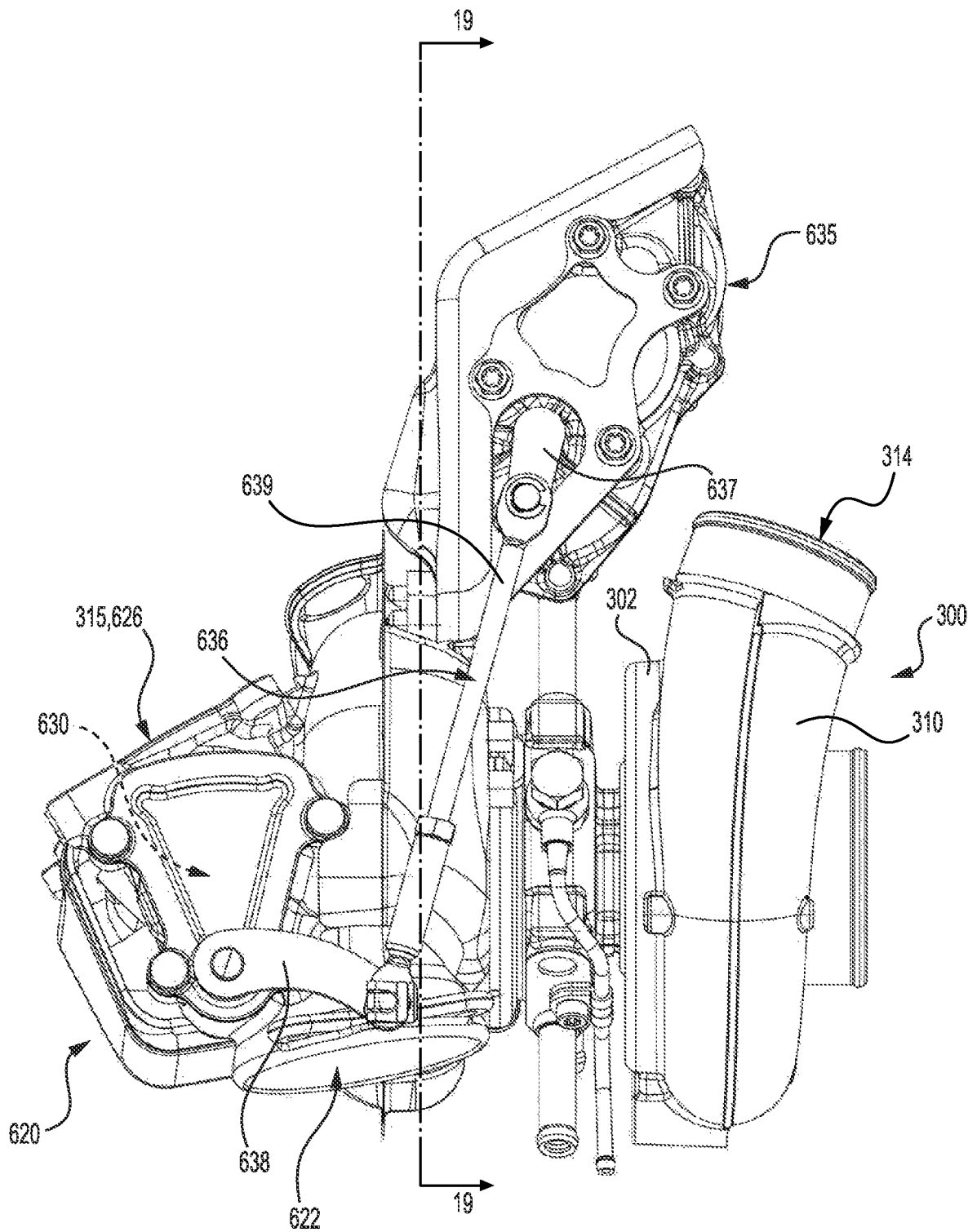
FIG. 18 is a top plan view of the turbocharger and bypass conduit of FIG. 12.

A cross-section of the bypass conduit 620 is illustrated in FIGS. 14 to 16 to show the different positions of the valve 630. FIG. 14 illustrates the closed position; FIG. 15 illustrates the open position (also illustrated in FIG. 25); and FIG. 16 illustrates one of the many possible intermediate positions of the valve 630. As can be seen, the valve 630 is oriented in the bypass conduit 620 such that the rounded tip 410 is downstream of the base portion 400. That is, in the open, closed and intermediate positions, the rounded tip 410 of the valve 630 is downstream of the base portion 400. The exhaust gas flow through the bypass conduit 620 for each of the relative positions of the valve 630 will be described in more detail below. As can be seen in FIG. 14, in its closed position, the valve 630 contacts the valve seat 623. More specifically, in the closed position, the ridge 420 of the body portion 402 of the valve 630 sits against the valve seat 623.

Figure 30:
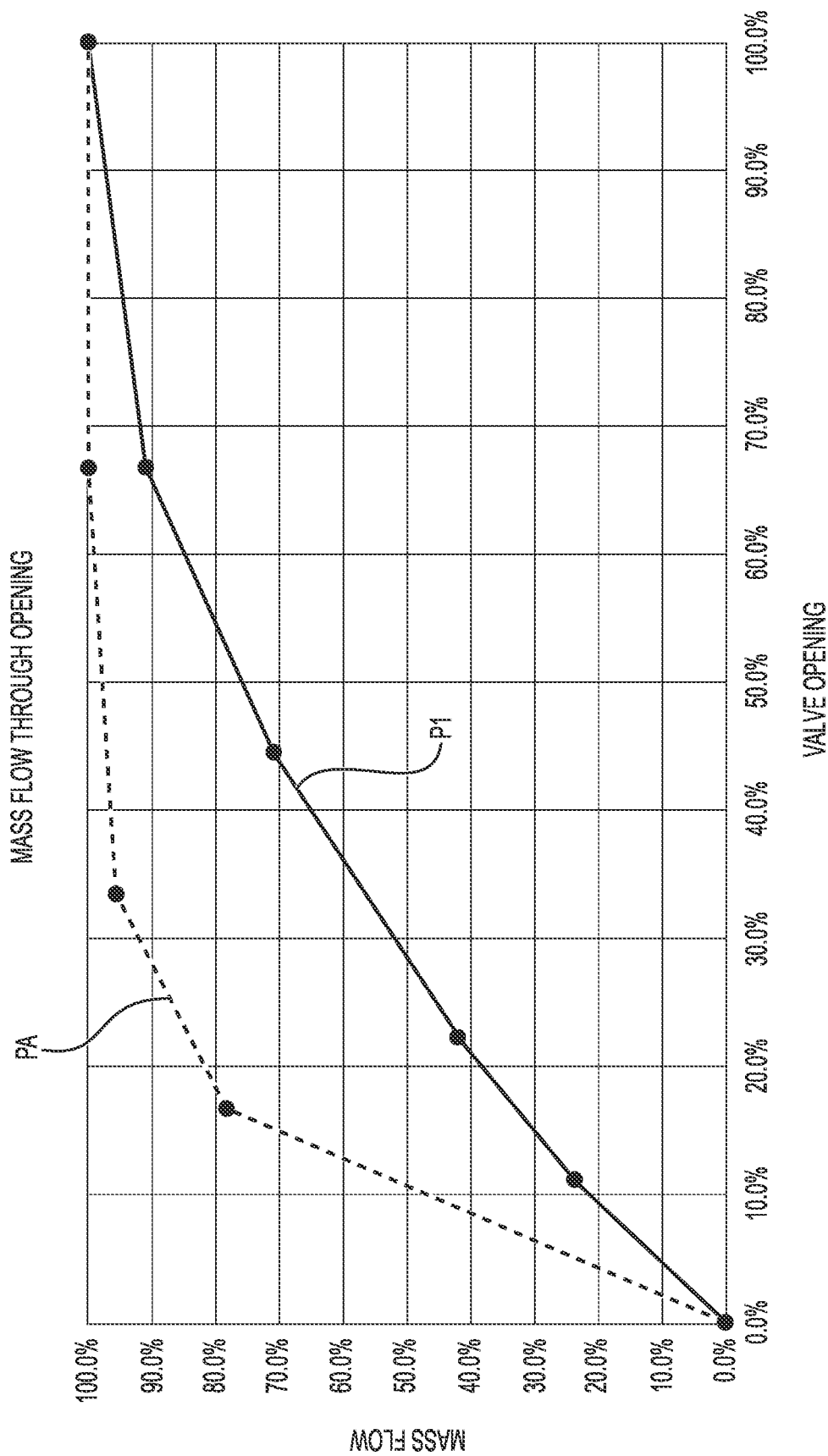
FIG. 30 is a chart representing a percentage mass flow through an opening as a function of a position of a valve.

In relation to a circular valve, the generally elongated shape of the valve 630 as described above establishes a more linear relationship between the mass flow of exhaust gas through the opening 627 and the angle at which the valve 630 is open. In other words, a greater control of the mass flow of exhaust gas through the opening 627 is made possible by the shape of the valve 630. Consequently, back pressure within the exhaust system 600 caused by opening the valve 630 can be controlled more precisely than with a circular valve. This can be seen in the chart of FIG. 30 which illustrates a percentage mass flow through an opening as a function of a position of a valve (expressed as a percentage—0% corresponding to the closed position of the valve; 100% corresponding to the fully open position of the valve) for the valve 630 of the present technology and for a circular valve. The percentage mass flow reaches 100% when the valve is in the open position (for the valve 630 this corresponds to a 45° angle, but is approximately 90° for the circular valve). Notably, the performance curve P1 represents the percentage mass flow through the opening 627 as a function of the position of the valve 630 in accordance with the present technology. By way of contrast, the performance curve PA represents the percentage mass flow through a circular opening as a function of the position of its corresponding circular valve. As can be seen, in accordance with the present technology, the relationship between the mass flow percentage through the opening 627 and the position of the valve 630 is markedly more linear than for the circular valve, particularly at smaller angles of the valve (e.g., below 45%—i.e., below 20° for the valve 630).

In addition to the particular shape of the valve 630, the different passages defined by the bypass conduit 620 are also oriented in a particular manner. For instance, with reference to FIG. 14, in this embodiment, the bypass outlet 626 of the bypass outlet portion 694 and the outlet 615 of the turbine outlet portion 692 face directions that are not parallel to one another. In particular, an angle ψ is formed between a plane 657 extending through the outermost face of the bypass outlet portion 694 that defines the bypass outlet 626 and a plane 659 extending through the outermost face of the turbine outlet portion 692 that defines the outlet 615. The angle ψ formed between the planes 657, 659 measures between 40° and 80° inclusively. More specifically, in this embodiment, the angle ψ measures approximately 60°.

Furthermore, with continued reference to FIG. 14, an angle β formed between a plane 661 extending through the periphery of the valve seat 623 that defines the opening 627 and the central axis 629 of the exhaust inlet 622 measures between 0° and 40° inclusively. In particular, in this embodiment, the angle β measures approximately 20°. An angle α formed between an axis 655 normal to the plane 661 and the central axis 629 of the exhaust inlet 622 measures between 100° and 140° inclusively. In particular, in this embodiment, the angle α measures approximately 115°. An angle γ formed between the central axis 629 of the exhaust inlet 622 and an axis 651 normal to the plane 657 extending through the outermost face of the bypass outlet portion 694 that defines the bypass outlet 626 measures between 0° and 40° inclusively. In particular, in this embodiment, the angle γ measures approximately 20°. Lastly, an angle φ formed between the plane 657 extending through the outermost face of the bypass outlet portion 694 that defines the bypass outlet 626 and an axis 653 normal to the plane 659 extending through the outermost face of the turbine outlet portion 692 that defines the outlet 615 measures between 10° and 50° inclusively. In particular, in this embodiment, the angle 4 measures approximately 30°. It is to be understood that, in this embodiment, the axis 653 is parallel to the turbine axis 353 about which the turbine wheel 351 rotates. In particular, the axis 653 is coaxial with the turbine axis 353.

The exhaust system 600 further includes the system controller 500, which is operatively connected to an engine control unit (or ECU) and/or the electrical system (not shown) of the snowmobile 10. The engine control unit is in turn operatively connected to the engine 26. As will be described in more detail below, the system controller 500 is also operatively and communicatively connected to an atmospheric pressure sensor 504, also referred to as an air intake sensor 504, for sensing the atmospheric or ambient air pressure of the intake air coming into the air intake system 100. It should be noted that the atmospheric pressure sensor 504, also referred to herein as an intake pressures sensor 504, senses the air pressure in the primary airbox 120, and as such measures the air intake pressure from air entering either from the ambient air around the snowmobile 10 and/or the air entering the primary airbox 120 from the turbocharger 300.

Similarly, the system controller 500 is also operatively and communicatively connected to an atmospheric temperature sensor 505 (FIG. 5), also referred to as an air intake temperature sensor 505, for sensing the atmospheric or ambient air temperature of the intake air coming into the air intake system 100. It should be noted that the atmospheric temperature sensor 505 senses the air temperature in the primary airbox 120, and as such measures the air intake temperature from air entering either from the ambient air around the snowmobile 10 and/or the air entering the primary airbox 120 from the turbocharger 300.

The actuator 635 for selectively moving the valve 630 is communicatively connected to the system controller 500 such that the position of the valve 630 is controllable thereby. It is contemplated that the valve 630 could be differently controlled or moved, depending on the implementation.

As is illustrated in the schematic diagram of FIG. 8 and as will be described in more detail below, the system controller 500 is also operatively connected to the throttle valve position sensor 588 for determining the position of the throttle valve 39, a rate of opening of the throttle valve 39, or both. In some modes of operation of the exhaust system 600, the valve 630 is selectively moved based on the throttle valve position determined by the throttle valve position sensor 588. In some modes of operation of the exhaust system 600, the valve 630 is selectively moved based on the rate of change of the throttle valve position or the rate of opening of the throttle valve 39, as determined by the throttle valve position sensor 588.

As is illustrated schematically in FIG. 8 and as will also be described in more detail below, the system controller 500 is further connected to an exhaust pressure sensor 590 for sensing the pressure at a point along an exhaust path of the engine 26, near the exhaust outlets 29. The pressure sensed by the exhaust pressure sensor 590 is used to determine the back pressure of the engine 26. Back pressure is understood to be the resistance to the flow of the exhaust gas between the engine 26 and an outlet of the muffler 650 due, at least in part, to twists, bends, obstacles, turns and sharp edges present in the various components of the exhaust system 600. In the present technology, reducing back pressure can assist in optimizing performance of the engine 26, as high back pressure can negatively impact the efficiency of the engine performance. Reducing the amount of back pressure in the exhaust system 600 may also have the effect of reducing what is known as "turbo lag", which is a delay in the response of a turbocharged engine after the throttle lever 86 has been moved for operating the throttle system.

Furthermore, in order to ensure good scavenging within the cylinders of the engine 26, in this embodiment, a ratio of the exhaust pressure over the intake pressure (as measured by the sensors 590, 504 respectively) is kept relatively constant. Notably, in this embodiment, the ratio of the exhaust pressure over the intake pressure is maintained between 1.1 and With reference to FIG. 5, in the present implementation, the exhaust pressure sensor 590 is configured to sense the pressure along the exhaust path of the engine 26. In particular, the exhaust pressure sensor 590 has a sensing port (not shown) which is fluidly connected to the exhaust pipe 202. In the present implementation, the exhaust pressure sensor 590 senses a pressure within the diverging portion 605 of the exhaust pipe 202 but it is contemplated that the exhaust pressure sensor 590 could be configured so as to sense a pressure along other areas of the exhaust pipe 202. The sensing port of the exhaust pressure sensor 590 is connected via intermediate tube members to the exhaust pipe 202 since the exhaust pressure sensor 590 is not designed to withstand the elevated temperatures within the exhaust pipe 202. Notably, a metallic tube 593 is fluidly connected to the exhaust pipe 202, and a rubber tube 591 is in turn fluidly connected between the metallic tube 593 and the sensing port of the exhaust pressure sensor 590. The lengths and diameters of the tubes 591, 593 are chosen so that pressure waves travelling through the exhaust pipe 202 are not significantly distorted when they arrive at the sensing port of the exhaust pressure sensor 590, thus ensuring greater accuracy of the pressure sensed by the exhaust pressure sensor 590. It is contemplated that the exhaust pressure sensor 590 could be differently arranged, depending on details of a particular implementation. In some implementations, the system 600 could further include a differential sensor for determining a pressure differential between the air intake pressure entering the engine 26 and the exhaust pressure of exhaust gas exiting the engine 26. It is also contemplated that the differential sensor could replace one or both of the intake pressure sensor 504 and the exhaust pressure sensor 590 in some implementations.

Figure 8:
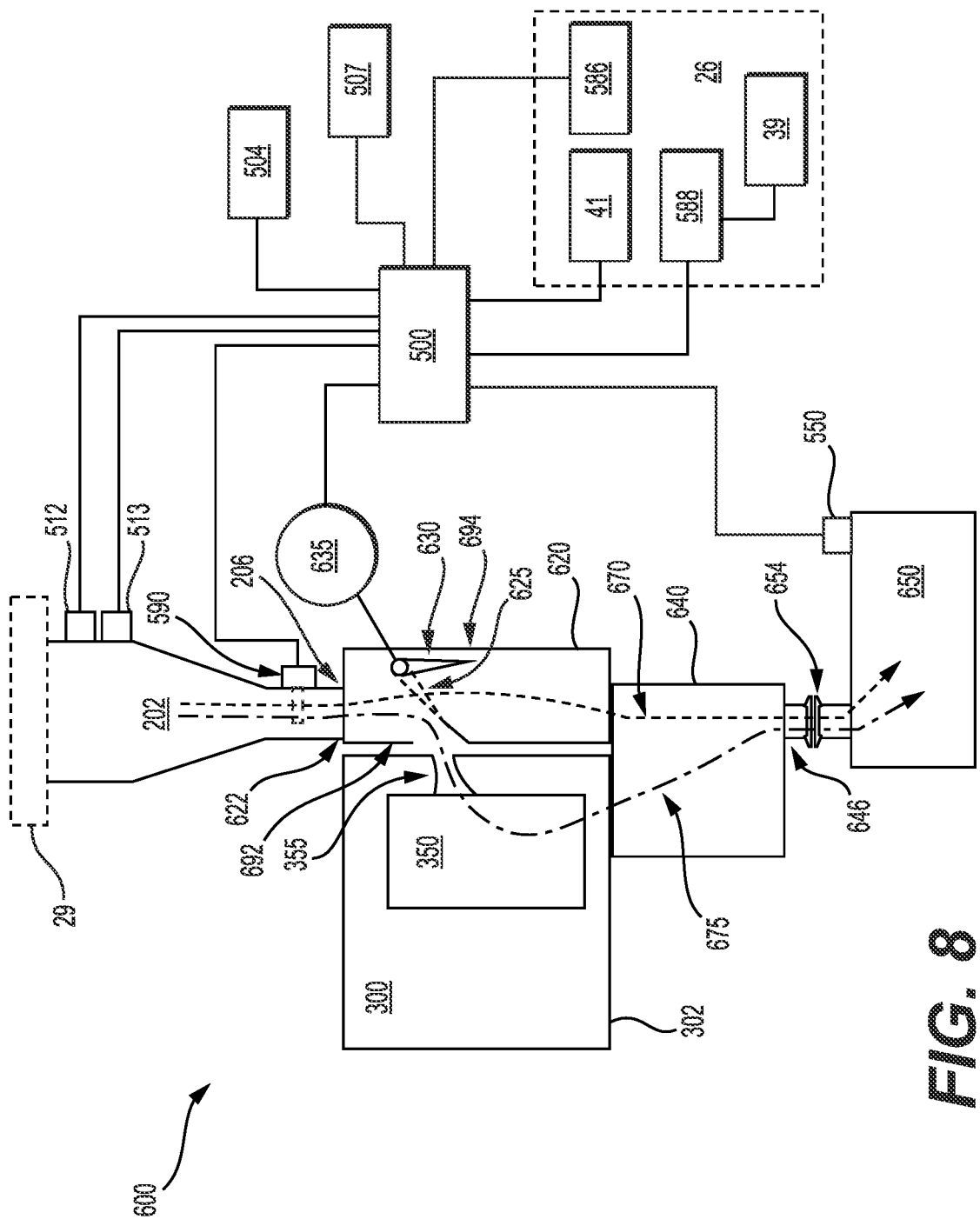
FIG. 8 is a schematic representation of the exhaust system of FIG. 2.
Figure 9:
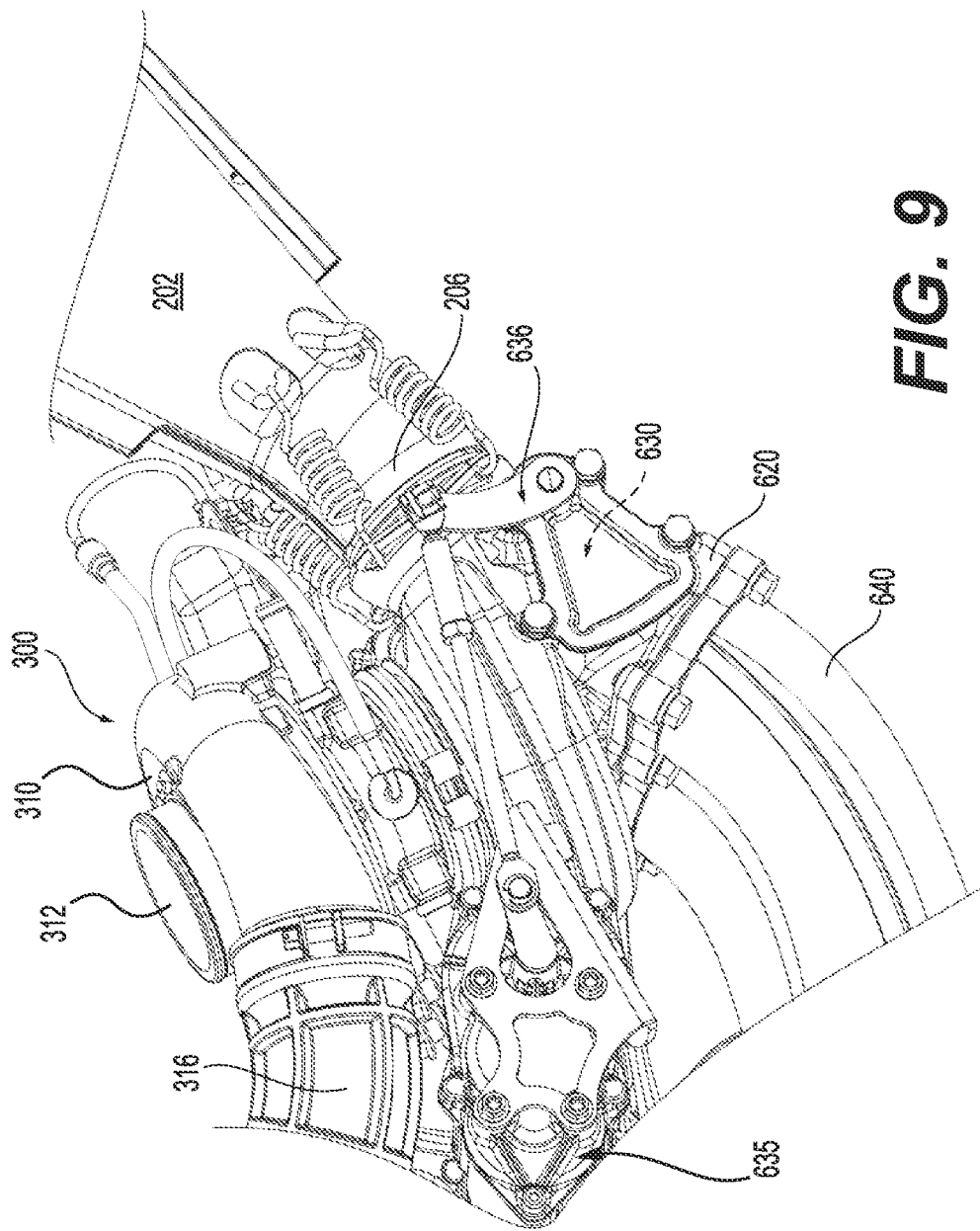
FIG. 9 is a close-up view of the portions of the air intake system and exhaust system of FIG. 5.

As is also illustrated in FIG. 8, the system controller 500 is further connected to several sensors for monitoring various exhaust system components. The system controller 500 is communicatively connected to an exhaust pipe temperature sensor 512 to detect the temperature of the exhaust pipe 202. As can be seen in FIG. 5, the exhaust pipe temperature sensor 512 includes a temperature probe connected to an outer wall of the exhaust pipe 202 within the converging section 607, but other positions along the exhaust pipe 202 are contemplated. The temperature probe extends within the exhaust pipe 202 so as to measure the temperature of the exhaust gas circulating therein. The system controller 500 is also communicatively connected to an exhaust oxygen sensor 513 to detect a concentration of oxygen in the exhaust transiting the exhaust pipe 202. As can be seen in FIG. 5, the exhaust oxygen sensor 513 includes a probe connected to and extending through the outer wall of the exhaust pipe 202 within the converging section 607, but other positions along the exhaust pipe 202 are contemplated.

Similarly, the system controller 500 is communicatively connected to a muffler temperature sensor 550 to detect the temperature of the muffler 650. These sensors 512, 550 could be used to monitor possible overheating or temperature imbalances, as well as to provide information to the system controller 500 to use in control methods such as those described herein. In order to determine an engine speed of the engine 26, the system controller 500 is further communicatively connected to an engine sensor 586 disposed in communication with the engine 26.

Figure 20C:
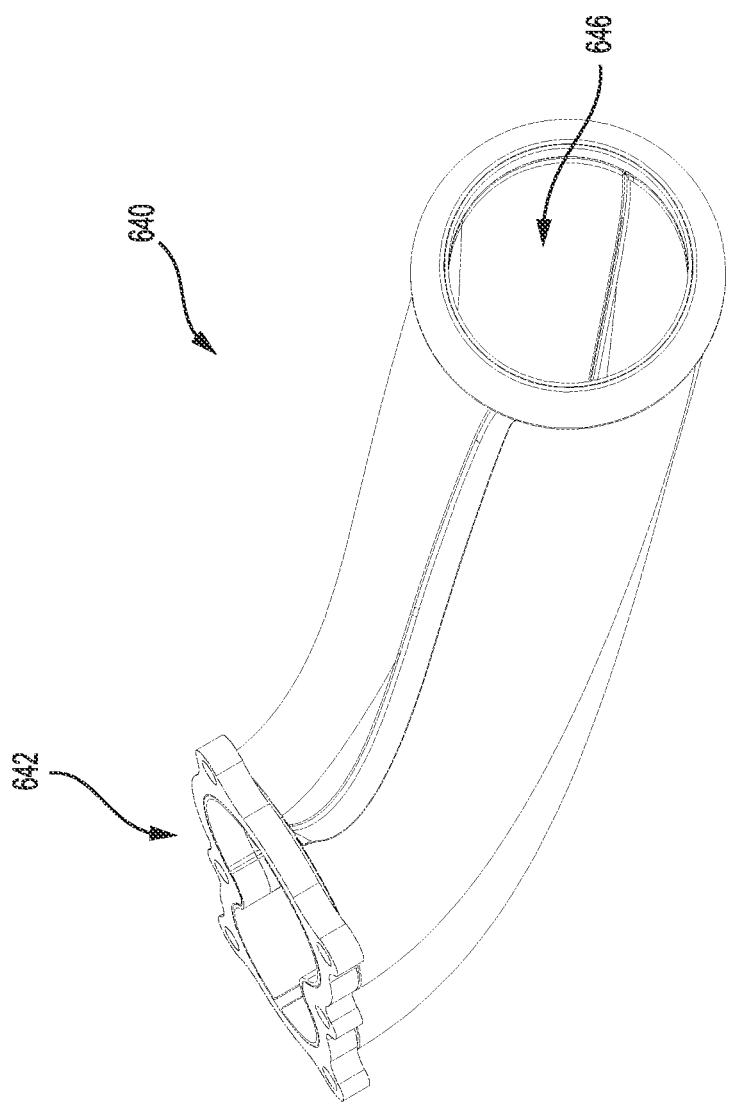
FIG. 20C is a bottom plan view of the exhaust collector of FIG. 20A.

The exhaust system 600 further includes an exhaust collector 640 fluidly connected to the bypass conduit 620 and the turbocharger 300. The exhaust collector 640, shown in isolation in FIGS. 20A to 20C, includes an inlet 642 through which the exhaust collector 640 receives exhaust gas from both the bypass conduit 620 and the exhaust turbine 350.

More specifically, the inlet 642 receives exhaust gas that bypasses the exhaust turbine 350 and exits through the outlet 626 of the bypass conduit 620. The inlet 642 also receives exhaust gas that has passed through the exhaust turbine 350 from an outlet 315 of the turbocharger housing 302. The inlet 642 includes two portions: a lower portion 643 and an upper portion 645. The lower and upper portions 643, 645 are integrally connected to define a peanut-shaped opening in the inlet 642. It is contemplated that the inlet 642 could be differently shaped depending on the implementation.

The lower portion 643 is fluidly connected to the housing 302 to receive exhaust gas therethrough from the exhaust turbine 350 through the outlet 315. The upper portion 645 is fluidly connected to the bypass conduit outlet 626 to receive therethrough the exhaust gas that has bypassed the exhaust turbine 350. The exhaust collector 640 also includes an outlet 646, through which exhaust gas passing into the exhaust collector 640 exits. It is contemplated that the two inlet portions 643, 645 could be separated in some implementations, such that the exhaust collector 640 could be generally Y-shaped for example.

The exhaust collector 640 is bolted to the housing 302 and the bypass conduit 620 using through-holes 641 defined in a periphery of the inlet 642. It is contemplated that the exhaust collector 640 could be differently connected to the turbocharger housing 302 and the bypass conduit 640 in different implementations. It is also contemplated that the exhaust collector 640 could be integrally formed with the bypass conduit 620 and/or the turbocharger housing 302.

Figure 10:
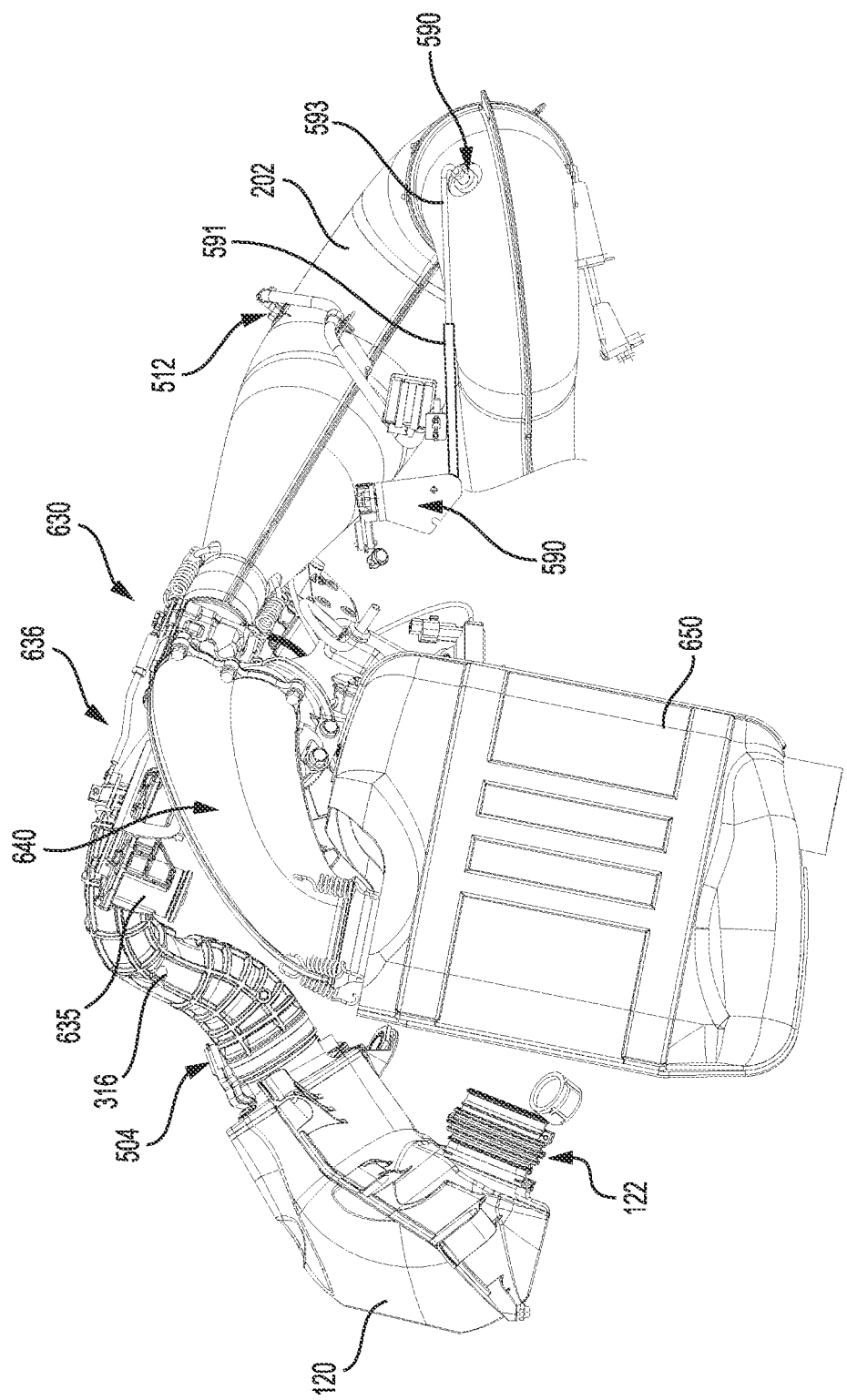
FIG. 10 is a right side elevation view of portions of the air intake system and the exhaust system of FIG. 2.
Figure 11:
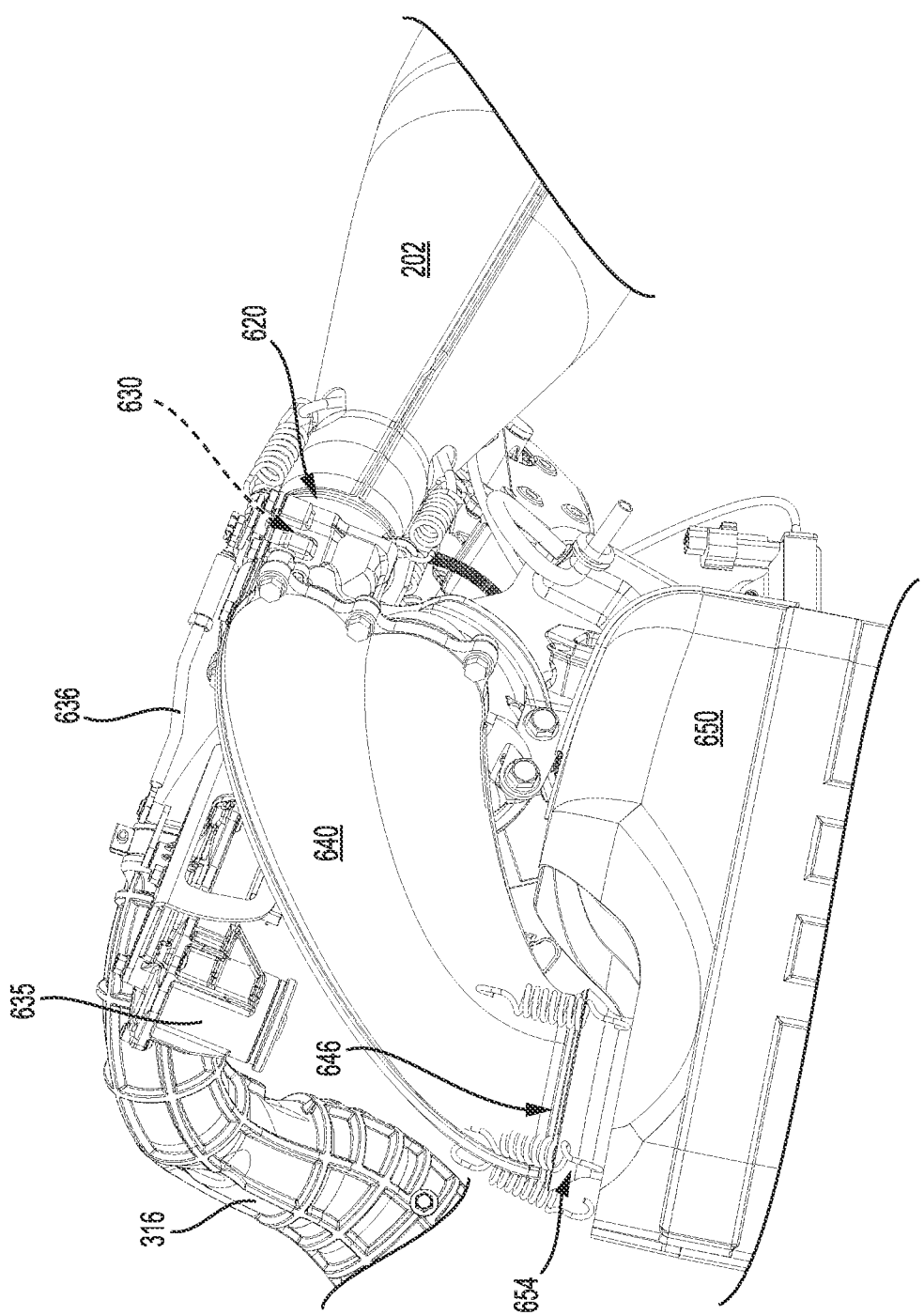
FIG. 11 is a close-up view of the portions of the air intake system and exhaust system of FIG. 10.

With reference to FIG. 10, the exhaust system 600 includes a muffler 650. The muffler 650 includes one muffler inlet 654 through which to receive exhaust gas from the exhaust system 600. The muffler 650 is fluidly connected to the collector outlet 646 of the exhaust collector 640. The muffler inlet 654 and the collector outlet 646 are held in place by springs as can be seen in the Figures. It is contemplated that different methods could be employed to connect the muffler 650 to the exhaust collector 640. As can be seen in the Figures, the muffler 650 includes only the single inlet 654 for receiving exhaust gas both bypassing and passing through the exhaust turbine 350.

Flow of the exhaust gas through the exhaust system 600, specifically between the exhaust pipe 202 and the muffler 650, will now be described in more detail. As is described briefly above, the valve 630 in the bypass conduit 620 selectively controls the flow of exhaust gas either into the exhaust turbine 350 or bypassing the exhaust turbine 350 by sending the exhaust gas out through the conduit outlet portions 692, 694.

In the present technology, the bypass conduit 620 is designed and arranged to balance two competing interests: the first being to allow for efficient exhaust gas flow when bypassing the turbocharger 300 in order to operate the engine 26 as a naturally aspirated engine 26, and the second being not impeding efficient operation of the turbocharger 300 when desired. In traditional turbo-charged engines, all exhaust gas would be directed to the turbocharger 300, with an associated bypass only being used in the case of too much exhaust gas flow into the turbocharger. In the present technology, exhaust gas can be directed either to bypass the turbocharger 300 for naturally aspirated operation or into the turbocharger 300 for turbo-charged operation. The inclusion of the intake bypass valve 123 further aids in allowing for naturally aspirated operation or turbo-charged operation of the engine 26. As is described above, the intake bypass valve 123 allows for atmospheric or ambient airflow into the primary airbox 120 when the pressure in the primary airbox 120 falls below a threshold, due the turbocharger 300 not operating or spooling up and thus not providing sufficient compressed air to the primary airbox 120. By including both the valve 630 and the bypass valve 123, each of which are independently operated, both air intake and exhaust gas are managed to allow for naturally aspirated or turbo-charged operation of the engine 26.

As is mentioned above, exhaust gas entering the bypass conduit 620 flows generally parallel to the central axis 629 of the inlet 622. As can be seen in FIGS. 13 to 16, the central axis 629, and thus the center of the flow of exhaust gas, is directed to the turbine outlet portion 692 side of the flow divider 628. As the flow divider 628 is situated toward the bypass side with respect to the central axis 629, it should be understood that more than half of the exhaust gas flow is therefore initially directed toward the turbine outlet portion 692.

On the bypass outlet portion 694 side of the central axis 629 (to the left of the axis 629 in the Figures), it can also be seen that some of the exhaust gas flow, parallel to the central axis 629, is directed toward the opening 627. As the conduit inlet 622 and opening 627 of the passage 625 are at least partially aligned along the direction of the central axis 629, at least a portion of the exhaust gas entering the conduit inlet 622 parallel to the flow axis flows unobstructed into the bypass passage 625 when the valve 630 is in the open position. As the engine 26 is intended to be naturally aspirated in standard operation, at least a portion of exhaust gas flowing generally directly through the bypass conduit 620 and into the exhaust collector 640, with a minimum of turns, bends, etc. further assists in decreasing back pressure, again in the aims of optimizing engine performance.

It should be noted that, as will be described further below, the percentage of exhaust gas flow directed toward each of the output conduits 692, 694 does not necessarily correspond to the percentage of exhaust gas that flows therethrough.

The two different flow patterns of exhaust gas entering the bypass conduit 620 will now be described in reference to flow paths 670, 675 schematically illustrated in FIG. 8. Depending on the position of the valve 630, the exhaust gas can flow along a bypass exhaust flow path 670, a turbine exhaust flow path 675, or a combination of the two paths 670, 675.

Exhaust gas flowing along the bypass exhaust flow path 670 passes through the passage 625, which is not blocked by the valve 630 when the valve 630 is in the open position. The bypass exhaust flow path 670 is defined from the exhaust inlet 622 of the bypass conduit 620 to the exhaust collector 640. Exhaust gas flowing along the bypass exhaust flow path 670 passes through the exhaust inlet 622, then through the bypass conduit 620, and then into the exhaust collector 640. Specifically, exhaust gas flowing along the bypass exhaust flow path 670 is received in the upper portion 645 of the inlet 642.

The turbine exhaust flow path 675 is similarly defined from the exhaust inlet 622 of the bypass conduit 620 to the exhaust collector 640. Exhaust gas flowing along the second exhaust flow path passes through the exhaust inlet 622, then through the turbine outlet portion 692 of the bypass conduit 620, then through the exhaust turbine 350, and then into the exhaust collector 640. Specifically, exhaust gas flowing along the turbine exhaust flow path 675 is received in the lower portion 643 of the inlet 642.

For each flow path 670, 675, exhaust gas passes out of the collector outlet 646 and into the muffler inlet 654. The single muffler inlet 654 of the muffler 650 receives the exhaust gas from both the bypass exhaust flow path 670 and turbine exhaust flow path 675.

Even though the majority of exhaust gas flow is oriented toward the turbine outlet portion 692, a majority of the exhaust gas entering the exhaust inlet 622 flows along the bypass exhaust flow path 670, through the bypass outlet portion 694, when the valve 630 is in the open position. The flow path 675 through the exhaust turbine 350, designed to turn under pressure from exhaust gas flowing therethrough, is more restrictive and causes more back pressure than the flow path 670 through the bypass passage 625. More of the exhaust gas is therefore directed through the passage 625, even if the initial flow direction is toward the turbine outlet portion 692. It should be noted that a portion of the exhaust gas entering the bypass conduit 620 will still flow through the exhaust turbine 350 even when the valve 630 is fully open.

When the valve 630 is in the closed position, a majority (generally all) of the exhaust gas entering the exhaust inlet 622 flows along the turbine exhaust flow path 675. As is illustrated schematically, exhaust gas flowing along the turbine exhaust flow path 675 is deflected by the valve 630, as the valve 630 blocks the passage 625 in the closed position. As some of the exhaust gas entering through the conduit inlet 622 flows in parallel to the central axis 629, at least a portion of the valve 630 is contacted by, and diverts, exhaust gas entering the inlet 622.

As is mentioned above, the valve 630 can also be arranged in an intermediate position, such as that illustrated in FIG. 16 (just as one non-limiting example). With the valve 630 in the intermediate position, a portion of the exhaust gas is allowed through the passage 625 to bypass the exhaust turbine 350 and a portion of the exhaust gas is deflected through the turbine outlet portion 692 toward the exhaust turbine 350. In the intermediate position, at least a portion of the valve 630 is contacted by the exhaust gas entering through the conduit inlet 622 and flowing parallel to the axis 629.

The exhaust gas thus flows along both of the bypass exhaust flow path 670 and the turbine exhaust flow path 675 when the valve 630 is in one of the intermediate positions. The ratio of the portion of exhaust gas flowing along the bypass exhaust flow path 670 to the portion of exhaust gas flowing along the turbine exhaust flow path 675 depends on various factors, including at least the angle at which the valve 630 is arranged. Generally, the closer the valve 630 is to the open position, the more exhaust gas will flow along the bypass exhaust flow path 670 and vice versa.

As will be described in more detail below, the valve 630 is used to manage exhaust gas flow through the flow paths 670, 675. For example, in some scenarios, the valve 630 is selectively moved to the closed position (or toward the closed position) when the engine 26 is operated below a threshold atmospheric pressure. In such a scenario, the turbocharger 300 could be used to help boost engine performance when the snowmobile 10 climbs in altitude, where the air is thinner and as such less oxygen will enter the engine 26 (having a detrimental effect on performance).

Regardless of the position of the valve 630, in this implementation, there is no physical barrier blocking air flow between the exhaust inlet 622 and the turbine inlet 355. As is mentioned above, a portion of the exhaust gas entering through the bypass inlet 622 passes through the turbine outlet portion 692 and enters the exhaust turbine 350 through the turbine inlet 355, even when the valve 630 is in the open position. The relatively small portion of exhaust gas entering the exhaust turbine 350 aids in creating a pressure difference between positions upstream from the exhaust turbine 350 and downstream therefrom. This pressure difference generally improves the responsiveness of the turbocharger 300, generally making the exhaust turbine 350 spool up more rapidly and assisting in decreasing the turbo lag.

Similarly, there is no physical barrier closing the turbine outlet 315 when the exhaust gas flows along the bypass exhaust flow path 670. As such, flow of exhaust gas out of the bypass outlet 626 causes an air pressure reduction in the turbine outlet 315. This low pressure zone also assists in decreasing the turbo lag and in increasing the spool up speed. It is also noted that there is also no barrier closing the bypass outlet 626 when the exhaust gas is directed to the turbine exhaust flow path 675 and flowing out of the turbine outlet 315.

The exhaust system 600, according to the present technology and as described above, is generally intended to be operated as a naturally aspirated engine system, with the exhaust gas generally bypassing the exhaust turbine 350, other than in specific scenarios where additional boost from the turbocharger 300 is necessitated. This is in contrast to some standard turbo-charged engine arrangements, where a turbocharger is used in standard operation and a turbocharger bypass is used to prevent overload of the compressor.

In the arrangement and alignment of the exhaust system 600 of the present technology, in contrast to conventional turbocharger arrangements, a majority of the exhaust gas flows through the passage 625 when the valve 630 is in the open position (described above). Exhaust gas flow, especially to allow the gas to bypass the turbocharger 300 without creating excessive back pressure, is further managed by the comparative cross-sections of the two flow paths 670, 675. Specifically, in the present technology, the area of the opening 627 of the passage 625 (for the bypassing flow path 670) and the intake area 354 of the exhaust turbine 350 (in the turbine flow path 675) are of similar dimensions.

The arrangement of the relative areas of the openings 627, 355 in the two flow paths 670, 675 allows exhaust gas to both bypass the exhaust turbine 350 without creating excessive back pressure (which can be detrimental to operation of the engine 26) while still allowing good exhaust gas flow through the turbine inlet 355 when the turbine 300 is solicited. According to the present technology, the area of the opening 627 is generally between 0.75 and 1.25 times the area 354 of the turbocharger inlet 355. In the present implementation, the area 354 of the turbocharger inlet 355 is slightly greater than the area of the opening 627. It is contemplated, however, that the area of the opening 627 could be greater than the area 354 of the turbocharger inlet 355 in some implementations.

In further contrast to conventional turbocharger arrangements, the bypass outlet 626 has been specifically arranged such that there is not an excessive amount of deviation of the exhaust flow necessary for the flow to travel from the bypass conduit inlet 622 to the bypass outlet 626. A normal of the bypass outlet 626 is at an angle of about 20 degrees to the central axis 629 in the present implementation (although the exact angle could vary). With this arrangement, a portion of the exhaust gas entering the inlet 622, illustrated between lines 601 and 603 in FIG. 15, both parallel to the central axis 620, will pass directly through the bypass conduit 620, meaning through the passage 625 and the opening 627, and out of the bypass outlet 626 without deviating. This is true even for a plurality of positions of the valve 630 between the fully open and fully closed positions.

When the snowmobile 10 is not being operated below a threshold atmospheric pressure, the exhaust system 600 will tend to send exhaust gas along the bypass exhaust flow path 670 bypassing the exhaust turbine 350 and the engine 26 will operate as a naturally aspirated engine 26. When the snowmobile 10 is operated below such a threshold air intake pressure, for example at high altitudes/low atmospheric pressure, the valve 630 will move toward the closed position (either partially or completely) to send some or all of the exhaust gas to the exhaust turbine 350 to provide boost to the engine 26. More details pertaining to operation of the valve 630 with respect to operating conditions will be provided below.

Example Operation of the Exhaust System

Figure 31:
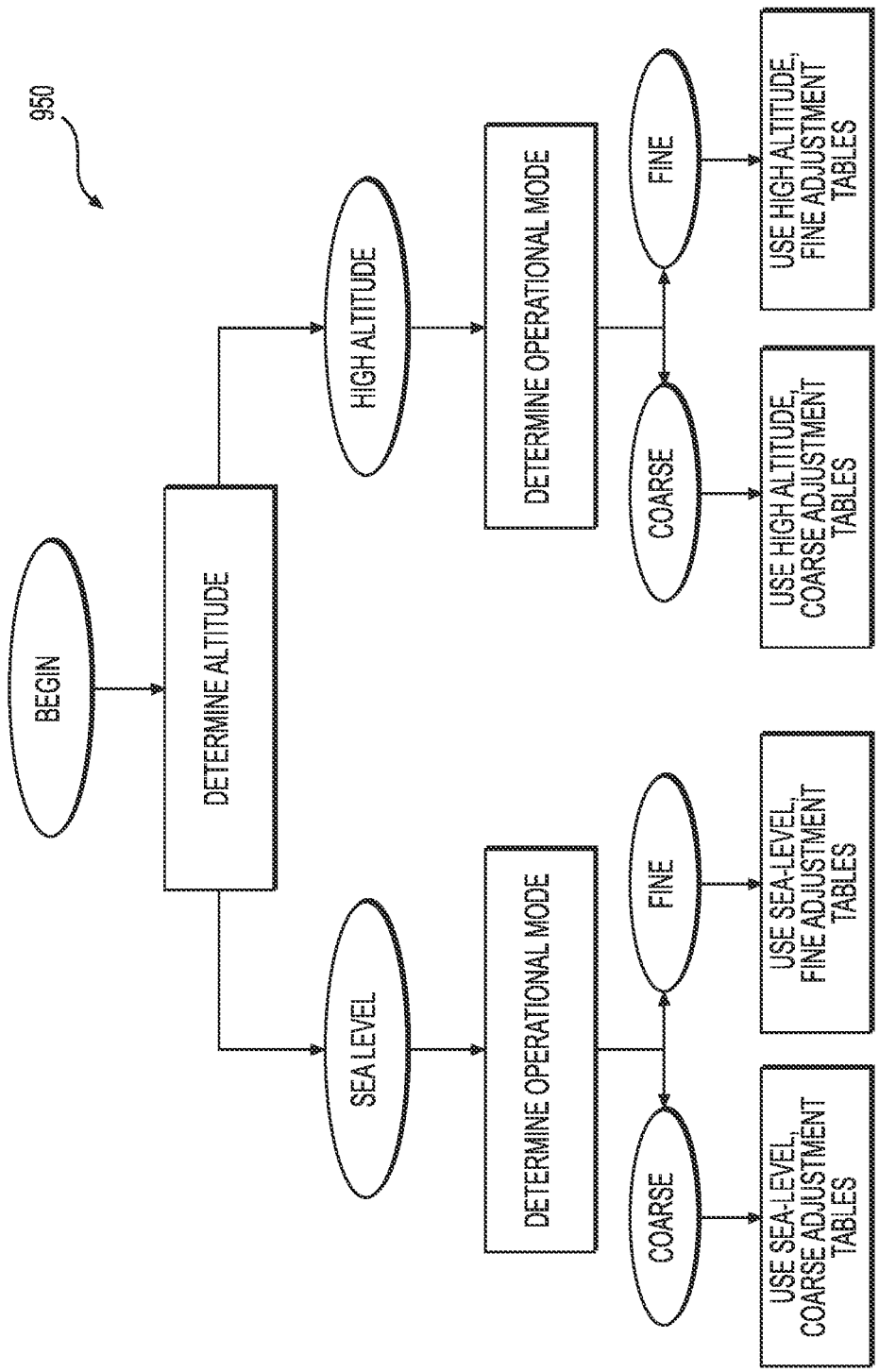
FIG. 31 is a flowchart representing an illustrative scenario of controlling exhaust gas flow through the exhaust system of FIG. 2.
Figure 32:
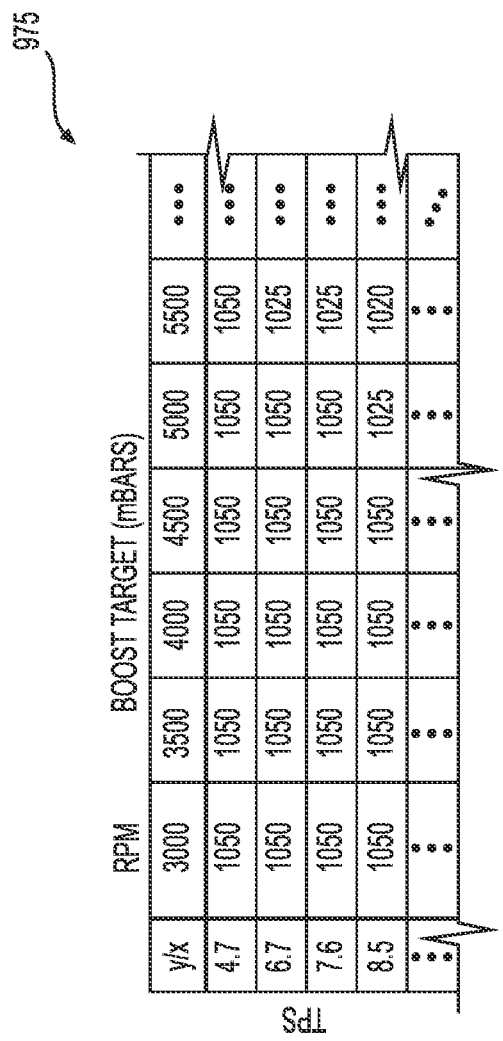
FIG. 32 illustrates an example dataset for use in the illustrative scenario of FIG. 31.

With reference to FIGS. 31 and 32, one non-limiting illustrative scenario of operation of the exhaust system 600 will now be described. Different implementations of specific methods will be described in more detail with reference to FIGS. 21 to 23. It should be noted that this is simply one non-limiting example to provide a high-level understanding of the general operation of the exhaust system 600, and different implementations and details will be set out below.

Broadly stated, the system controller 500 retrieves predetermined positions of the valve 630 from data tables (datasets) based on throttle position (TPS) and engine speed (RPM). Depending on the particular mode of operation (described further below), the exhaust pressure, input pressure, or a difference between the two are simultaneously monitored by comparing their values to similar predetermined pressure datasets. A flow-chart 950 generally depicting the steps taken by the system controller 500 when controlling the valve 630 in the present illustrative scenario is illustrated in FIG. 31.

First, the controller 500 determines whether the snowmobile 10 is being operated near sea-level or nearer to a high altitude. The relative altitude (high or low) is generally determined by the intake pressure sensor 504 by measuring the ambient air pressure entering the air intake system, but in some cases the snowmobile 10 could include an altimeter communicatively connected to the system controller 500 for determining the altitude. The system controller 500 can then retrieve the predetermined datasets of valve position and pressure corresponding to operation of the snowmobile 10 at the relevant altitude range. In order to avoid inaccurate altitude readings by the intake pressure sensor 504 caused by additional pressure created by the turbocharger 300, the altitude-related pressure reading is taken when the RPM and the TPS outputs are below a predetermined level that corresponds to an operating state of the snowmobile 10 where no boost pressure from the turbocharger 300 should be created. It is also noted that datasets corresponding to different altitudes, other than low or high, could be used. Datasets corresponding to more than two altitudes are also contemplated.

Following determination that the snowmobile 10 is either at high or low altitude, the system controller 500 then determines if the valve 630 should be adjusted according to a "coarse" adjustment regime or a "fine" adjustment regime. This determination is performed by comparing an actual boost pressure (the current air intake pressure which is supplemented by the turbocharger 300) with a predetermined desired boost target pressure based on a dataset of TPS vs RPM. The actual boost pressure produced by the turbocharger 300 is determined by the intake pressure sensor 504. A desired boost target pressure for the current TPS and RPM values is determined from a predetermined dataset, an example predetermined desired boost target pressure dataset 975 being shown in FIG. 32. When the actual boost from the turbocharger 300 is within a predetermined range or threshold of the desired boost target (for example within 5, 10, or 15 mbars of the desired boost), the fine regime will be used. Otherwise, the coarse regime will be used. Depending on the specific implementation, the predetermined range could be modified depending on factors such as ambient air temperature, altitude etc. It is further noted that the predetermined range for switching from the coarse regime to the fine regime could, in some cases, be different than the predetermined range for switching from the fine regime to the coarse regime. This hysteresis is introduced into the coarse/fine determination approach to aid in limiting rapid switching between the two control regimes. If the threshold differences for switching between the coarse and fine adjustment regimes were the same, for example, each time the pressure difference is slightly below or above the threshold the method could switch regimes in a rapid alternation between the coarse and fine adjustment regimes. This could be unnecessarily inefficient especially when the pressure difference is oscillating around the threshold value.

Figure 33:
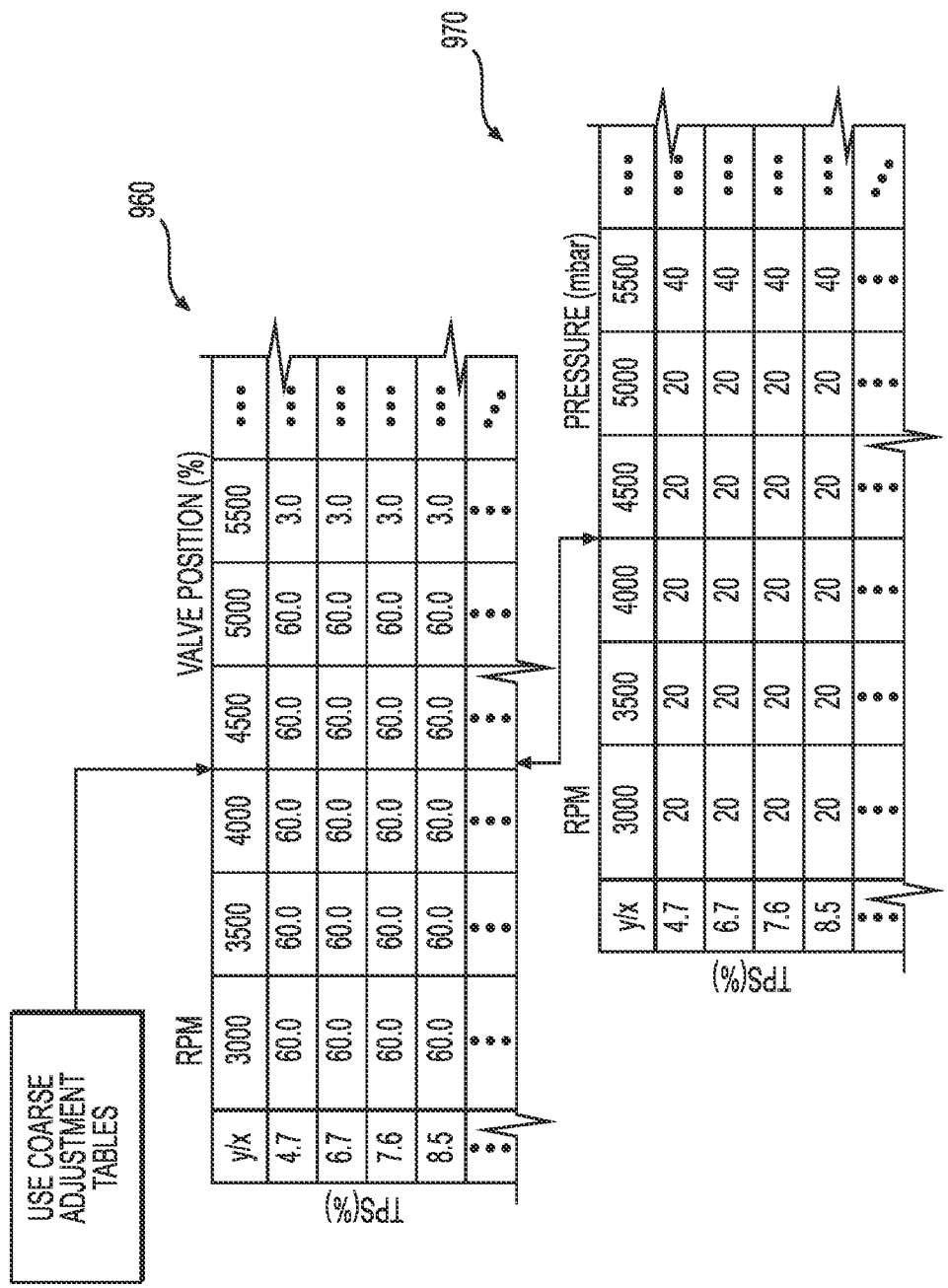
FIG. 33 illustrates additional example datasets for use in the illustrative scenario of FIG. 31.

When operating in the coarse adjustment regime, also known as a dynamic regime, the back pressure is simultaneously monitored and controlled according to a pressure dataset, in order to ensure that movement of the valve 630 to increase boost pressure does not cause a detrimental increase in back pressure. A sample pair of a valve position dataset 960 and a pressure dataset 970 are illustrated in FIG. 33 (the values are simply illustrative and are not meant to be limiting). In the case where pressure dataset 970 is being used in the coarse regime, the output values will represent a maximum value difference between the exhaust pressure and the intake pressure as will be described in more detail below.

During control of the valve 630, if the back pressure rises above a certain amount for the current operating conditions (e.g. RPM and TPS), the performance of the engine 26 could be negatively affected or at least not optimal. To impede this from happening, the representation of the maximum back pressure as determined in the dataset 970 from the current TPS and RPM values, is compared to the actual back pressure, as determined from the exhaust pressure minus the intake pressure obtained from the exhaust pressure sensor 590 and the intake pressure sensor 504 respectively. If the actual back pressure exceeds the value from the dataset 970, the system controller 500 will apply a correction to the valve position dataset 960 in order to move the valve 630 to a position that maintains the back pressure within an acceptable range, i.e. the actual pressure difference below that obtained from the dataset 970. In some cases a correction factor could be mathematically determined and applied across the dataset 960. For instance, the correction factor could be determined based on the difference between the value retrieved from the dataset 970 and the actual back pressure as determined from the pressures measured by the exhaust and intake pressure sensors 590, 504. Notably, the correction factor could be proportional to the difference between the value retrieved from the dataset 970 and the actual back pressure as determined from the pressures measured by the exhaust and intake pressure sensors 590, 504. In some implementations, rather than determining a correction factor, a different predetermined dataset 960 could be retrieved.

It is to be understood that, in order for the calculation of the actual back pressure to be accurate, the amount of time lapsed between the measurements made by the exhaust pressure sensor 590 and the intake pressure sensor 504 should be kept relatively small such that the measurements are made generally simultaneously. Notably, the pressures at the locations of the sensors 590, 504 can change rapidly and therefore if a significant amount of time is allowed to lapse between the measurement made by the exhaust pressure sensor 590 and the corresponding measurement made by the intake pressure sensor 504, the correction made to the position of the valve 630 may not be very accurate to obtain the desired back pressure. For instance, the exhaust pressure sensor 590 and the intake pressure sensor 504 make corresponding measurements within one revolution of the crankshaft 126 from one another. More specifically, in this embodiment, the exhaust pressure sensor 590 and the intake pressure sensor 504 make corresponding measurements within a tenth of a revolution of the crankshaft 126 from one another. The exhaust pressure sensor 590 and the intake pressure sensor 504 may make corresponding measurements between a tenth of a revolution of the crankshaft 126 and one revolution of the crankshaft 126 from one another but other frequencies are contemplated.

In the fine adjustment regime, fine adjustment tables, also referred to as static datasets, are used when there is a small difference between the actual boost pressure and the desired boost pressure as mentioned above. In contrast to the approach taken in coarse adjustment, the fine adjustments are made to approach and maintain the optimal intake pressure (boost pressure) into the engine 26. As small adjustments to the position of the valve 630 should not have a drastic effect on the back pressure, during the fine adjustment regime the back pressure may not be continuously monitored, as it is in the coarse regime. As with the coarse regime, the fine regime uses a valve position dataset similar to that of dataset 960, which is based on the actual TPS and RPM values, and a pressure dataset similar to that of 970 also based on the actual TPS and RPM values. The pressure dataset 970, when in the fine regime, includes values that represent only the intake pressure and that are to be compared to the actual intake pressure measure by the intake pressure sensor 504. The difference between the output from the dataset 970, when in the fine regime, and that of the actual intake pressure, will determine a correction factor to be applied to the valve position from dataset 970.

During operation, the system controller 500 continuously reevaluates the altitude and coarse/fine determinations, as there will be changes to the throttle and RPM positions as the snowmobile 10 is operated, which will also change the exhaust and intake pressures as the valve 630 is controlled to improve operation of the engine 26, and/or changes in the altitude at which the snowmobile 10 is being operated as it travels over terrain.

Figure 21:
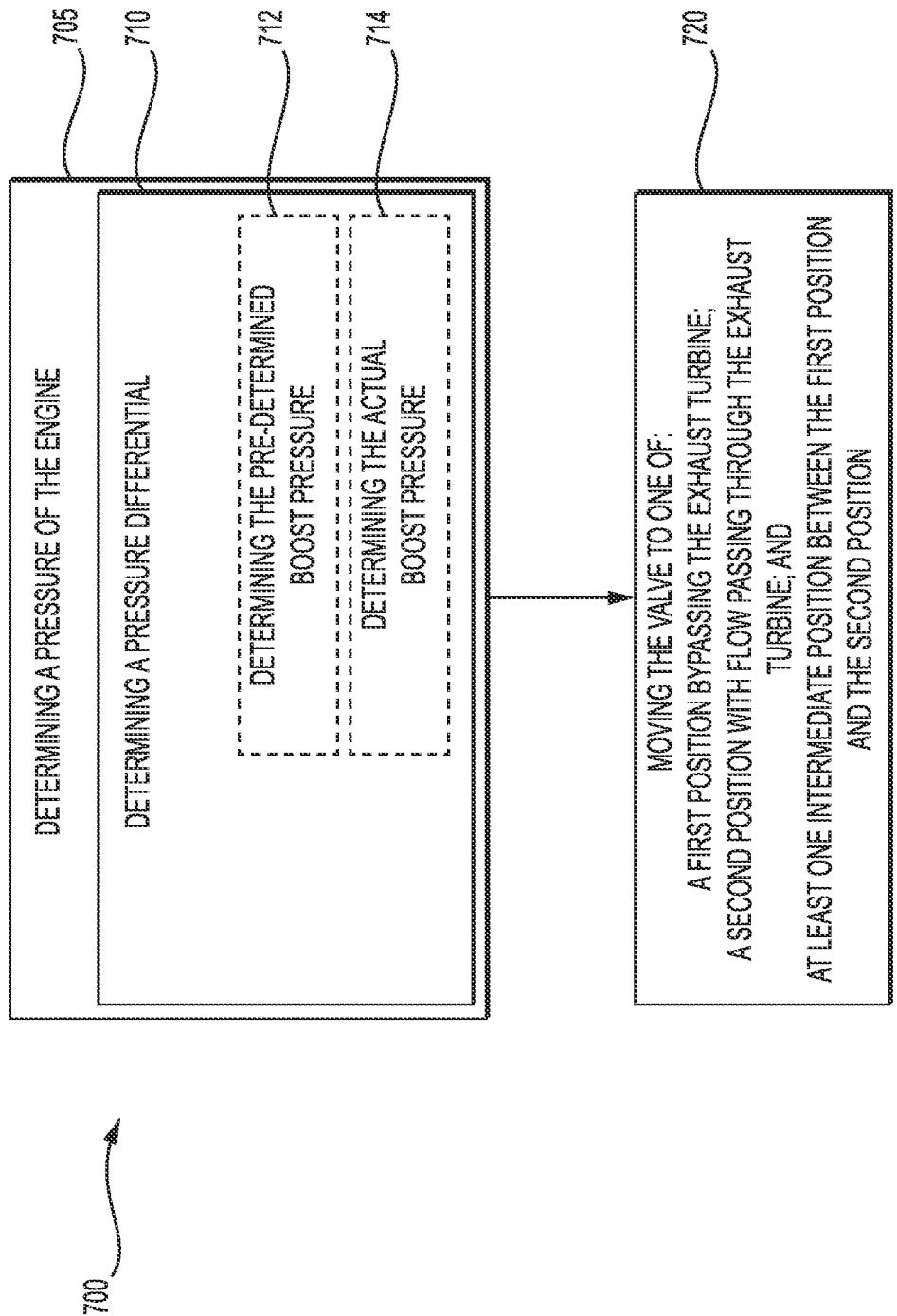
FIG. 21 is a flowchart illustrating a method, according to the present technology, of controlling exhaust gas flow through the exhaust system of FIG. 2.
Figure 22:
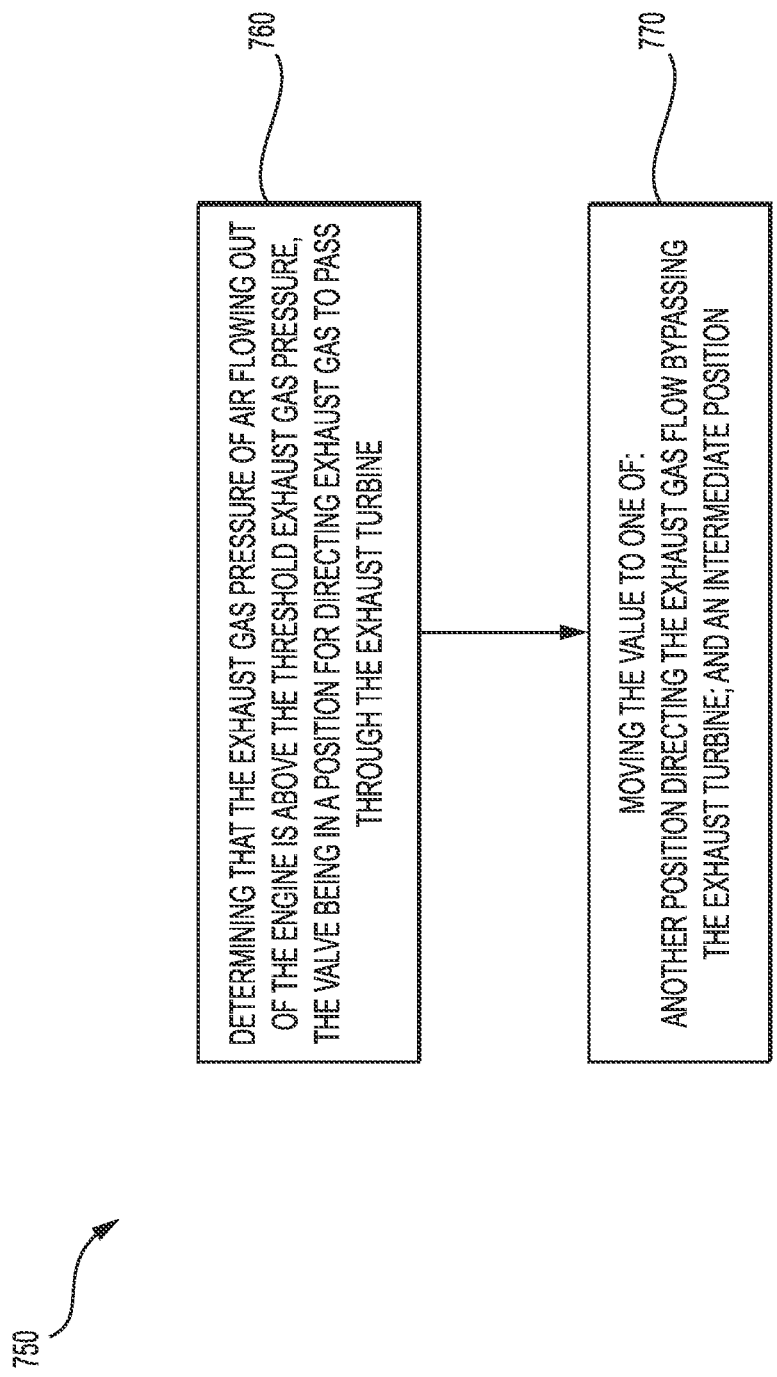
FIG. 22 is a flowchart illustrating another method according to the present technology of controlling exhaust gas flow through the exhaust system of FIG. 2.
Figure 23:
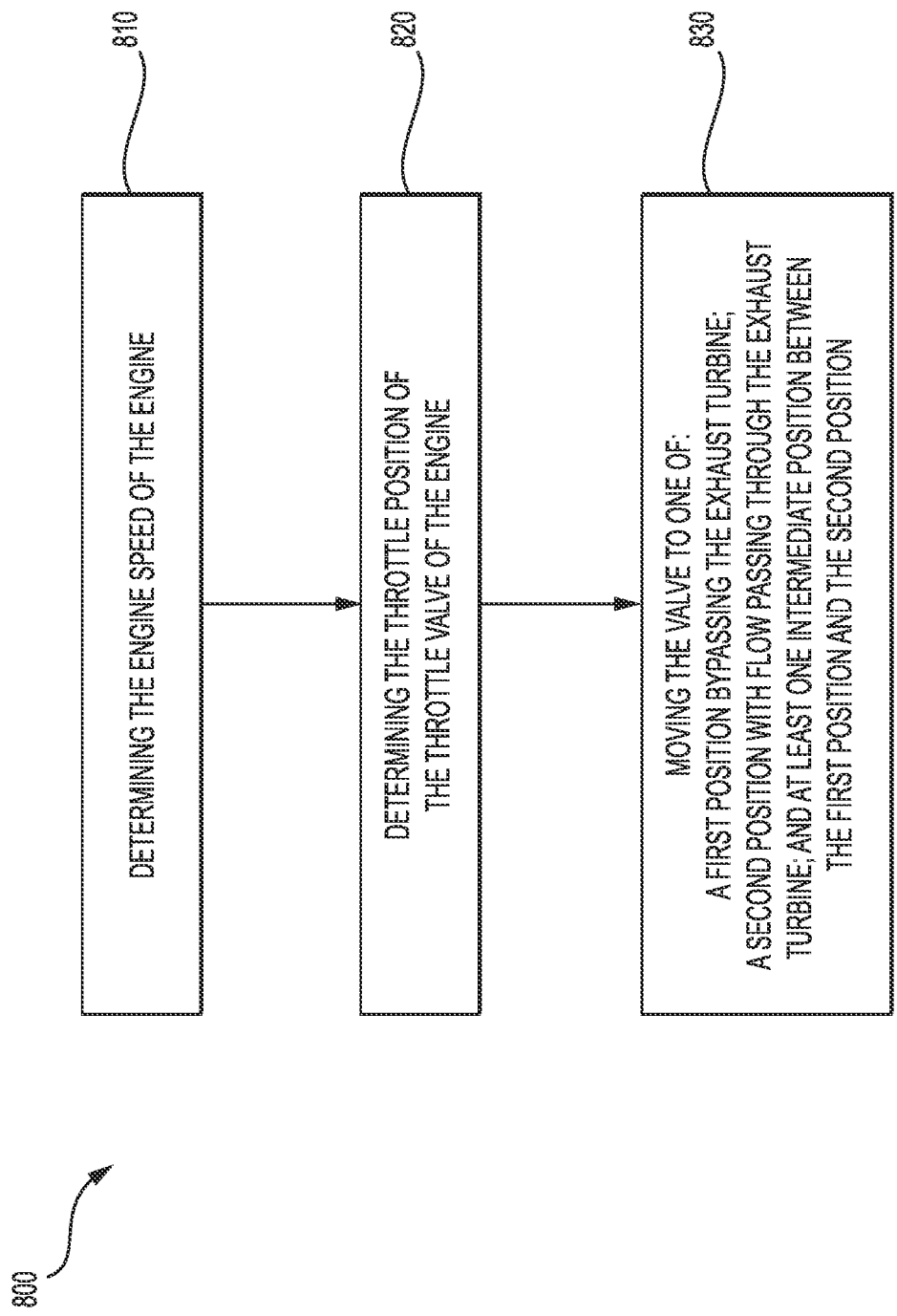
FIG. 23 is a flowchart illustrating another method according to the present technology of controlling exhaust gas flow through the exhaust system of FIG. 2.

With reference to FIGS. 21 to 23, different methods of controlling the flow of exhaust gas from the engine 26 will be described. Each will be described in more detail below. Briefly, the methods 700, 750, 800 aim to balance providing optimized boost to the engine 26 based on operating conditions (in the form of compressed air provided by the turbocharger 300) with the detrimental increase of back pressure that can be caused while the turbocharger 300 is spooling up. This control is provided by the valve 630. As is briefly mentioned above, operation of the exhaust system 600 with the valve 630 assists in preventing back pressure from impeding engine functionality, as the exhaust gas flows out through the bypass conduit 620. By closing the valve 630, exhaust gas is directed into the exhaust turbine 350 such that the turbocharger 300 provides additional air to the engine 26, but this exhaust flow path 675 also increases the back pressure. In some implementations of the methods, adjustments can be made to the positioning of the valve 630 to balance the need for additional compressed air versus negatively impacting engine operation through increased back pressure.

Operation Based on a Pressure Reading

Operation of the exhaust system 600 in accordance with different methods according to the present technology will now be described in more detail. In reference to FIG. 21, a non-limiting implementation of controlling operations in the exhaust system 600 is set out in the form of a method 700 for controlling a flow of exhaust gas from the engine 26. The method 700 is performed by the system controller 500 according to the present technology. In some implementations, it is contemplated that an additional or substitute computational system could be implemented to perform the method 700.

The method 700 begins at step 705, with determining at least one pressure of the engine 26. Based on one or more of the pressures detected for the engine 26, the method 700 determines how to position the valve 630 in order to optimize or improve performance of the engine 26. As will be described in more detail below, the valve 630 could be positioned based on, but is not limited to, exhaust pressure, air intake and/or atmospheric pressure, and the desired or actual boost pressure.

The method 700 then continues at step 720 with moving the valve 630 to the closed position, the open position, or an intermediate position based at least on the pressure determined in step 710. Depending on the determined pressure, the valve 630 is moved to direct more or less exhaust gas into the exhaust turbine 350. In some cases, the desired position of the valve 630 will correspond to the current position of the valve 630, and as such the valve 630 would not be moved.

In some implementations, determining a pressure at step 705 includes determining a pressure differential between an actual boost pressure of air flowing into the engine 26 and a predetermined boost pressure of air flowing into the engine 26 at sub-step 710.

In some implementations, the determining the pressure differential at sub-step 710 is performed in two sub-steps. First the actual boost pressure is determined at sub-step 712. The actual boost pressure is determined based on readings from the intake pressure sensor 504, to determine the air intake pressure coming from the turbocharger 300. It is contemplated, however, that a different sensor and/or operational value could be used to determine the actual boost pressure.

The predetermined boost pressure is determined at sub-step 714. The predetermined boost pressure is a boost pressure calculated or previously determined to be matched generally to the operating conditions of the engine 26, such that operation of the engine 26 is best optimized. The predetermined boost pressure is retrieved from a computer-accessible storage medium 507 operatively connected to or included in the system controller 500 (shown schematically in FIG. 8). It is contemplated that additional sensors could be included in the exhaust system 600 and utilized in the method 700.

In some implementations, determining the predetermined boost pressure at sub-step 714 includes at least one of: determining, by the engine sensor 586, the engine speed of the engine 26, determining a throttle valve position of the throttle valve 39 of the engine 26 by the throttle valve position sensor 588, determining a throttle lever position by the position sensor of the throttle lever 86, and determining a rate of throttle valve opening of the throttle valve 39. In some implementations, the rate of throttle valve opening could be determined instead or in addition to determining the throttle valve position. The predetermined boost pressure is then retrieved from the computer-based storage medium 507, based on the determined engine speed, throttle valve position, throttle lever position, and/or rate of throttle valve opening.

It is contemplated that the sub-steps 712, 714 could be performed in any order or simultaneously, depending on the specific implementation and/or operational scenario. In some implementations, it is contemplated that the snowmobile 10 could include a differential sensor for determining the pressure differential at sub-step 710 in a single measurement.

In some implementations or iterations, the method 700 could further include determining that the difference between the predetermined boost pressure and the actual boost pressure, as determined in sub-step 710, is less than a difference threshold. The difference threshold generally indicates whether movement of the valve 630 in order to bring the actual boost pressure more closely in line with the predetermined boost pressure will need to be a coarse adjustment (if the difference is above the threshold) or only needs to be a fine adjustment (if the difference is below the threshold).

Based on the difference being less than the difference threshold, the method 700 then continues with determining a desired valve position of the valve 630 from a fine adjustment data set. The fine adjustment data set, based on at least one of the throttle position and the engine speed as determined above, relates to fine, or minor, adjustments to the position of the valve 630 needed in order to provide the desired pressure in the engine 26 by decreasing the difference between the predetermined boost pressure and the actual boost pressure. The method 700 then continues with moving, following determining the desired valve position, the valve 630 toward the desired valve position.

Based on the difference being greater than the difference threshold, the method 700 then similarly continues with determining a desired valve position of the valve 630 from a coarse adjustment data set. The coarse adjustment data set, based on at least one of the throttle position and the engine speed as determined above, relates to coarse, or larger, adjustments to the position of the valve 630 needed in order to provide the desired pressure in the engine 26 by decreasing the difference between the predetermined boost pressure and the actual boost pressure. The method 700 then continues with moving, following determining the desired valve position, the valve 630 toward the desired valve position.

In some implementations, the method 700 could be done iteratively, such that when the difference between the predetermined boost pressure and the actual boost pressure is large, coarse adjustments are made to reduce the difference. Once the difference between the predetermined and actual boost pressure are reduced below the threshold, then fine adjustments would be used. Use of coarse and fine adjustments is simply one non-limiting example of controlling adjustment of the position of the valve 630. It is also contemplated that the adjustments could be partitioned into three or more datasets. For example, two thresholds could be used to split the adjustments into "large coarse adjustments", "small coarse adjustments", and "fine adjustments". It is also contemplated that a single data set could be utilized for determining a desired valve position.

In some implementations or iterations of the method 700, the determining the pressure differential at sub-step 710 includes determining a difference between an intake air pressure of air flowing to the engine 26, and an exhaust gas pressure of exhaust gas flowing out of the engine 26, in place of determining the difference between predetermined and actual boost pressures. In such an implementation, the method 700 would then include determining the intake air pressure by the intake pressure sensor 504 and determining the exhaust gas pressure by the exhaust pressure sensor 590.

The method 700 would then further include determining a predetermined pressure differential between the exhaust gas pressure and the intake air pressure. Similar to the predetermined boost pressure, the predetermined pressure differential corresponds to the optimal or preferred difference between the exhaust and intake air pressures which correspond to better operation of the engine 26 for the current operating conditions. For example, the predetermined pressure differential could be set based on engine parameters such as engine speed such that the engine 26 generally has the air volume necessary for proper functioning, without creating too much back pressure. In some implementations, the predetermined pressure differential could be determined based on, but is not limited to: throttle position and engine speed.

In such an implementation, the method 700 then continues with determining that a difference between the pressure differential and the predetermined pressure differential is non-zero. The non-zero difference indicates simply that the actual pressure differential is not at the predetermined pressure differential and thus the engine 26 may not be operating optimally. The method 700 thus then continues with moving the valve 630 based on the difference being non-zero to the open position, the closed position, or one of the intermediate positions. In some implementations, the position to which the valve 630 is moved could depend on whether the actual pressure differential is greater or less than the predetermined pressure differential.

In some implementations or iterations of the method 700, the method 700 includes determining that the intake air pressure is below a threshold atmospheric pressure. As with the above steps, determination of the intake air pressure includes measurement of the pressure by the air intake pressure sensor 504. The system controller 500 could then determine if the measured air pressure of air entering the engine 26 is below some predetermined threshold. For example, the threshold could be set based on engine parameters such that the engine 26 generally has the air volume necessary for proper functioning. It is also contemplated that the threshold atmospheric pressure may be a predetermined range of atmospheric pressure. In one non-limiting example, intake air pressure could fall below the threshold when the snowmobile 10 is climbing a mountain and increasing in altitude.

Then, based at least on the intake air pressure being below the threshold atmospheric pressure, the method 700 could continue with moving the valve 630 to or toward the closed position (if the valve 630 is in either the open or intermediate position). This would begin, or increase, operation of the turbocharger 300. As such, when the engine 26 is not getting sufficient air for good or sufficient operation, for instance when the snowmobile 10 is being operated at high altitudes, the turbocharger 300 can be spooled up to provide compressed air to the engine 26 (as is described above).

In some implementations or iterations of the method 700, the method 700 could further include determining that the back pressure is too high and opening up the valve 630 to maintain a balance between increasing intake air pressure to the engine 26 and allowing back pressure to ease through opening of the valve 630.

Subsequent to moving the valve 630 to or toward the closed position, the method 700 could further include determining that the exhaust gas pressure is above a threshold exhaust gas pressure. As is mentioned above, the exhaust gas pressure is measured by the exhaust pressure sensor 590; the system controller 500 then compares the measurement to the determined back pressure threshold.

Based on the exhaust gas pressure being above the threshold exhaust gas pressure, the method 700 then continues with repositioning the valve 630 to either the open position or an intermediate position such that exhaust gas flows at least partially along the bypassing exhaust gas flow path 670. By opening up the valve 630 such that an increased portion of the exhaust gas flows out through the bypass portion 620, the back pressure is eased. Depending on the iteration of the method 700, the valve 630 could be moved to only a small degree, or in some cases moved all the way to the open position. In some implementations, the change in position of the valve 630 could be proportional or directly related to an increase of exhaust gas pressure after moving the valve 630 to the closed position.

In some implementations or iterations of the method 700, the valve 630 could be moved back to the open position once the snowmobile 10 is operated at atmospheric pressures above the threshold used above to begin use of the turbocharger 300. In one non-limiting example, the valve 630 could be opened back up, partially or fully to the open position, when the snowmobile 10 decreases in altitude and the atmosphere surrounding the snowmobile 10 becomes richer.

In such a scenario, the method 700 could further include determining (by the intake pressure sensor 504 and the system controller 500) that the intake air pressure is above the threshold intake air pressure, subsequent to moving the valve 630 to or toward the closed position. Then, based on the intake air pressure being above the threshold intake air pressure, the method 700 could continue with moving the valve 630 such that a majority or more of the exhaust gas flows along the bypass exhaust flow path 670.

It is contemplated that the method 700 could include additional or different steps, either to perform additional functions and/or to perform the steps described above. It is also contemplated that the steps described above could be performed in an assortment of different sequences, depending on for example user preferences, and is not limited to the order set forth in the explanation above.

Operation Based on Exhaust Gas Pressure

In reference to FIG. 22, a non-limiting implementation of controlling operations in the exhaust system 600 is set out in the form of a method 750. The method 750 is performed, at least in part, by the system controller 500 according to the present technology. In some implementations, it is contemplated that an additional or substitute computational system could be implemented to perform the method 750.

The method 750 begins at step 760 with determining that an exhaust gas pressure of air flowing out of the engine 26 is above a threshold exhaust gas pressure, where the valve 630 is in either the closed position or an intermediate position, where a majority of the exhaust gas is flowing along the turbine exhaust flow path 675. The exhaust gas pressure is determined by the exhaust pressure sensor 590 and the system controller 500 in the present implementation, as is noted above. In some implementations, the valve 630 could have been moved to the closed position based on a decrease in atmospheric pressure surrounding the snowmobile 10, similar to the scenario described above in relation to the method 700. It is also contemplated that the valve 630 could have been moved to or toward the closed position for an alternative reason. For one non-limiting example, the valve 630 could have been moved to the closed position to provide more air to the engine 26, via the air compressor 310, based on insufficient performance of the engine 26.

The method 750 then continues, at step 760, with moving the valve 630 to either the open position or toward the open position to an intermediate position, based on the exhaust gas pressure being above the threshold exhaust gas pressure.

It is contemplated that the method 750 could be performed in tandem/consecutively to the method 700, operation of the snowmobile 10 could include implementations of both of the methods 700, 750.

It is contemplated that the method 750 could include additional or different steps, either to perform additional functions and/or to perform the steps described above. It is also contemplated that the steps described above could be performed in an assortment of different sequences, depending on for example user preferences, and is not limited to the order set forth in the explanation above.

Operation Based on Engine Speed and Throttle Position

In reference to FIG. 23, another non-limiting implementation of controlling operations in the exhaust system 600 is set out in the form of a method 800 for controlling the flow of exhaust gas from the engine 26. The method 800 is performed by the system controller 500 according to the present technology. In some implementations, it is contemplated that an additional or substitute computational system could be implemented to perform the method 800.

In addition to controlling the position of the valve 630 to manage intake and exhaust pressures based on environmental conditions (i.e. atmospheric pressure), the exhaust system 600 is further operable to adjust exhaust gas flow to balance providing additional boost while limiting back pressure when the user of the snowmobile 10 requests additional power from the snowmobile 10.

In one non-limiting scenario, the method 800 could be implemented in a situation where the throttle lever 86 is moved to make a high power request to the engine 26, for example during acceleration of the snowmobile 10. As will be outlined in the steps below, the valve 630 is moved to the closed position, to spool up the turbocharger 300, in response to this movement of the throttle lever 86. With the turbocharger 300 in use, the engine 26 would then benefit from a denser intake air charge and would have increased power output compared to a similar engine that would be naturally aspirated. As will further be described below, requesting too much boost and directing all exhaust gas along the turbine exhaust flow path 675 may also cause the back pressure to build beyond an optimized level to the desired engine operation. In such a situation, the method 800 can further move the valve 630 back toward the open position in order to allow some exhaust gas to bypass the exhaust turbine 350, thus decreasing the back pressure.

The method 800 begins at step 810 with determining, by the engine sensor 586, the engine speed of the engine 26. The method 800 then continues, at step 820, with determining a throttle valve position of the throttle valve 39 of the engine 26. The position of the throttle valve 39 is sensed by the throttle valve position sensor 588, as is mentioned above.

In some implementations, step 820 could include determining a rate of throttle valve opening of the throttle valve 39 instead or in addition to determining the throttle valve position. The throttle valve position sensor 588, alone or in conjunction with the system controller 500, could also be used to measure the rate of throttle valve opening in some implementations. The steps 810, 820 may be performed in either order, or simultaneously, depending on the specific implementation.

The method 800 then continues, at step 830, with moving the valve 630 to the open position, the closed position, or any intermediate position, based on the engine speed and the throttle valve position determined in steps 810, 820, as well as the starting position of the valve 630. In the method 800, the throttle valve position is taken into consideration to assist in controlling the exhaust gas flow for managing operation of the engine 26.

In some implementations or iterations, the method 800 could further include moving the valve 630 based on a temperature of the exhaust pipe 202, in addition to the engine speed and the throttle valve position determined in steps 810, 820. The temperature of the exhaust pipe 202 is received by the system controller 500 from the temperature sensor 512. In some implementations, moving the valve 630 could be based additionally or alternatively on the temperature of the exhaust gas within the exhaust pipe 202, as sensed by the temperature sensor 512.

In some implementations, the method 800 could further include determining a pressure differential and further moving the valve 630 based on the pressure differential. In some implementations, the pressure differential is determined by comparing a predetermined boost pressure of air flowing into the engine 26 against an actual boost pressure of air flowing into the engine 26. The predetermined boost pressure, described above in more detail, is determined based at least on one of the throttle position and the engine speed, as determined in steps 810, 820 and corresponds to what the boost pressure should be flowing into the engine 26 based on the throttle position and/or the engine speed. The actual boost pressure of air flowing into the engine 26 is determined by measuring the air intake pressure by the intake pressure sensor 504 and the system controller 500, as is described above. In some implementations, the actual boost pressure could be determined differently.

In some implementations, the method 800 could further include determining if the engine 26 is operating at a low altitude or a high altitude (i.e. that the snowmobile 10 is being operated at low or high altitude) prior to moving the valve 630. In some implementations, determining if the engine 26 is operating at low altitude or high altitude includes determining an atmospheric pressure of air entering the snowmobile by the intake pressure sensor 504. It is also contemplated that the system controller 500 could include or be communicatively connected to an altimeter or similar altitude measuring device.

Upon determining that the engine 26 is operating at low altitude, the method 800 could then continue with retrieving a desired valve position for the valve 630 from a low altitude data set. Upon determining that the engine 26 is operating at high altitude, the method 800 could then similarly continue with retrieving the desired valve position for the valve 630 from a high altitude data set. In some implementations, the low altitude data set and the high altitude data set could be stored in the storage medium 507 communicatively connected to or part of the system controller 500.

The desired valve position retrieved from the low or high data sets generally corresponds to an optimized or predetermined valve position based on the altitude and the engine speed and/or the throttle position, such that air flow into the engine 26 is matched to the operating conditions of the engine 26. In such an implementation, having determined a desired position of the valve 630, moving the valve 630 at step 830 would be performed by moving the valve 630 to the desired position.

In some implementations or iterations, the method 800 could further include determining, based at least on the throttle position and the engine speed determined in steps 810, 820, a threshold pressure differential of the engine 26. The method 800 then continues with determining an actual pressure differential of the engine 26. In some implementations, determining the actual pressure differential includes determining the exhaust pressure downstream of the engine 26 by the exhaust pressure sensor 590, determining the air intake pressure upstream of the engine 26 by the intake pressure sensor 504, and determining the difference thereof.

The method 800 then continues with determining that the actual pressure differential is greater than the threshold pressure differential and moving the valve 630 toward the open position if the valve 630 is either closed or an intermediate positions. In such a case, the actual pressure differential being greater than the threshold pressure differential could indicate that there is too much air pressure moving into the engine 26. This could have detrimental effects on operation of the engine 26, and the method 800 could thus provide correction by allowing more exhaust gas to bypass the exhaust turbine 350 by further moving the valve 630 toward the open position.

In some implementations, the method 800 could further include determining that an intake pressure, as determined by the intake pressure sensor 504, is above an intake threshold and determining that the throttle valve position is beyond a valve position threshold. For instance, the method 800 could determine that there is too much air pressure moving into the engine 26 while the throttle valve 39 has been opened too far. This combination could have detrimental effects on operation of the engine 26, and the method 800 could provide correction by allowing more exhaust gas to bypass the exhaust turbine 350 by further moving the valve 630 toward the open position.

Based on the intake pressure and the throttle valve position being past their respective thresholds, the valve 630, could then be moved from closed position or an intermediate position toward the open position. This allows for a decrease in back pressure induced by either too much air intake or requesting too much throttle too quickly.

In some implementations or iterations, the method 800 could further include moving the valve 630 toward the closed position, subsequent to moving the valve 630 toward the open position, such that a portion of the exhaust gas flowing through the exhaust turbine 350 of the turbocharger 300 is increased. In such implementations, the method 800 provides some tuning of the exhaust gas flow to balance boost from the turbocharger 300 while limiting detrimental effects of increased back pressure, which assists in smoothing the power increase of the engine 26.

In some implementations or iterations, the method 800 could further include determining that the intake pressure is above the air intake pressure threshold, subsequent to moving the valve toward the closed position. The method 800 could then include moving the valve 630 toward the open position, based on the intake pressure being above the threshold.

In some implementations or iterations, the method 800 could further include determining that the intake pressure is below the intake pressure threshold subsequent to moving the valve toward the closed position. The method 800 could then further include moving the valve 630 further toward the closed position, in order to allow further boost from the turbocharger 300.

In some implementations, the determining the intake air pressure could include determining the intake pressure at a location downstream of the turbocharger 300 by a pressure sensor (not shown). Moving the valve could then include selectively moving the valve based on the intake pressure determined by the pressure sensor downstream from the turbocharger 300.

In some implementations, the method 800 could further include determining the exhaust pressure downstream of the engine 26 by the exhaust pressure sensor 590 and moving the valve 630 toward the open position based on the exhaust pressure being above a predetermined exhaust pressure threshold.

In some implementations, where the rate of throttle valve opening is determined, the method 800 could further include determining that the rate of throttle valve opening is above a threshold rate; and moving the valve 630 toward the open position based at least on the rate of throttle valve opening being above the threshold rate. In such an implementation, the valve 630 is opened up, for example, when too much throttle is requested too quickly, in order to prevent back pressure from having a detrimental effect on engine operation (especially when the user is trying to increase power from the engine 26). In some implementations, the method 800 could further include determining that the intake pressure is above the threshold intake pressure and moving the valve 630 based on both the rate of throttle valve opening being above the threshold rate and the intake pressure being above the threshold intake pressure.

It is contemplated that the method 800 could include additional or different steps, either to perform additional functions and/or to perform the steps described above. It is also contemplated that the steps described above could be performed in an assortment of different sequences, depending on for example user preferences, and is not limited to the order set forth in the explanation above.

As described above, various methods of controlling operation of the turbocharger 300 involve monitoring the back pressure affecting the engine 26. In view of the availability of the pressure information in the present technology, operation of the snowmobile 10 can further be optimized by making adjustments to the fuel-air mixture in the engine 26.

Changes in the back pressure in the engine 26 and the exhaust system 600 impacts the fuel to air ratio present in the engine 26. All other things remaining equal, the engine 26 obtains maximum power when a target back pressure is maintained. If the effective back pressure in the engine 26 deviates from that target, the fuel to air ratio is affected, which in turns diminishes the operation of the engine 26.

With increasing back pressure, the total amount of air flowing through the engine 26 is reduced. In such a circumstance, a constant amount of fuel injected would cause an increased fuel to air ratio in the engine 26 and as such the engine 26 would be provided with a fuel-air mixture that is too rich. As such, the engine 26 may not perform optimally.

Too much of a decrease in back pressure at high engine speed, all other things being equal, would also lead to an increase in the fuel to air ratio. When back pressure is too low, pressure waves created by the exhaust pipe 202 (which aid creating a trapping effect to maintain air in a two-stroke engine) could be mistimed, and the combustion chambers of the engine 26 are emptied of more air than optimally would occur. In such a case, the engine 26 would again end up with a richer fuel-air mixture (receiving the same amount of fuel with less air). Once again the engine 26 may not perform optimally.

Supplying a Fuel-Air Mixture

Figure 24:
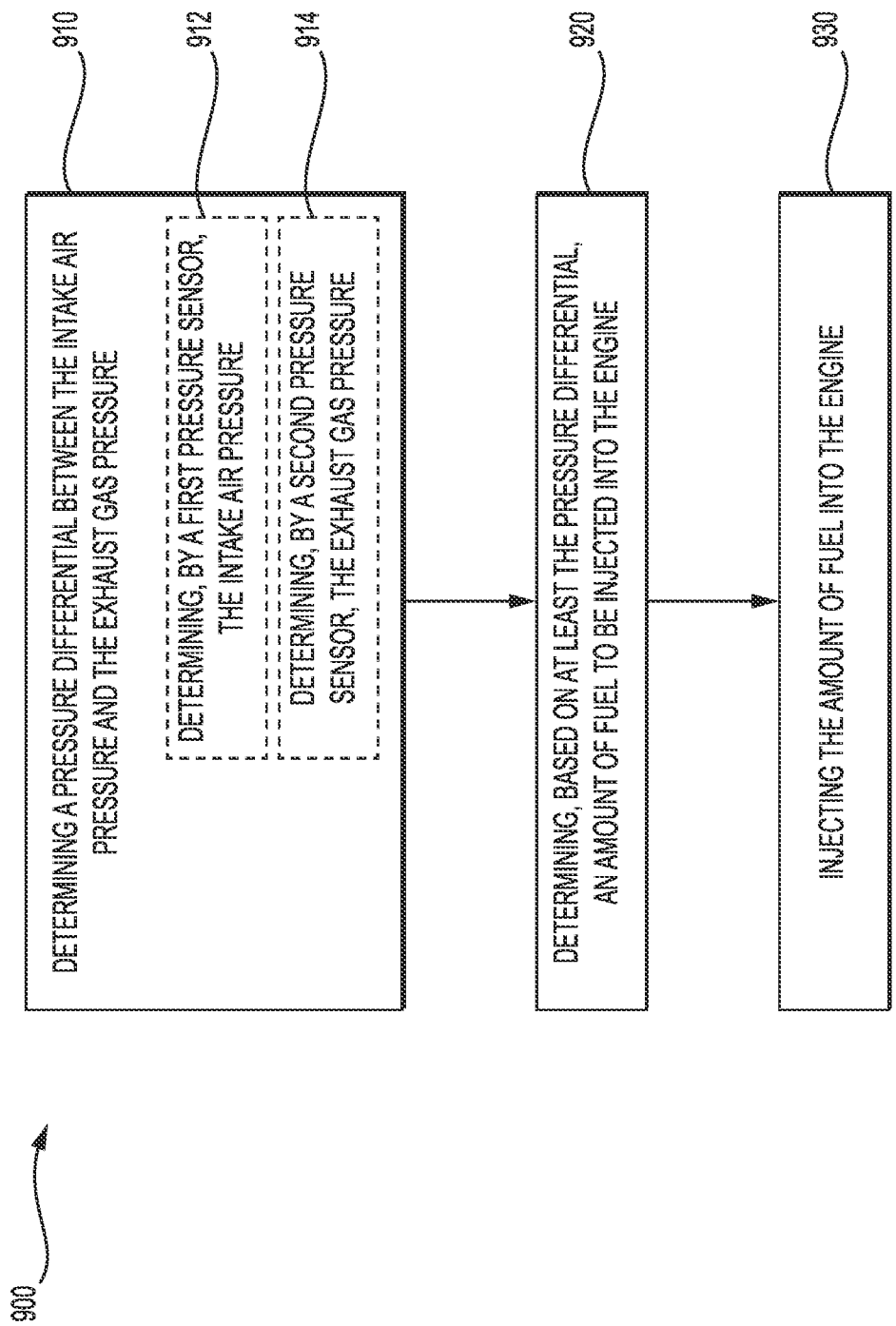
FIG. 24 is a flowchart illustrating a method according to the present technology for providing a fuel-air mixture to the engine of FIG. 2.

With reference to FIGS. 24 and 33, a method 900 of supplying a fuel-air mixture in the engine 26 of the snowmobile 10 will now be described.

The method 900 begins at step 910 with determining a pressure differential between an intake air pressure of air flowing toward the engine 26 and an exhaust gas pressure of exhaust gas flowing out of the engine 26. This pressure differential, as mentioned above with respect to the dynamic regime, generally correlates with the back pressure in the engine 26. The pressure differential is determined by comparing, by the system controller 500, measurements taken from the air intake pressure sensor 504 and the exhaust pressure sensor 590. In some implementations, it is contemplated that the snowmobile 10 could include a differential sensor for determining the pressure differential in a single measurement.

In some implementations of the method 900, the pressure differential is determined in two steps. Specifically, by determining the intake air pressure, by the air intake pressure sensor 504, at sub-step 912. Then the method 900 continues with determining the exhaust gas pressure, by the exhaust pressure sensor 590, at sub-step 914. Depending on the specific implementation, the steps 912, 914 could be performed in any order, or simultaneously.

Figure 34:
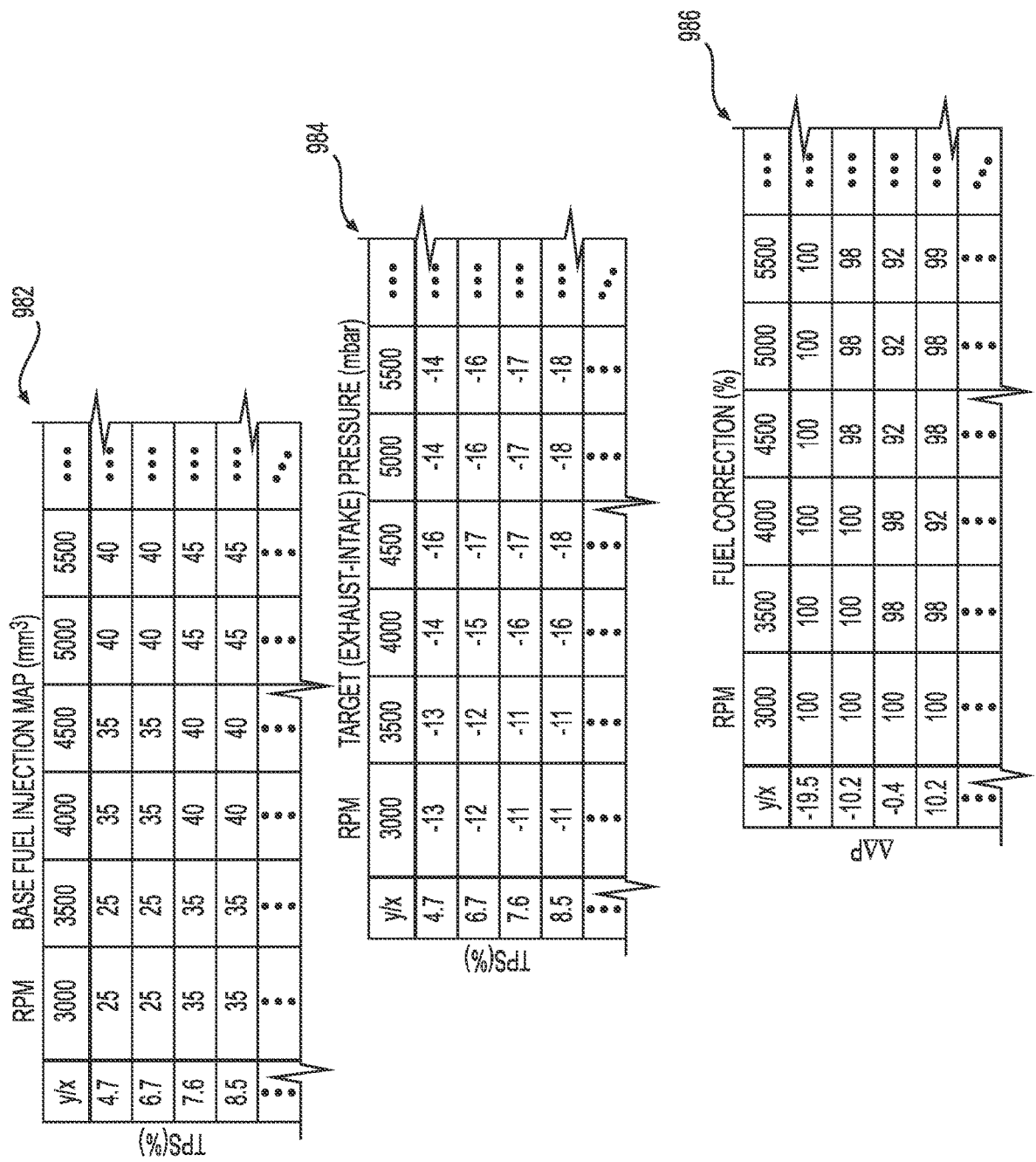
FIG. 34 illustrates example datasets used in the method of FIG. 24.

The method 900 continues, at step 920, with determining an amount of fuel to be injected into the engine 26 based on at least the pressure differential (as determined in step 910). The system controller 500 calculates the amount of fuel to be injected, such that the fuel-air mixture is maintained at an appropriate value, based at least on the backpressure in the engine 26. It is contemplated that another computing system could be included to manage the determination of the amount of fuel to be injected, rather than the system controller 500. A base fuel injection quantity is determined by using a dataset relating an amount of fuel to be injected corresponding to the current TPS and RPM. An example base fuel injection dataset 982 is shown in FIG. 34 where the base fuel injection is indicated as a volume, in this example in $mm^3$.

In some implementations, the base fuel injection quantity could be modified according to the back pressure as follows. A target back pressure (the exhaust pressure less the intake pressure) is determined from a dataset of TPS and RPM, such as in the example dataset 984. The actual back pressure is obtained from the exhaust pressure minus the intake pressure using the exhaust pressure sensor 590 and the intake pressure sensor 504 respectively.

A fuel correction quantity or percentage would then be obtained from a fuel correction dataset 986 of RPM and the difference between the actual back pressure and the target back pressure (identified as AAP). The fuel correction from this dataset 986 would then be applied to the base fuel injection quantity to determine a final injection quantity, modified according to the measured back pressure.

The method 900 then terminates, at step 930, with injecting the amount of fuel (as determined in step 920) into the engine 26. The fuel is injected by the fuel injectors 41, as is described above.

It is contemplated that in some implementations, the method 900 could recommence after step 930. In some implementations, the method 900 could continue beyond step 930 with determining a changed pressure differential. The method 900 could then continue with determining a revised amount of fuel based on the changed pressure differential. This implementation of the method 900 could then terminate with injecting the revised amount of fuel into the engine 26.

In some implementations, the method 900 could include determining that the pressure differential has increased, determining a reduced amount of fuel to be injected, and injecting the reduced amount of fuel into the engine 26. In some implementations, the method 900 could also include determining that the pressure differential has decreased, determining a reduced amount of fuel to be injected, and injecting the reduced amount of fuel into the engine 26.

In some implementations, the method 900 repeats following step 930, at some predetermined time interval, to readjust the fuel-air mixture in order to compensate for changes in the back pressure. In some implementations, the method 900 could be performed by the system controller 500 intermittently during operation of the snowmobile 10. It is also contemplated that that method 900 could be performed only once or only a few times during operation of the snowmobile. It is further contemplated that the method 900 could be performed in response to the pressure differential and/or the intake or exhaust pressures passing a predetermined threshold.

In some implementations, the method 900 could further include determining the engine speed, and the determining the amount of fuel to be injected is also based on the engine speed. In some implementations, the method 900 could further include determining the throttle position of the throttle valve 39, and the determining the amount of fuel to be injected is further based on the throttle position.

It is further contemplated that additional variables could be taken into account when determining or calculating the amount of fuel to be injected, in addition to the pressure differential. These could include, but are not limited to: engine speed (rpm), the throttle position, the air temperature, ambient barometric pressure, close loop wide band lambda control, and temperature of the exhaust gas.

It is contemplated that the method 900 could include additional or different steps, either to perform additional functions and/or to perform the steps described above. It is also contemplated that the steps could be performed in an assortment of different sequences, depending on the specific implementation.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A snowmobile comprising:
    a frame;
    at least one ski connected to the frame;
    an engine supported by the frame, the engine having an engine air inlet and an exhaust outlet;
    an exhaust pipe fluidly connected to the exhaust outlet of the engine;
    a turbocharger fluidly connected to the exhaust pipe, the turbocharger including:
        an exhaust turbine, and
        a housing housing the exhaust turbine;
    a bypass conduit disposed upstream of the housing and fluidly communicating with the housing, the bypass conduit including:
        an exhaust inlet fluidly connected to the exhaust pipe; and
        a flow divider for separating a flow of exhaust gas into a first exhaust flow path and a second exhaust flow path;
    a first valve disposed in the first exhaust flow path for selectively controlling the flow of exhaust gas through the turbocharger and diverting the flow of exhaust gas from the first flow path to the second flow path, the first valve being selectively movable between a first position, a second position, and at least one intermediate position between the first and second positions;
    the engine having:
        a throttle valve, and
        a throttle valve position sensor operatively connected to the throttle valve; and
    the first valve is selectively moved based at least on a rate of change of a throttle valve position, the rate of change being determined by the throttle valve position sensor;
    an exhaust collector fluidly connected to the housing and the bypass conduit for receiving the flow of exhaust gas therefrom, the exhaust collector including a single collector outlet; and
    a muffler fluidly connected to the single collector outlet,
    the first exhaust flow path being defined from the exhaust inlet to the exhaust collector, exhaust gas flowing along the first exhaust flow path passing through the exhaust inlet, then through the bypass conduit, and then into the exhaust collector,
    the second exhaust flow path being defined from the exhaust inlet to the exhaust collector, exhaust gas flowing along the second exhaust flow path passing through the exhaust inlet, then through the bypass conduit, then through the exhaust turbine, and then into the exhaust collector, exhaust gas flowing from the exhaust turbine entering and flowing through the exhaust collector directly,
    the muffler receiving the exhaust gas from both the first exhaust flow path and second exhaust flow path via the single collector outlet, exhaust gas flowing through the exhaust collector and into the muffler directly,
    in the first position of the first valve, at least a majority of the exhaust gas flowing along the first exhaust flow path,
    in the second position of the first valve, at least a majority of the exhaust gas flowing along the second exhaust flow path,
    in the at least one intermediate position, the exhaust gas flows along both of the first exhaust flow path and the second exhaust flow path.

2. The snowmobile of claim 1, wherein the first valve is selectively moved to the second position in response to the engine being operated below a threshold atmospheric pressure.

3. The snowmobile of claim 1, wherein:
    the turbocharger further comprises an air compressor fluidly connected to the engine air inlet; and
    the snowmobile further comprises an air intake system fluidly connecting atmosphere to the engine, the air intake system including:
        the air compressor, and
        the engine air inlet.

4. The snowmobile of claim 1, wherein:
    the muffler has a single muffler inlet for receiving exhaust gas from both the first exhaust flow path and the second exhaust flow path via the single collector outlet; and
    the single muffler inlet is fluidly connected to the single collector outlet, the muffler receiving the exhaust gas from both the first exhaust flow path and the second exhaust flow path via the single collector outlet.

5. The snowmobile of claim 1, wherein the exhaust collector includes:
    at least one inlet for receiving exhaust gas flow, the at least one inlet including:
        a first portion for receiving exhaust gas flowing along the first exhaust flow path; and
        a second portion for receiving exhaust gas flowing along the second exhaust flow path,
        the first portion and the second portion being integrally connected.

6. The snowmobile of claim 1, wherein:
the bypass conduit includes a passage through which exhaust gas flows when flowing along the first exhaust flow path;
the exhaust turbine has a turbine inlet through which exhaust gas flows when flowing along the second exhaust flow path; and
a cross-sectional area of the passage is larger than a cross-sectional area of the turbine inlet of the turbocharger.

7. The snowmobile of claim 1, wherein a change of direction of exhaust gas flowing from an outlet of the exhaust pipe along the second exhaust flow path is greater than for exhaust gas flowing from the outlet of the exhaust pipe along the first exhaust flow path bypassing the exhaust turbine.

8. The snowmobile of claim 1, wherein all exhaust gas flowing into the exhaust collector flows into the muffler directly.

\* \* \* \* \*